(12) United States Patent
Uemizo et al.

(10) Patent No.: US 11,486,187 B2
(45) Date of Patent: Nov. 1, 2022

(54) BANKNOTE HANDLING SYSTEM FOR AUTOMATED CASINO ACCOUNTING

(71) Applicant: Japan Cash Machine Co., Ltd., Osaka (JP)

(72) Inventors: Yoshiaki Uemizo, Osaka (JP); Takashi Ueda, Osaka (JP)

(73) Assignee: Japan Cash Machine Co., Ltd., Osaka (JP)

( * ) Notice: Subject to any disclaimer, the term of this patent is extended or adjusted under 35 U.S.C. 154(b) by 362 days.

(21) Appl. No.: 16/936,213

(22) Filed: Jul. 22, 2020

(65) Prior Publication Data

US 2020/0347663 A1 Nov. 5, 2020

Related U.S. Application Data

(63) Continuation of application No. 16/216,839, filed on Dec. 11, 2018, now Pat. No. 10,890,025.

(51) Int. Cl.
*E05G 1/04* (2006.01)
*G07D 11/125* (2019.01)
*G07D 11/16* (2019.01)
*B25J 15/00* (2006.01)
*E05B 19/00* (2006.01)
*E05B 65/52* (2006.01)
(Continued)

(52) U.S. Cl.
CPC ............ *E05G 1/04* (2013.01); *B25J 15/0033* (2013.01); *E05B 19/00* (2013.01); *E05B 65/52* (2013.01); *E05G 1/005* (2013.01); *G07D 11/125* (2019.01); *G07D 11/16* (2019.01); *G07D 11/34* (2019.01); *G07D 2211/00* (2013.01); *G07F 17/3246* (2013.01)

(58) Field of Classification Search
CPC ......... E05B 19/00; E05B 65/52; G07D 11/16; G07D 11/125; G07D 11/165; G07D 11/34; G07D 2211/00; B25J 15/0293; B25J 15/0033; B25J 19/023; E05G 1/04; E05G 1/005; G07F 17/3246
USPC .............. 700/218, 245; 109/23–24.1; 70/432
See application file for complete search history.

(56) References Cited

U.S. PATENT DOCUMENTS

| 3,966,116 A | 6/1976 | Dominick |
| 4,283,097 A | 8/1981 | Lundblad |
| (Continued) | | |

FOREIGN PATENT DOCUMENTS

| CN | 1350967 A | 5/2002 |
| CN | 1666235 A | 9/2005 |
| (Continued) | | |

OTHER PUBLICATIONS

Extended European Search Report dated Jun. 2, 2022, Application No. 19806523.7 (7 pages).

*Primary Examiner* — Suzanne L Barrett
(74) *Attorney, Agent, or Firm* — FisherBroyles, LLP; Rob L. Phillips

(57) ABSTRACT

A banknote handling system includes an unlocking system. The unlocking system includes a camera, a first mechanical arm to which one or a plurality of keys are affixed, and a controller that determines a position of a keyhole based on an image from the camera, and controls the first arm to insert one of the one or the plurality of keys into the keyhole and turn the inserted key for unlocking. In many examples, the unlocking system is configured to unlock a banknote cashbox.

20 Claims, 47 Drawing Sheets

(51) Int. Cl.
*E05G 1/00* (2006.01)
*G07D 11/34* (2019.01)
*G07F 17/32* (2006.01)

(56) References Cited

U.S. PATENT DOCUMENTS

| | | | |
|---|---|---|---|
| 5,105,069 | A | 4/1992 | Hakenewerth et al. |
| 6,895,873 | B1 | 5/2005 | Searle |
| 8,929,640 | B1 | 1/2015 | Mennie |
| 8,936,287 | B2 | 1/2015 | Stayton |
| 9,315,343 | B1 * | 4/2016 | Widder ............ B65H 1/08 |
| 10,755,522 | B1 | 8/2020 | Pechinko |
| 10,890,025 | B2 * | 1/2021 | Uemizo ........... B25J 15/0293 |
| 11,339,606 | B2 * | 5/2022 | Uemizo ............ E05G 1/005 |
| 2004/0003980 | A1 | 1/2004 | Hallowell et al. |
| 2005/0000842 | A1 | 1/2005 | Timmerman |
| 2005/0060856 | A1 | 3/2005 | Tonohara et al. |
| 2005/0183928 | A1 | 8/2005 | Jones |
| 2006/0136095 | A1 | 6/2006 | Rob |
| 2007/0000993 | A1 | 1/2007 | Graef |
| 2007/0034683 | A1 | 2/2007 | Eastman |
| 2009/0223265 | A1 | 9/2009 | Chang |
| 2010/0168903 | A1 | 7/2010 | Aas |
| 2012/0175217 | A1 | 7/2012 | Meter |
| 2013/0307210 | A1 | 11/2013 | Takada |
| 2014/0274312 | A1 | 9/2014 | Walters, Jr. |
| 2015/0047539 | A1 | 2/2015 | Togiya |
| 2016/0059412 | A1 | 3/2016 | Oleynik |
| 2017/0356233 | A1 | 12/2017 | Yokote et al. |
| 2019/0206197 | A1 | 7/2019 | Matsuoka |
| 2019/0360258 | A1 | 11/2019 | Uemizo et al. |
| 2020/0347662 | A1 * | 11/2020 | Uemizo ............ E05G 1/04 |
| 2021/0027566 | A1 * | 1/2021 | Uemizo ............ G07D 11/16 |

FOREIGN PATENT DOCUMENTS

| | | |
|---|---|---|
| CN | 1763790 A | 4/2006 |
| CN | 102348605 A | 2/2012 |
| CN | 102667873 A | 9/2012 |
| CN | 102862699 A | 1/2013 |
| CN | 202673218 U | 1/2013 |
| CN | 103021075 A | 4/2013 |
| CN | 103366451 A | 10/2013 |
| CN | 103914908 A | 7/2014 |
| CN | 104537759 A | 4/2015 |
| CN | 205972531 U | 2/2017 |
| CN | 106530492 A | 3/2017 |
| CN | 107111911 A | 8/2017 |
| CN | 107825450 A | 3/2018 |
| CN | 207148954 | 3/2018 |
| CN | 108021465 A | 5/2018 |
| DE | 102012022922 A1 | 5/2014 |
| EP | 0444626 A2 | 9/1991 |
| JP | S62-092095 | 4/1987 |
| JP | S62175358 | 8/1987 |
| JP | S63-235233 | 9/1988 |
| JP | 63313292 A | 12/1988 |
| JP | H09-300250 | 11/1997 |
| JP | 2006301071 A | 11/2006 |
| JP | 2007/083331 | 4/2007 |
| JP | 2007083331 A | 4/2007 |
| JP | 2013/233601 | 11/2013 |
| JP | 2014153764 A | 8/2014 |
| JP | 2015/085497 | 5/2015 |
| JP | 2015085497 A | 7/2015 |
| JP | 2016031619 | 3/2016 |
| JP | 2016031619 A | 3/2016 |
| JP | 2016224664 | 12/2016 |
| JP | 2016224664 A | 12/2016 |
| JP | 2017210347 A | 11/2017 |
| WO | 2010103620 A1 | 9/2010 |

* cited by examiner

BANKNOTE HANDLING SYSTEM FOR AUTOMATED CASINO ACCOUNTING

CROSS-REFERENCE TO RELATED APPLICATIONS

This application is a continuation of U.S. patent application Ser. No. 16/216,839, filed Dec. 11, 2018, which claims priority under 35 U.S.C. 119(b) to the following Japanese patent applications: JP 2018-097808 filed May 22, 2018; JP 2018-097807 filed May 22, 2018; JP 2018-097806 filed May 22, 2018; JP 2018-097805 filed May 22, 2018; JP 2018-097804 filed May 22, 2018; JP 2018-097803 filed May 22, 2018; and JP 2018-097802 filed May 22, 2018; the contents of which are incorporated herein by reference.

TECHNICAL FIELD

Embodiments described herein relate to a casino accounting system and, in particular, to an automated system to facilitate collection, accounting, sorting, and bundling of currency notes inserted by players into electronic gaming machines in a casino gaming environment.

BACKGROUND

A gaming industry entity, such as a casino, is typically required by a regulatory body to maintain accurate records of all transactions (e.g., ticket in/ticket out transactions, player card transactions, cash or banknote deposits, and so on) initiated by or through an electronic gaming machine, such as a slot machine, controlled by that entity. Conventionally, such transaction records are immediately communicated from an electronic gaming machine to a local or remote server approved of by the regulatory body.

At a later time, banknotes (and/or other financial documents, such as cash-equivalent vouchers) collected by each electronic gaming machine—if any—are retrieved from locked "banknote cashboxes" within each electronic gaming machine and separately counted and sorted to verify that all cash transactions reported by each electronic gaming machine exactly match the quantity and denominations of banknotes collected or otherwise received by that electronic gaming machine.

However, the process of regularly collecting banknote cashboxes, unlocking banknote cashboxes, retrieving banknote stacks from unlocked banknote cashboxes, processing (e.g., sorting, counting, and/or bundling) the retrieved banknote stacks, relocking empty banknote cashboxes, and redistributing and reinserting locked banknote cashboxes into electronic gaming machines is exceptionally time consuming and subject to human error, especially due to the propensity of a loose, unjogged, stack of banknotes to droop, slip, or otherwise collapse or spread when removed from a banknote cashbox.

SUMMARY

Some embodiments described herein generally reference a system (referred to herein as a "banknote handling system") including a mechanical arm fitted with an object grasping mechanism configure to grasp a loose, unjogged, stack of banknotes from a banknote container (also referred to as a "banknote cashbox"). In one configuration, the object grasping mechanism includes a first gripper, a second gripper, a gripper actuator, and a biasing member. The second gripper is disposed so as to face—and in some embodiments, oriented parallel to—the first gripper. The gripper actuator moves at least one of the grippers toward or away from of the opposite gripper along a linear or curved path. In addition, the object grasping mechanism includes a movable support that is disposed adjacent to a side of one or both of the first or second gripper.

The movable support extends or retracts along a direction parallel to the adjacent gripper. A surface on an object receiving side of the movable support is typically defined on a surface including an object-interfacing surface of the adjacent gripper, but in some embodiments, the object receiving side of the movable support may be offset. The biasing member biases the movable support toward a tip of the gripper. As a result of this construction, the position and/or pose of the mechanical arm can be manipulated to cause the first and second gripper of object grasping mechanism to insert into a banknote container, grasp a stack of banknotes contained therein, and withdraw the stack of banknotes. As the first and second gripper of object grasping mechanism withdraw from the banknote container, the movable support slides under a surface of the stack of banknotes (as a result of the biasing member) to support the stack of banknotes and prevent the stack from drooping or otherwise collapsing.

In another embodiment, an unlocking system of a banknote handling system includes a camera, a first mechanical arm to which one or a plurality of keys are attached, and a controller that determines a position of a keyhole based on an image from the camera, and controls the first arm to insert one of the one or the plurality of keys into the keyhole and turn the inserted key for unlocking.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
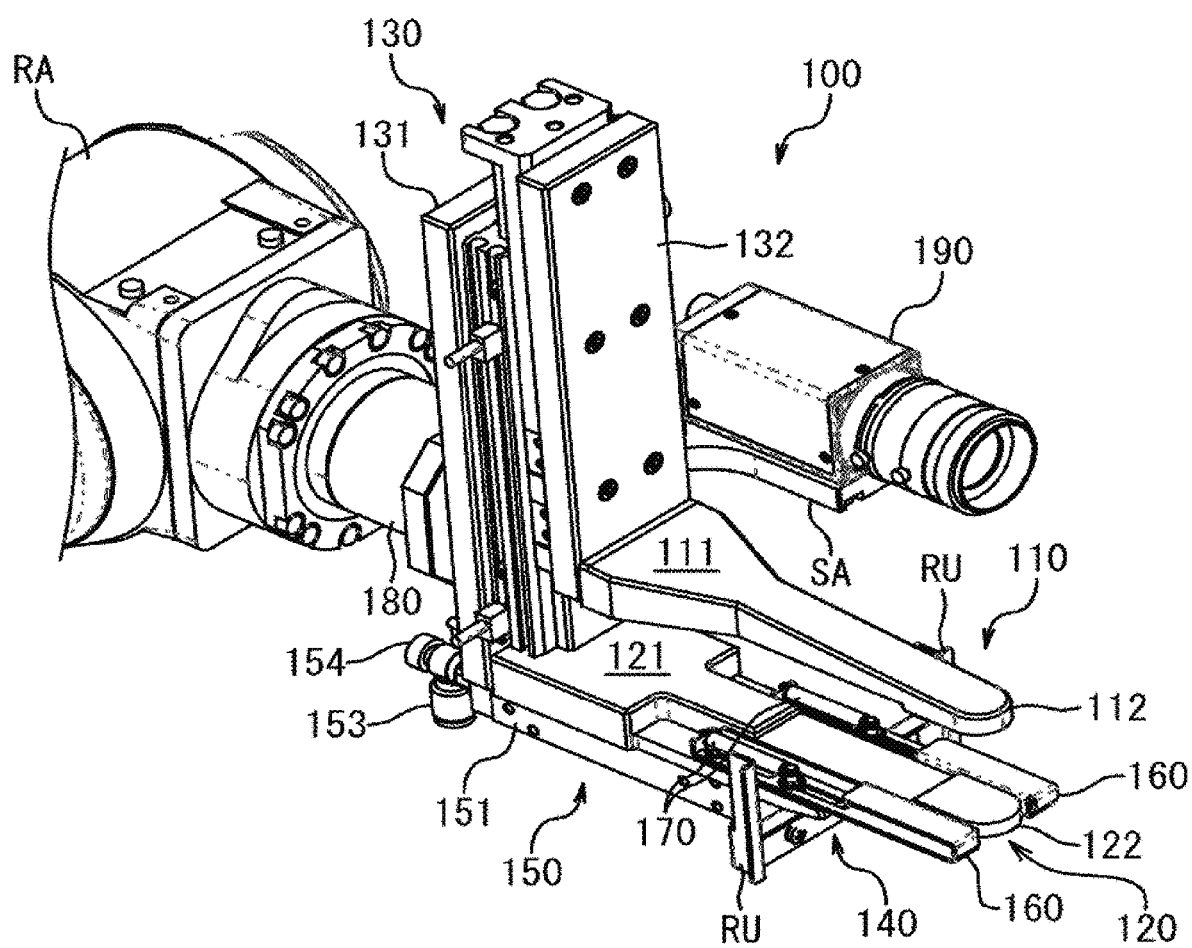
FIG. 1 is a perspective view of an object grasping mechanism that can be fitted to a mechanical arm of a banknote handling system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a banknote handling system, and components thereof, for emptying banknote cashboxes collected in a casino gaming environment. In particular, a banknote handling system such as described herein is configured to substantially automate the operations of processing banknote cashboxes collected from one or more electronic gaming machines or gaming services (e.g., slot machines, table games, and so on) associated with a casino gaming environment.

More specifically, a banknote handling system can be configured to, without substantial intervention by a human operator, receive locked banknote cashboxes, unlock the locked banknote cashboxes, retrieve banknote stacks from the unlocked banknote cashboxes, process the retrieved banknote stacks (e.g., sorting, counting, reconciling, and/or bundling), and relock the emptied banknote cashboxes which, thereafter, can be re-inserted into an electronic gaming machine. In some embodiments, the banknote handling system can be configured to organize the retrieved and/or bundled banknote stacks by denomination or in any other suitable manner, for example in preparation for collection and deposit at a bank.

For simplicity of description, many embodiments herein reference a "casino" as an example gaming industry entity in control of a casino gaming environment, although it is appreciated that this is merely one example. Similarly, for simplicity of description, the phrase "electronic gaming machine" as used herein is generally understood to refer to a stationary slot machine within a casino, however, it may be understood that this is merely one example of an electronic gaming machine or gaming service. In other words, in some embodiments, other gaming industry entities and/or other stationary, portable, and/or digital (e.g., software-based) electronic gaming machines and/or services may be suitable for use with the various embodiments described herein and equivalents thereof.

A banknote handling system, such as described herein, typically includes one or more mechanical arms communicably coupled to a controller that can adjust the position or pose of the mechanical arms across numerous degrees of freedom in free space. In many embodiments, one or more components of the controller can include or can be communicably coupled to circuitry and/or logic components, such as a processor and a memory. The processor of the controller can be implemented as any device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the term "processing unit" or, more generally, "processor" or "controller" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

In one embodiment, a banknote handling system includes a first mechanical arm fitted with an object grasping mechanism configured to select a locked banknote cashbox from a set of locked banknote cashboxes, each awaiting processing and/or handling by the banknote handling system. In one example, the set of locked banknote cashboxes can be contained, enclosed, or otherwise disposed relative to a cart, trolley, or other similar apparatus suitable to securely convey banknote cashboxes retrieved from slot machines and/or other electronic gaming machines on a casino floor to the banknote handling system. In some cases, a cart, trolley, or other similar apparatus can be mechanically anchored or otherwise secured to prevent movement of the apparatus while the first mechanical arm operates, but this may not be required.

Continuing the example introduced above, the first mechanical arm—and in particular the object grasping mechanism fitted to the first mechanical arm—can be positioned or posed by the controller to grasp a locked banknote cashbox. Once grasped, the first mechanical arm can move and/or reorient the locked banknote cashbox in a manner such that a second mechanical arm fitted with a key attachment can manipulate the position or pose of the key attachment to unlock the locked banknote cashbox held in place by, in one example, the first mechanical arm. In other embodiments, the first mechanical arm can be configured to obtain data or information from the locked banknote cashbox prior to positioning the locked banknote cashbox relative to the second mechanical arm. For example, the locked banknote cashbox may include one or more communication modules (e.g., near-field communications, Wi-Fi, Bluetooth, infrared, and so on) that are configured to communicate information about the content of the locked banknote cashbox. Such information can include, but may not be limited to: total banknotes; total value of all banknotes; serial numbers of all banknotes; images of all banknotes; denomination counts of banknotes; and so on. In other cases, obtaining information from the locked banknote cashbox may not be required.

Thereafter, in some embodiments, one of the first or second mechanical arms can be positioned and/or otherwise operated by the controller to open a lid or other closure of the locked banknote cashbox. Once opened, a third mechanical arm fitted with a gripper attachment can grip and withdraw a banknote stack disposed within the unlocked banknote cashbox. In many examples, the gripper can include one or more features to support stack of banknotes, preventing the stack from drooping or otherwise collapsing when removed from the unlocked banknote cashbox by the third mechanical arm.

Thereafter, the third mechanical arm can place the withdrawn stack of banknotes into a banknote sorting mechanism, a jogging mechanism, a banknote counting mechanism, a banknote binding or bundling mechanism, or any other suitable mechanism or container. In some cases, the third mechanical arm can be configured to convey the stack of banknotes from one mechanism to another. For example, the third mechanical arm can be configure to withdraw the stack of banknotes from the unlocked banknote cashbox, position the stack of banknotes in a hopper of a banknote counting mechanism, grasp the stack of banknotes once counted by the banknote counting mechanism, position the counted stack of banknotes in a hopper of a banknote sorting mechanism, grasp at least one sorted stack of counted banknotes, position the at least one sorted stack of counted banknotes into a hopper of a banknote binding mechanism, and so on.

Thereafter, once the unlocked banknote cashbox is emptied of banknotes by the third mechanical arm, the first and second mechanical arms can be manipulated by the controller to relock the banknote cashbox and position the empty and locked banknote cashbox onto a cart or trolley.

These and other embodiments are discussed below with reference to FIGS. 1-35. However, those skilled in the art will readily appreciate that the detailed description given herein with respect to these figures is for explanatory purposes only and should not be construed as limiting.

Generally and broadly, FIG. 1-7 depict a portion of a banknote handling system configured to grasp and withdraw stacks of banknotes from a banknote cashbox, such as described herein. It may be appreciated that the specific examples described below are not limited to the precise forms described below. In other words, for simplicity of description and illustration, the following specific examples are provided however, a person of skill in the art may appreciate that modifications, substitutions, and adjustments may be suitable.

For example, as depicted in FIG. 1, an object grasping mechanism 100, such as described herein, and is fitted to a mechanical arm RA. As depicted in FIG. 1, the object grasping mechanism 100 includes a movable gripper 110, a fixed gripper 120, a reciprocating mechanism 130, a pressing portion 140, a reciprocating mechanism 150, a movable support 160, a movable support biasing member 170, a connector 180, and an imaging unit 190.

The movable gripper 110 includes a base portion 111 and a protrusion 112. The base portion 111 in many embodiments is a rigid plate having, in one example, a substantially trapezoidal shape. The protrusion 112, in many embodiments, can be implemented as a rigid plate having an elongated rectangular shape and extends forward from the side surface on the short side of the base portion 111. The movable gripper 110 is fixed to a movable plate 132 at the long side of the base portion 111 of the reciprocating mechanism 130.

The fixed gripper 120 includes a base portion 121 and a protrusion 122. The base portion 121 can be implemented as a rigid plate having a rectangular shape. The protrusion 122 can be implemented as rigid plate having an elongated rectangular shape. In the illustrated embodiment, the protrusion 122 extends forward from a central side of a front of the base 121.

Figure 2:
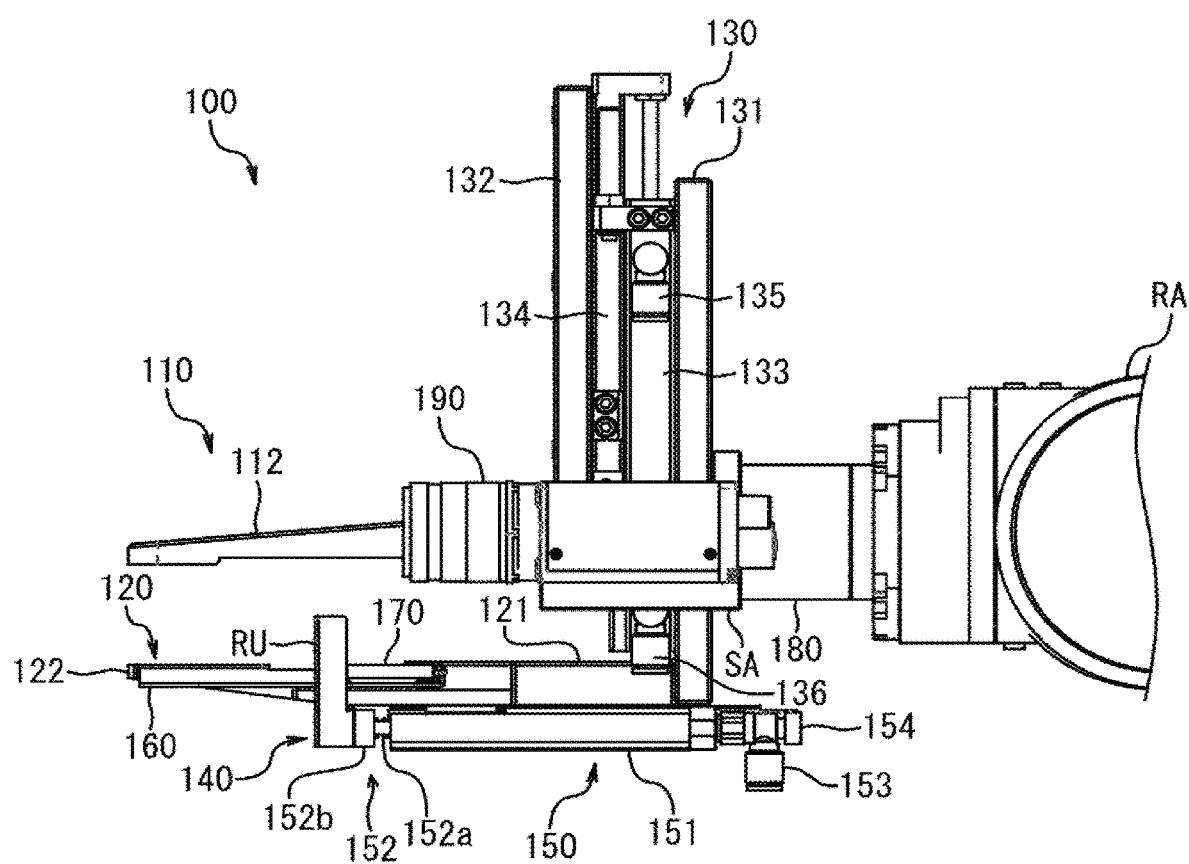
FIG. 2 is a right-side view of the object grasping mechanism, such as described herein, in a pressing portion standby state.
Figure 3:
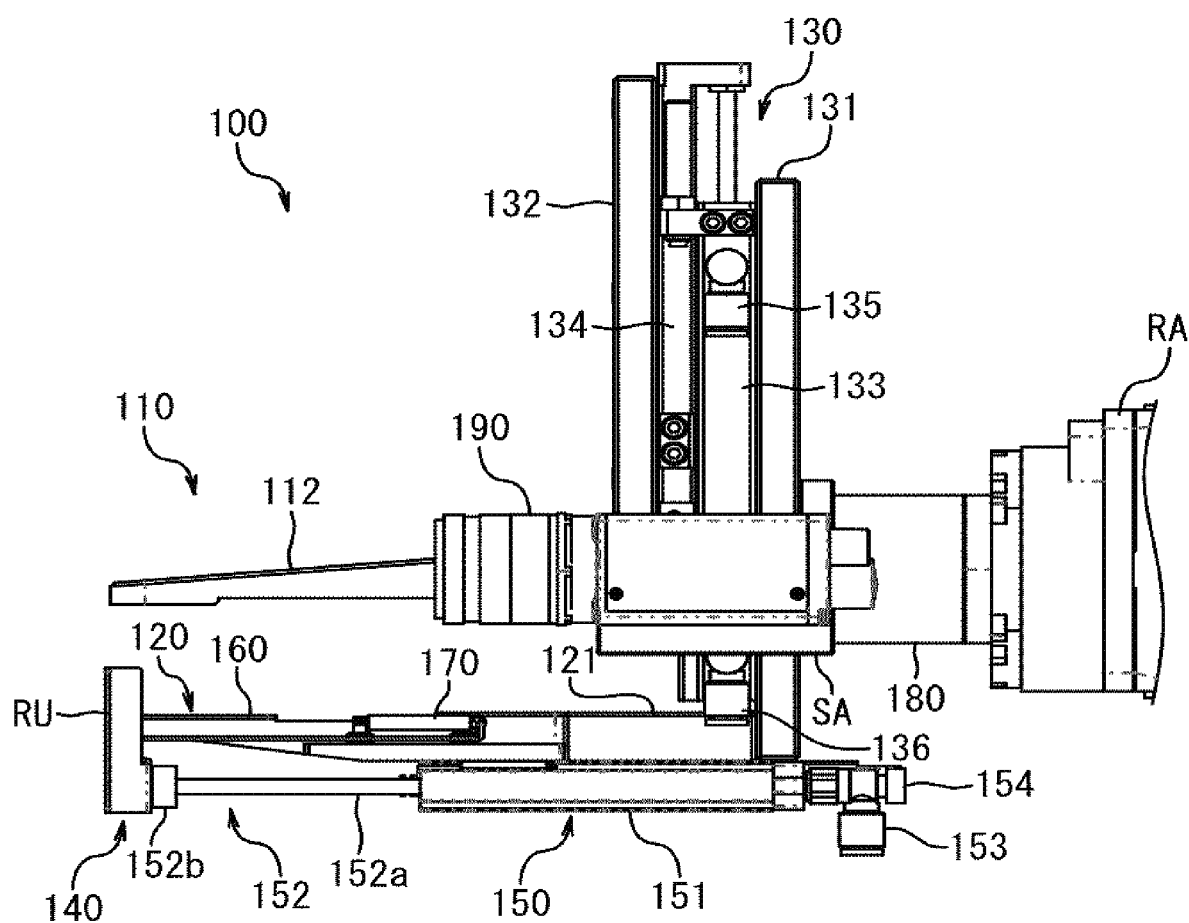
FIG. 3 is a right-side view of the object grasping mechanism, such as described herein, in a pressing portion projecting state.

As depicted in FIGS. 1-3, the reciprocating mechanism 130 includes a support plate 131, a movable plate 132, a hydraulic or pneumatic mechanism, identified as the actuator mechanism 133, and a movable table 134.

In the illustrated embodiment, the support plate 131 supports the actuator mechanism 133. The actuator mechanism 133 imparts a driving force for elevating or lowering the movable table 134. The actuator mechanism 133 is attached to the support plate 131, as noted above.

The movable plate 132 is attached to the movable table 134. In other words, the actuator mechanism 133 elevates or lowers the movable plate 132 by elevating or lowering the movable table 134. As depicted in FIGS. 2 and 3, the actuator mechanism 133 has an air supply (or other gas or liquid source) and exhaust openings 135 and 136.

As depicted in FIGS. 1-3, the pressing portion 140, which can be a substantially concave plate member, is attached to a connection piece 152b of a piston 152 of the reciprocating mechanism 150 such that upright portions RU on both sides extend toward the movable gripper. In this manner, the pressing portion 140 reciprocates by action of the reciprocating mechanism 150.

The reciprocating mechanism 150 includes a cylinder block 151, a piston 152, an air supply and exhaust opening 153 and a knob 154, as depicted in FIG. 1. The cylinder block 151, which in the illustrated embodiment has a substantially rectangular shape, is coupled to the side opposite to the side of the fixed gripper 120 facing the movable gripper 110.

In some embodiments, one or more rows of cylindrical holes or apertures (not depicted) can be formed along the longitudinal direction inside the cylinder block 151. The piston 152 includes a pair of pistons 152a and a connecting piece 152b. The pair of pistons 152a extends in parallel in the same direction from a surface of the connecting piece 152b. In these examples, each of the pair of pistons 152a is inserted into the two rows of cylinder holes.

In some embodiments, the pressing portion 140 is joined to a side of the connecting piece 152b, which can be a side opposite to the piston extension side of the connecting piece 152b. The air supply and exhaust openings 153 are each provided on opposite sides. Air supply and exhaust tubes (not depicted) can be each connected to those air supply and exhaust openings 153.

The knob 154 is attached to each of the air supply and exhaust openings 153. The knob 154, which can be used for adjusting air supply volume or air exhaust volume, can be configured to adjust an elevating or lowering speed of the movable table 134, which—in some embodiments—can be identical to an elevating or lowering speed of the movable plate 132.

The reciprocating mechanism 150, which can be implemented as described above, allows the pressing portion 140 to be reciprocated (along the front-back direction) by introducing and/or exhausting air or another liquid or gas.

As depicted in FIG. 1, the movable support 160 is biased forward by the movable support biasing member 170. Also, in this embodiment, an upper surface of the tip of the movable support 160 can be defined with respect to a surface including an upper surface of the tip of the protrusion 122 of the fixed gripper 120 (a surface facing the movable gripper 110). In other embodiments, the upper surface of the tip of the movable support 160 may be disposed slightly lower than the upper surface of the tip of the protrusion 122 of the fixed gripper 120.

As depicted in FIG. 1, the movable support biasing members 170, each of which can be a coil spring or other suitable biasing member, are disposed on both sides of the protrusion 122 of the fixed gripper 120 and on the rear side of the movable support 160. In this manner, the movable support biasing members 170 bias the movable support 160 toward the front of the object grasping mechanism 100. In other words, when the movable support 160 is released after the movable support 160 is pushed rearward, the movable support 160 is pushed back to the initial position by the movable support biasing member 170.

The connector 180, which can be a portion for connecting the object grasping mechanism 100 to the mechanical arm RA, is a flange or the like, for example.

As depicted in FIGS. 1 to 3, the imaging unit 190, which can be, for example, a compact camera such as a charge-coupled device or complementary metal oxide semiconductor camera, can be fixed to the right side of the reciprocating mechanism 130 by a support arm SA extending from the support plate 131 of the reciprocating mechanism 130. As a result of this construction, the imaging unit 190 can be configured to intermittently capture images to transmit electronic data corresponding to one or more captured images to a controller (not depicted).

In an example, a case in which the mechanical arm RA having the object grasping mechanism 100, such as described herein, takes a bundle of banknotes out of a banknote container (also referred to as a banknote cashbox, as noted above), and conveys the bundle of banknotes to a placing tray or hopper of a banknote sorting device.

Figure 4:
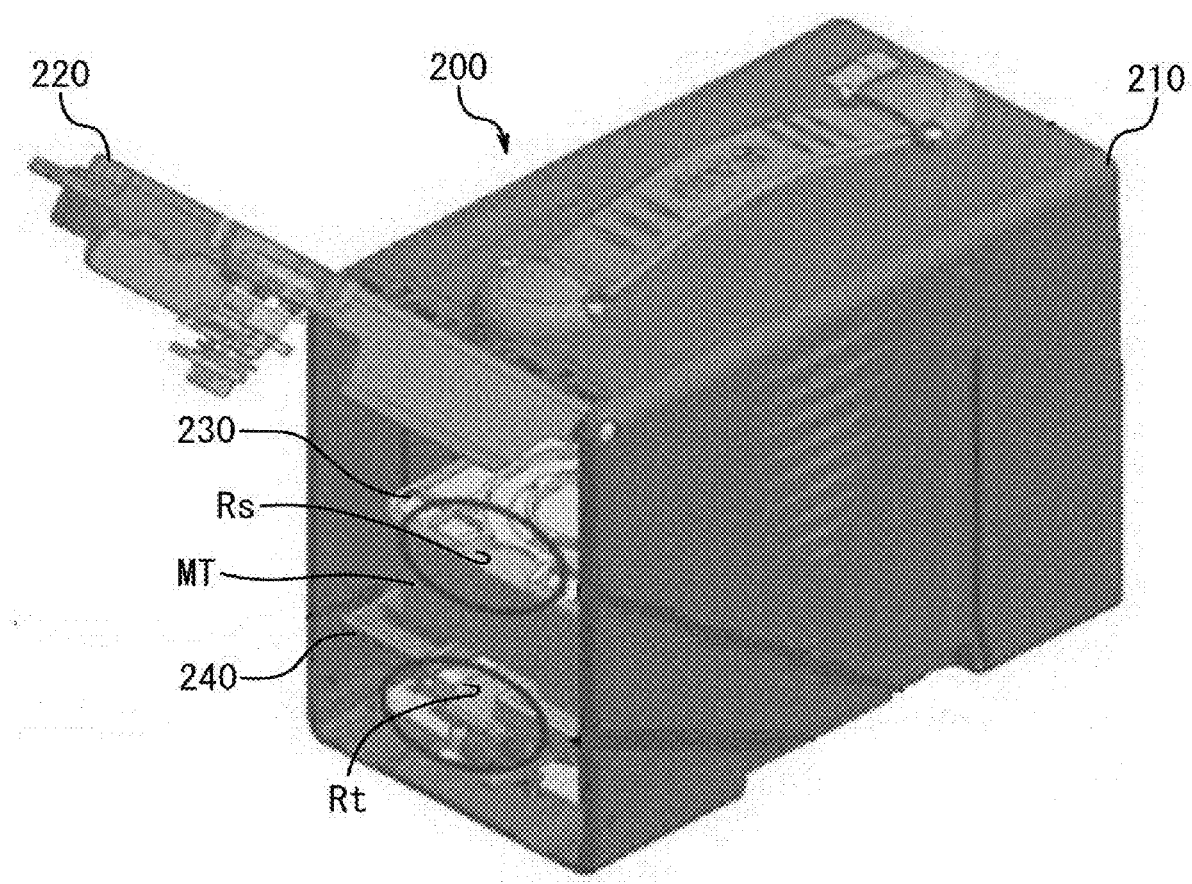
FIG. 4 is a perspective view of a banknote container for accommodating a bundle of banknotes to be taken out by the object grasping mechanism, such as described herein.
Figure 5:
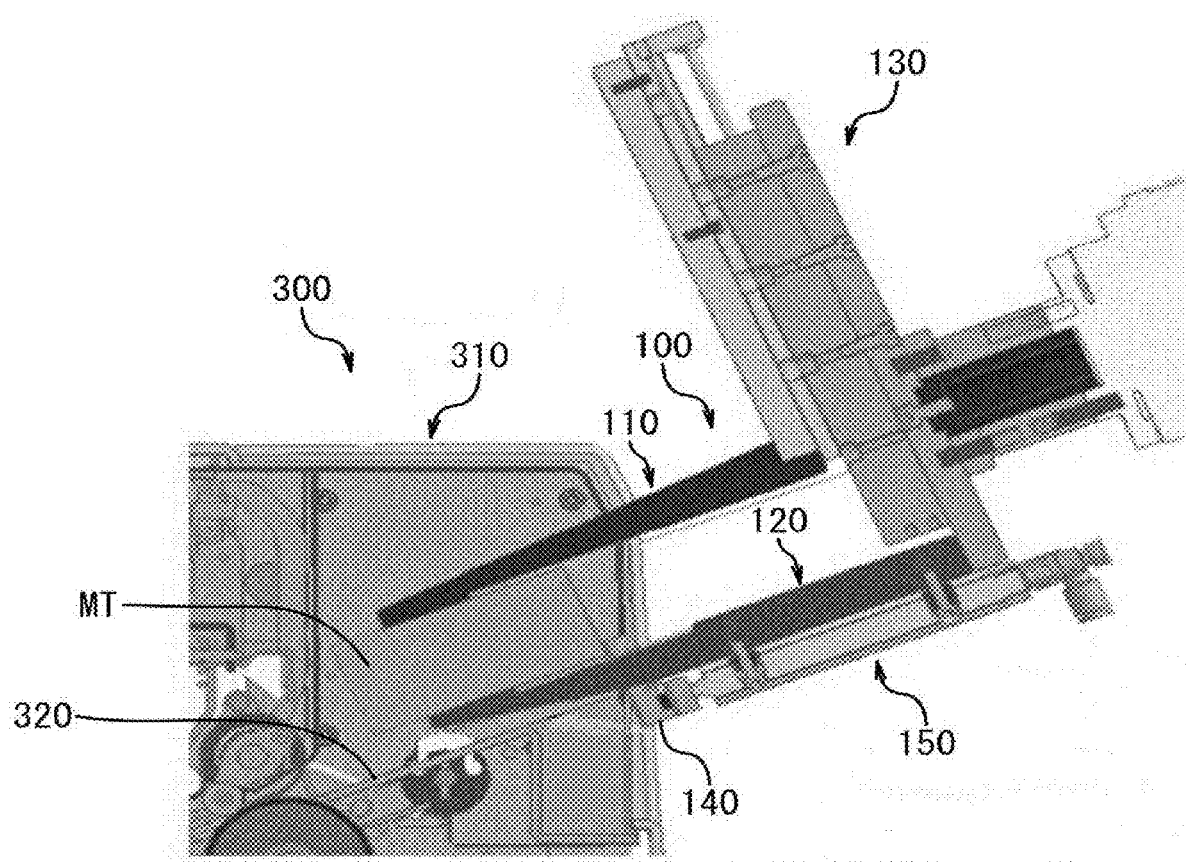
FIG. 5 is a cross-sectional view showing a state in which the object grasping mechanism, such as described herein, places a bundle of banknotes in a placing tray of a banknote sorting device.

The banknote container 200 depicted in FIG. 4 is employed as an example of the banknote container, and a placing tray 320 of a banknote sorting device 300 depicted in FIG. 5 is employed as an example of the placing tray of the banknote sorting device.

Before describing the mechanical arm RA having the object grasping mechanism 100, the banknote container 200 and the banknote sorting device 300 will be described. In many embodiments, the mechanical arm RA is, for example, a multi-axis robot arm.

As depicted in FIG. 4, the banknote container 200 includes a case 210, a front lid 220, an upper support plate 230 and a lower support plate 240. As depicted in FIG. 1, the case 210 is a rectangular box that opens toward a front side. In these embodiments, the front lid 220 is a substantially rectangular plate member and is axially supported on the upper side of the opening edge of the case 210 so as to be opened and closed by an opening and closing mechanism such as a hinge.

The upper support plate 230 is a member for sandwiching a bundle of banknotes MT in cooperation with the lower support plate 240, and is disposed so as to be vertically movable slightly above the center in the height direction of the case 210, as depicted in FIG. 1.

A semicircular notch Rs is formed at the front center of the upper support plate 230. The lower support plate 240 is a member that cooperates with the upper support plate 230 to grasp the bundle of banknotes MT, and is fixed to the lower side of the case 210 as depicted in FIG. 1.

A slit Rt is formed at the center in the width direction of the lower support plate 240. In the banknote container 200, such as described herein, the upper support plate 230 is biased downward by a biasing member (e.g., coil spring or the like) disposed on the upper side of the support plate 230; that is, the bundle of banknotes MT to be accommodated in the banknote container 200 are pressed against the lower support plate 240 by the upper support plate 230.

The banknote sorting device 300 is a device for counting various kinds of denominations while sorting, by denomination, the bundle of banknotes MT accommodated in the banknote container 200. As depicted in FIG. 5, the banknote sorting device 300 includes a body 310 and a placing tray 320. A banknote sorting mechanism that counts various kinds of denominations while sorting, by denomination, the bundle of banknotes MT supplied from the placing tray 320 is disposed in the body 310.

The placing tray 320 is for placing the bundle of banknotes MT and can be disposed beside a banknote suction mechanism of the banknote sorting mechanism. In other words, when a banknote detection sensor of the banknote suction mechanism of the banknote sorting mechanism detects the bundle of banknotes MT placed on the placing tray 320, the bundle of banknotes MT are automatically sucked into the banknote sorting mechanism by a banknote suction device.

When the mechanical arm RA having the object grasping mechanism 100 takes the bundle of banknotes MT out of the banknote container 200 and moves the bundle of banknotes MT to the placing tray 320 of the banknote sorting device 300, the mechanical arm RA having the object grasping mechanism 100 operates, in one example, as follows.

First, the controller controls the operation of the mechanical arm RA to move the object grasping mechanism 100 to a prescribed position and to direct it toward a prescribed direction. Note that the prescribed position is a position on the front side of the container 200, and the prescribed direction is a direction in which the imaging unit 190 is able to capture the front of the banknote container 200.

Figure 6:
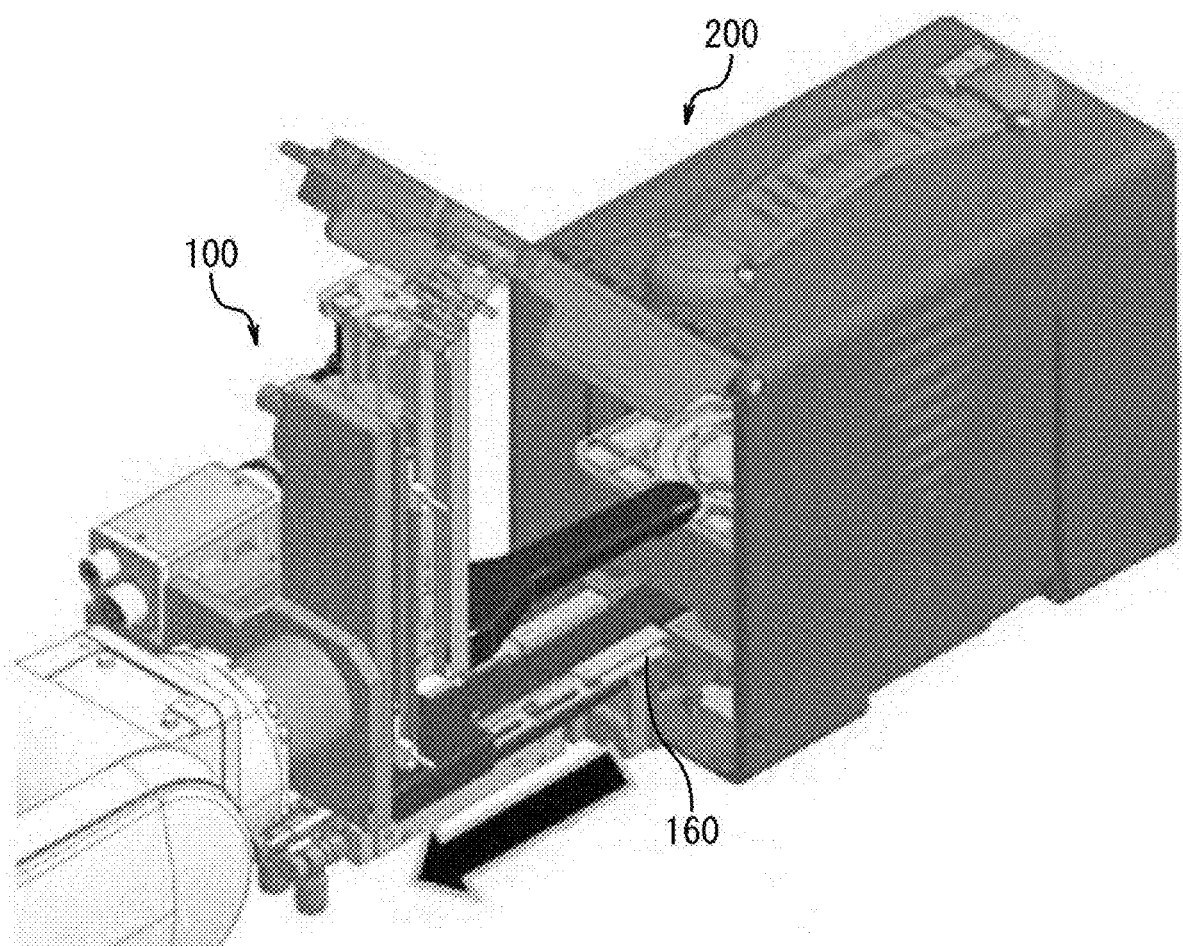
FIG. 6 is a perspective view showing a state of a movable support when a gripper of the object grasping mechanism, such as described herein, is inserted into the banknote container.

Next, the controller controls the mechanical arm RA and the object grasping mechanism 100 to elevate the movable gripper 110 to the highest position, and then inserts the tip of the fixed gripper 120 into the slit Rt of the lower support plate 240. At that time, the movable gripper 110 is positioned above the notch Rs of the upper support plate 230. Also, at that time, the movable support 160 contacts the wall portions on both sides of the slit Rt of the lower support plate 240 and moves backward, as depicted in FIG. 6.

Figure 7:
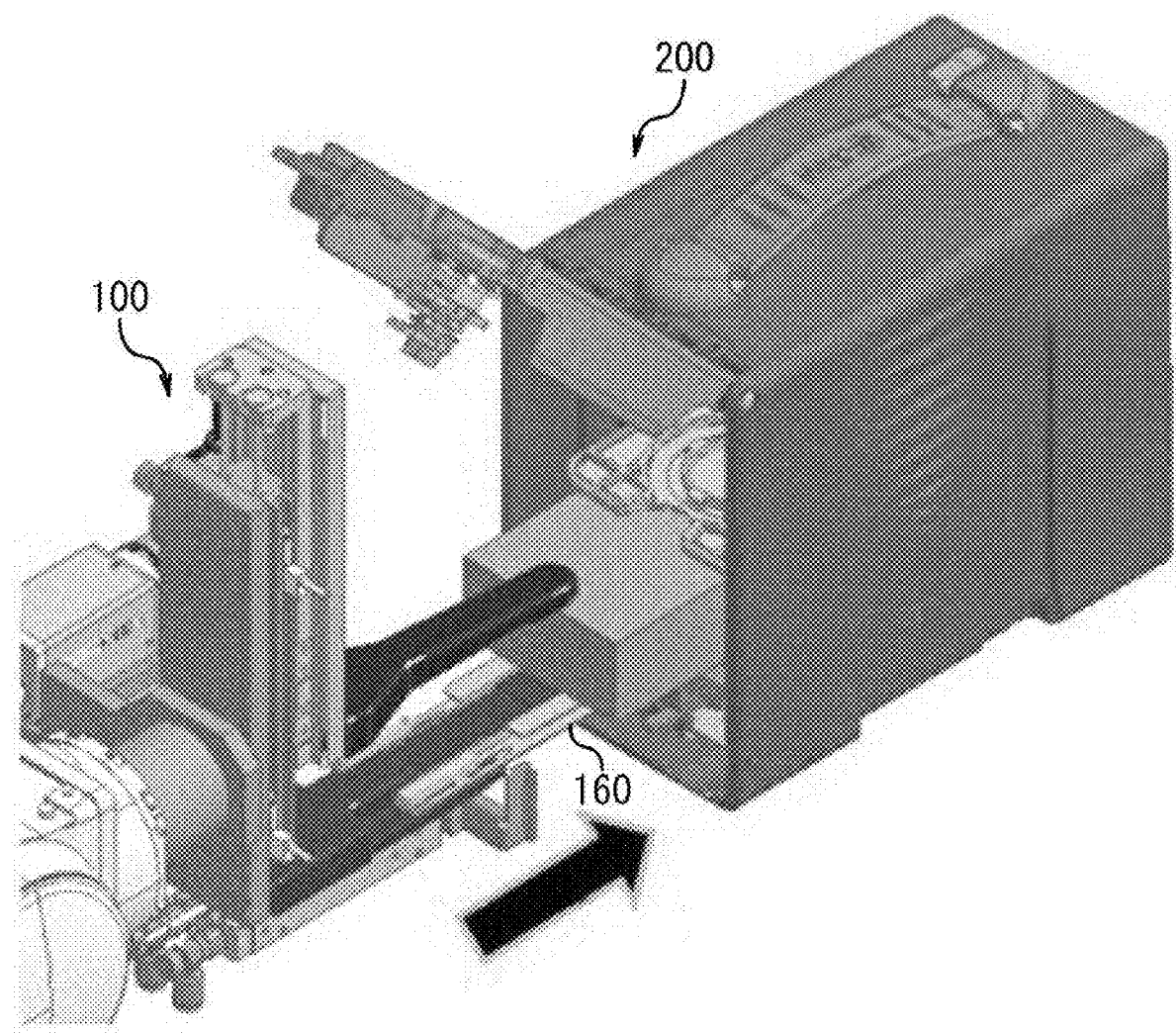
FIG. 7 is a perspective view showing a state of the movable support when the gripper of the object grasping mechanism, such as described herein, is pulled out from the banknote container.

Next, the controller moves the movable gripper 110 downward to grasp the bundle of banknotes MT together with the fixed gripper 120. The controller controls the operation of the mechanical arm RA to move the object grasping mechanism 100 backward and take the bundle of banknotes MT out of the banknote container 200. Note that as depicted in FIG. 7, as the object grasping mechanism 100 moves backward, the movable support 160 is moved forward.

Subsequently, as depicted in FIG. 5, the controller controls the mechanical arm RA to insert the object grasping mechanism 100 from the front end side to the back side of the placing tray 320 of the banknote sorting device 300, and then activates the reciprocating mechanism 150 to move the pressing portion 140 forward; in addition to that, the controller controls the reciprocating mechanism 130 to elevate the movable gripper 110 upward and release the bundle of banknotes MT.

While the pressing portion 140 is moving forward, the controller controls the mechanical arm RA to elevate the object grasping mechanism 100 obliquely backward while maintaining the inclination angle of the object grasping mechanism 100. This operation completes conveyance of the bundle of banknotes MT to the placing plate 320 of the banknote sorting device 300. After completing conveyance of the bundle of banknotes MT, the controller activates the reciprocating mechanism 150 to push back the pressing portion 140 backward; during such operation, the controller controls the operation of the mechanical arm RA to move the object grasping mechanism 100 to the prescribed position and direct it to the prescribed direction. Subsequently, as described above, a bundle of banknotes MT is taken out of the next banknote container 200 conveyed to the same position, and then the bundle of banknotes MT are conveyed to the placing tray 320 of the banknote sorting device 300.

The pressing portion 140 and the reciprocating mechanism 150 are provided with the object grasping mechanism 100, such as described herein,. The object grasping mechanism 100, such as described herein, is attached to the mechanical arm RA and the controller. The controller controls the mechanical arm RA to insert the object grasping mechanism 100 from the front end side to the back side of the placing tray 320 of the banknote sorting device 300 (refer to FIG. 5), and then introducing air into the cylinder holes of the reciprocating mechanism 150 causes the pressing portion 140 to move forward; in addition, the controller controls the reciprocating mechanism 130 to elevate the movable gripper 110 upward and release the bundle of banknotes MT. This allows the object grasping mechanism 100 to place all the bundles of banknotes MT to the placing tray 320 of the banknote sorting device 300.

The object grasping mechanism 100, such as described herein, can be provided with the movable support 160 and the movable support biasing member 170. Thus, when a bundle of banknotes MT are sandwiched between the support plates 230 and 240 with a slim slit Rt only, the object grasping mechanism 100 can pick out the bundle of banknotes MT, and subsequently can stabilize the attitude of the bundle of banknotes MT.

The mechanical arm RA having the object grasping mechanism 100 of the above embodiment is controlled by the controller such that after inserting the object grasping mechanism 100 from the front end side to the back side of the placing tray 320 of the banknote sorting device 300, the pressing portion 140 is moved forward and the movable gripper 110 is elevated upward to release the bundle of banknotes MT; however, it may be controlled such that after moving the object grasping mechanism 100 to the front side portion of the tray 320 of the banknote sorting device 300, the movable gripper 110 is elevated upward to release the bundle of banknotes MT, and then after pushing the pressing portion 140 forward, the object grasping mechanism 100 is moved backward.

The mechanical arm RA having the object grasping mechanism 100 of the above embodiment can be controlled by the controller such that after moving the movable gripper 110 downward and grasping the bundle of banknotes MT together with the fixed gripper 120, the object grasping mechanism 100 is moved backward and the bundle of banknotes MT are taken out of the banknote container 200; however it may be controlled such that after the object grasping mechanism 100 grasps the bundle of banknotes MT with the movable gripper 110 and the fixed gripper 120, the object grasping mechanism 100 moves backward by a certain distance to pull out the bundle of banknotes MT to the front by a certain length and then release the bundle of banknotes MT, and the object grasping mechanism 100 grasps again the portion of the bundle of banknotes MT that has been pulled out. This allows the length of the bundle of banknotes MT that is held by the object grasping mechanism 100 to be longer, thereby making the grasping state by the object grasping mechanism 100 more stable.

In the object grasping mechanism 100 of the above embodiment, the pressing portion 140 and the reciprocating mechanism 150 are disposed on the side opposite to the movable gripper facing side of the fixed gripper 120; however, the pressing portion 140 and the reciprocating mechanism 150 may be disposed on the side opposite to the fixed gripper facing side of the movable gripper 110, or they may be disposed between the movable gripper 110 and the fixed gripper 120. Note that when the pressing portion 140 and the reciprocating mechanism 150 are disposed between the movable gripper 110 and the fixed gripper 120, it is preferable that an accommodating space for the pressing portion 140 and the reciprocating mechanism 150 is formed at the rear of the movable gripper 110 and the fixed gripper 120 so as not to obstruct the grasping operation by the movable gripper 110 and the fixed gripper 120.

In the object grasping mechanism 100 of the above embodiment, the tension coil spring is employed as the movable support biasing members 170; alternatively, other biasing parts such as an air spring or biasing mechanism may be employed.

In the object grasping mechanism 100 of the above embodiment, the movable supports 160 are disposed on both sides of the fixed gripper 120; however, the movable support 160 may be disposed only on one side of the fixed gripper 120.

In the object grasping mechanism 100 of the above embodiment, the movable supports 160 and the movable support biasing members 170 are disposed adjacent to the fixed gripper 120; however, the movable supports 160 and the movable support biasing members 170 may be disposed adjacent to the movable gripper 110, or may be disposed adjacent to both of the fixed gripper 120 and the movable gripper 110. In the latter case, sets of the movable supports 160 and the movable support biasing members 170 may be each provided so as to be adjacent to the fixed gripper 120 and the movable gripper 110.

In the object grasping mechanism 100 of the above embodiment, the fixed gripper 120 is fixed and only the movable gripper 110 is movable; however, the fixed grippers 120 may also be movable like the movable grippers 110.

In the object grasping mechanism 100 of the illustrated embodiment, the actuator mechanism is employed as the reciprocating mechanism 130 ; however, mechanisms like a known reciprocating mechanism such as a rack and pinion mechanism, a ball screw mechanism, an actuator mechanism, a motor cylinder mechanism, an electric slider mechanism, a belt slider mechanism and a linear slider mechanism may be employed as the reciprocating mechanism 130. In such a case, an electric motor may be employed as a drive source.

In the object grasping mechanism 100 of the first embodiment, the actuator mechanism is employed as the reciprocating mechanism 150; however, mechanisms like a known reciprocating mechanism such as a rack and pinion mechanism, a ball screw mechanism, an actuator mechanism, a motor cylinder mechanism, an electric slider mechanism, a belt slider mechanism and a linear slider mechanism may be employed as the reciprocating mechanism 150. In such a case, an electric motor may be employed as a drive source.

Although not particularly mentioned in the first embodiment, the controller may analyze the front image of the banknote container 200 captured by the imaging unit 190 to determine the position of the notch Rs of the upper support plate 230 and the slit Rt of the lower support plate 240, then may control the mechanical arm RA and the object grasping mechanism 100 to adjust the position of the movable gripper 110, may insert the tip of the movable gripper 110 into the notch Rs of the upper support plate 230, and may insert the tip of the fixed gripper 120 into the slit Rt of the lower support plate 240.

The foregoing embodiments depicted in FIGS. 1-7 and the various alternatives thereof and variations thereto are presented, generally, for purposes of explanation, and to facilitate an understanding of various configurations and constructions of a banknote handling system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Generally and broadly, FIG. 8-12 depict another example portion of a banknote handling system configured to grasp and withdraw stacks of banknotes from a banknote cashbox, such as described herein. It may be appreciated that the specific examples described below are not limited to the precise forms described below. In other words, for simplicity of description and illustration, the following specific examples are provided however, a person of skill in the art may appreciate that modifications, substitutions, and adjustments may be suitable.

Figure 8:
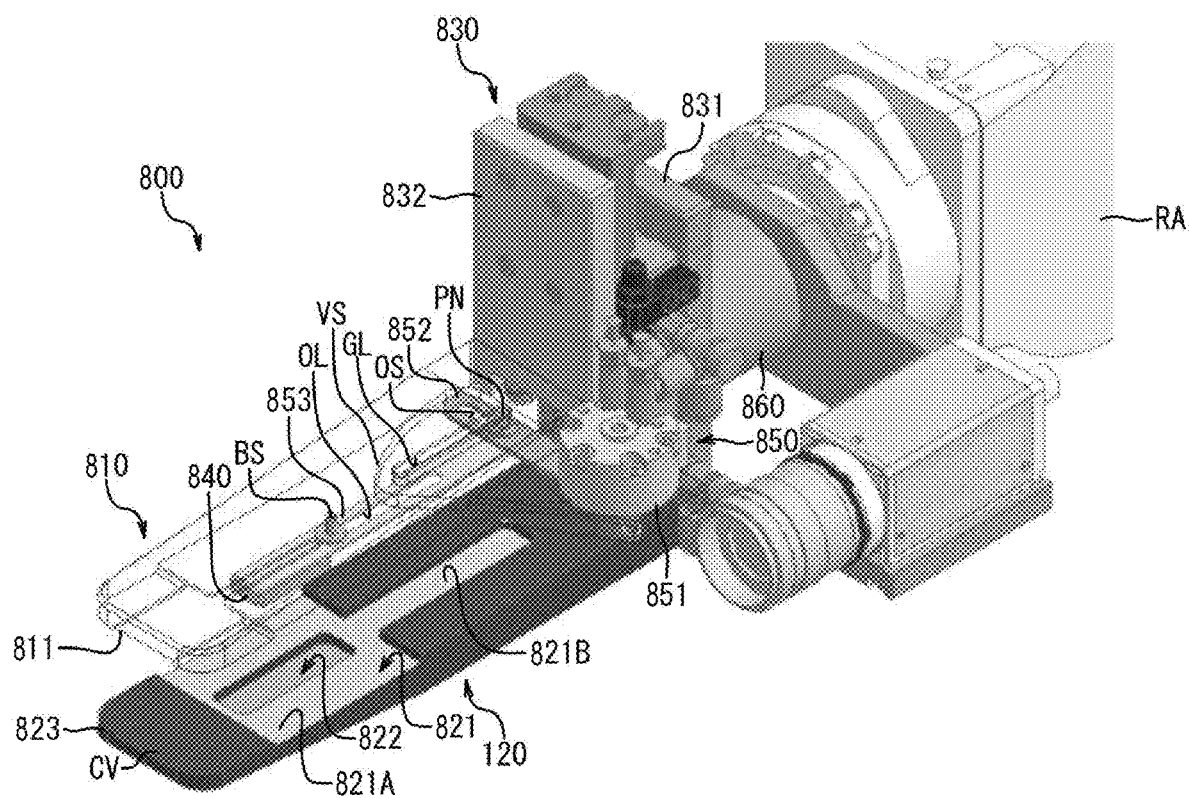
FIG. 8 is a perspective view of an object grasping mechanism, such as described herein.

As shown in FIG. 8, an object grasping mechanism 800 can be implemented as two gripper object grasping mechanism, and is disposed at the tip of a mechanical arm RA. The object grasping mechanism 800 includes a movable gripper 810, a fixed gripper 820, a reciprocating mechanism 830 , a protrusion 840, a protrusion reciprocating mechanism 850, and a connector 860.

The movable gripper 810, which can be implemented as a rigid plate with a substantially rectangular shape, is fixed to an elevating-lowering plate 832 of the reciprocating mechanism 830. In the movable gripper 810, screw holes (not shown) can be formed near the approximate center in the longitudinal direction and the width direction.

The fixed gripper 820, which can be implemented as a rigid plate with a substantially rectangular shape, is fixed to a support plate 831 of the reciprocating mechanism 830 . As shown in FIG. 8, the fixed gripper 820 faces the movable gripper 810 in the reciprocating direction of the movable gripper 810.

The first recess 821 has a substantially T-shape and is formed by a distal end side portion 821A and a proximal end side portion 821B. As shown in FIG. 8, the distal end side portion 821A is formed in a position closer to the tip of the fixed gripper 820 on the side facing the movable gripper of the fixed gripper 820.

The distal end side portion 821A is formed over the entire width of the fixed gripper 820. Conversely, as shown in FIG. 8, the proximal end side portion 821B is formed in a position closer to the proximal end of the fixed gripper 820 on the side facing the movable gripper of the fixed gripper 820. The proximal end side portion 821B is formed at the widthwise central portion of the fixed gripper 820. The proximal end side portion 821B extends in the longitudinal direction from the widthwise central portion on the proximal end side of the distal end side portion 821A toward the proximal end side. For convenience of explanation, the function of this first recess will be described later.

The second recess 822 (with a substantially rectangular shape) is formed inside the distal end side portion 821A of the first recess 821. The second recess 822 plays a role of accommodating a part or the whole of the protrusion 840 in an accommodated state of the protrusion 840. In one embodiment, accommodating a part or the whole of the protrusion 840 in the second recess 822 achieves a state in which the tip side portion 811 of the movable gripper 810 can contact with the tip side portion 823 of the fixed gripper 820.

The tip side portion 823 has a shape in which portions on both sides along a width of the tip side portion 823 are raised more than the central portion; that is, it has a shape in which the central portion in the width direction is recessed. In other words, a recess CV is formed in the tip side portion 823.

The reciprocating mechanism 830 includes the support plate 831, the elevating-lowering plate 832, and an air cylinder mechanism (not shown). The support plate 831 supports the elevating-lowering plate 832 to be able to move up and down. The air cylinder mechanism serves as a drive source for elevating and/or lowering the elevating-lowering plate 832. Note that the reciprocating mechanism 830 can bring the movable gripper 810 close to the fixed gripper 820 until the protrusion 840 of the movable gripper 810 enters the recess CV of the tip side portion 823 of the fixed gripper 820 in a state of using the protrusion, which is described later.

As shown in FIG. 8, the protrusion 840, which can be implemented in a substantially rectangular parallelepiped shape, is formed at the tip of a front-back slide bar 853 of the protrusion reciprocating mechanism 850.

As shown in FIG. 8, the protrusion reciprocating mechanism 850, which can be implemented as a mechanism for reciprocating the protrusion 840 along a front-back direction, includes a rotary air cylinder 851, a pivot bar 852 and a front-back slide bar 853. As shown in FIG. 8, the rotary air cylinder 851 is disposed beside the reciprocating mechanism 830 such that a rotary shaft (not shown) extends downward along a direction parallel to an elevation direction of the movable gripper 810. The pivot bar 852 is attached to the rotary shaft of the rotary air cylinder 851. As shown in FIG. 8, the pivot bar 852 can be implemented as long rigid plate housed in a substantially fan-shaped recess VS formed on the back side of the movable gripper 810; one end thereof is attached to the rotary shaft of the rotary air cylinder 851, as described above.

As a result of this configuration, the pivot bar 852 can be pivoted around the rotary shaft of the rotary air cylinder 851 by the rotary air cylinder 851. A long hole OS extending along the longitudinal direction at the center in the width direction is formed at the other end portion of the pivot bar 852.

As shown in FIG. 8, the front-back slide bar 853 is an elongated rigid plate, and the protrusion 840 is formed at the tip of the front-back slide bar 853 as described above. In the front-back slide bar 853, a pin PN extending in the thickness direction at the proximal end portion is formed. As shown in FIG. 8, the pin PN is inserted into the linear guide groove GL formed on the back side of the movable gripper 810 through the long hole OL of the pivot bar 852. The linear guide groove GL is formed along a direction parallel to the extending direction of the front-back slide bar 853.

In the front-back slide bar 853, a long hole OL extending in the longitudinal direction at the center in the width direction of the tip end side is formed. As shown in FIG. 8, a screw BS is passed through the long hole OL from the lower side, and the screw BS is screwed into a screw hole of the movable gripper 810. The screw BS is fixed so as to form a gap to such an extent that the front-back slide bar 853 can be reciprocated.

Similar to other embodiments described herein, configuring the protrusion reciprocating mechanism 850 as described above allows the protrusion 840 to be reciprocated along the front-back direction by the normal rotation and/or reverse rotation drive of the rotary air cylinder 851. As a result, it is possible to switch states for the object grasping mechanism 800 between a state in which the protrusion is accommodated shown in FIG. 8 and a state in which the protrusion is in use shown in FIG. 9.

The connector 860 can be implemented as part for connecting the object grasping mechanism 800 with the mechanical arm RA; for example, it can be implemented as flange or the like.

Figure 9:
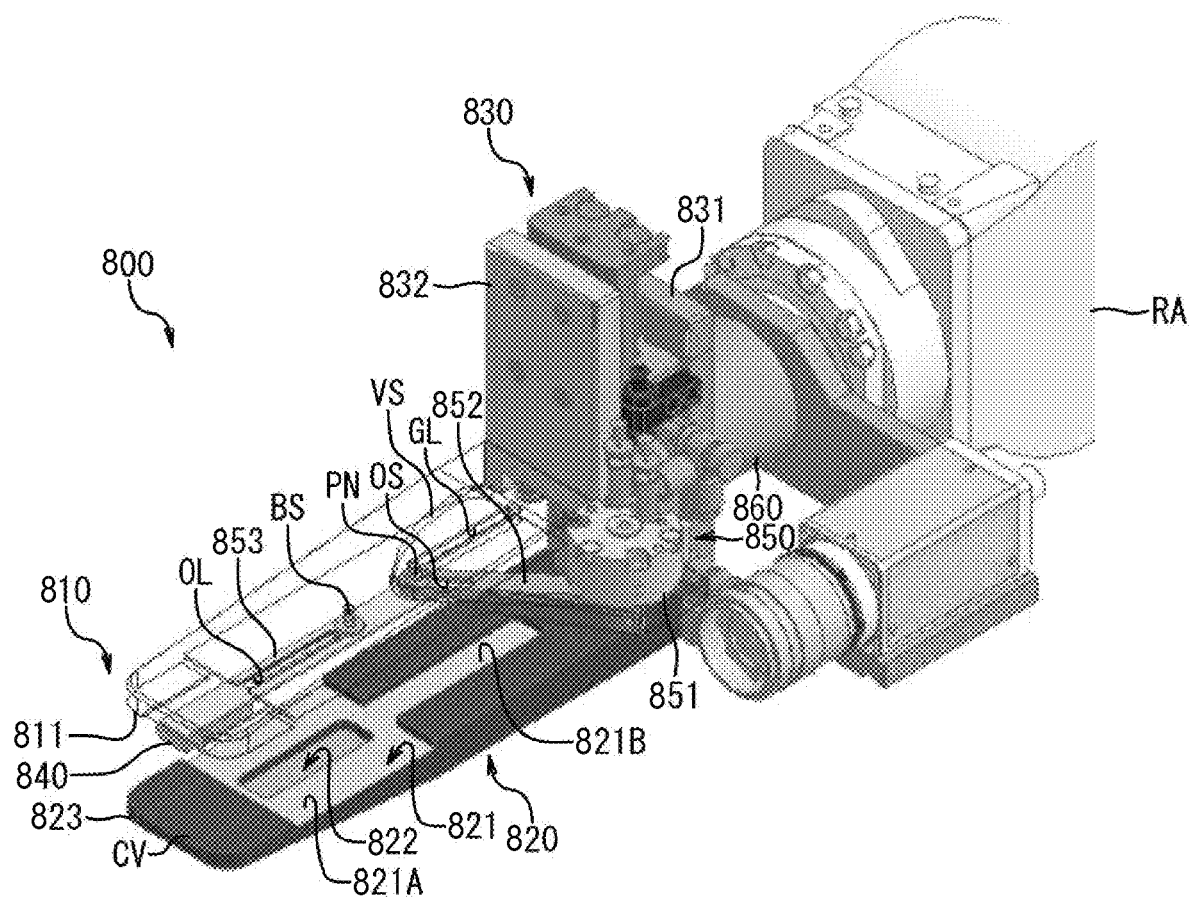
FIG. 9 is a perspective view of the object grasping mechanism of FIG. 8, such as described herein.

In this manner, when the rotary air cylinder 851 is normally rotated in the state shown in FIG. 8, that is, in the state in which the protrusion is accommodated, the protrusion 840 moves forward to the tip side portion 811 of the movable gripper 810, thereby switching the state of the object grasping mechanism 800, such as described herein, to the state shown in FIG. 9, that is, the state in which the protrusion is in use.

Figure 10:
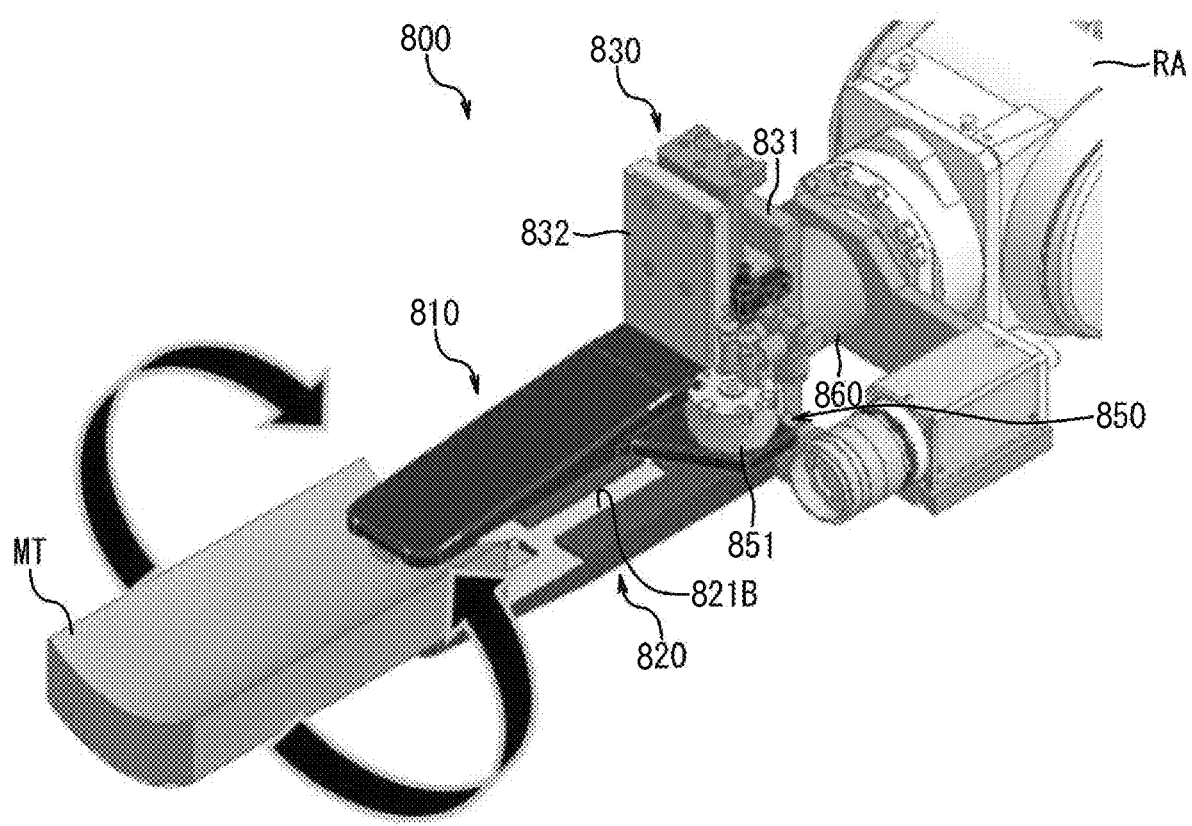
FIG. 10 shows a state in which the object grasping mechanism of FIG. 8 grasps a bundle of banknotes when the protrusion of the object grasping mechanism is in use, such as described herein.

As shown in FIG. 10, the object grasping mechanism 800 grasps an object, which may be prone to droop, such as a bundle of banknotes or the like in this state, thereby allowing for making the object upwardly warped and preventing the object from drooping. Note that this is achieved by cooperation of the protrusion 840 and the tip side portion 823 of the fixed gripper 820.

In contrast, the rotary air cylinder 851 is reversely rotated in the state shown in FIG. 9, that is, in the state in which the protrusion is in use, the protrusion 840 retracts toward the proximal side of the movable gripper 810, thereby switching the state of the object grasping mechanism 800 to the state shown in FIG. 8, that is, the state in which the protrusion is accommodated. In this state, the object grasping mechanism 800 can grasp an object with the tip side portion 811 of the movable gripper 810 and the tip side portion 823 of the fixed gripper 820. Note that the object grasping mechanism 800 can contact the tip side portion 811 of the movable gripper 810 with the tip side portion 823 of the fixed gripper 820 even when the object grasping mechanism 800 is in the state in which the protrusion is accommodated.

In view of the foregoing examples, it may be appreciated that, generally and broadly, the object grasping mechanism 800 is designed to operate as follows: in this state, when the movable gripper 810 is moved toward the fixed gripper 820, the protrusion 840 is accommodated in the second recess 822 of the fixed gripper 820 and the front-back slide bar 853 of the protrusion reciprocating mechanism 850 is accommodated in the first recess 821 of the fixed gripper 820.

As described above, in the object grasping mechanism, such as described herein, when the rotary air cylinder 851 is normally rotated in the state in which the protrusion is accommodated, the protrusion 840 moves forward to the tip side portion 811 of the movable gripper 810, thereby switching the state of the object grasping mechanism 800 to the state in which the protrusion is in use. As shown in FIG. 10, the object grasping mechanism 800 grasps the object MT, thereby allowing for warping of the object MT upwardly and preventing the object MT from drooping.

In contrast, the rotary air cylinder 851 is reversely rotated in the state in which the protrusion is in use, the protrusion 840 retracts toward the proximal side of the movable gripper 810, thereby switching the state of the object grasping mechanism 800 to the state in which the protrusion is accommodated. In this state, the object grasping mechanism 800 can grasp an object with the tip side portion 811 of the movable gripper 810 and the tip side portion 823 of the fixed gripper 820. In other words, the object grasping mechanism 800 can also grasp the object without making the object upwardly warped.

In the object grasping mechanism 800, such as described herein, the protrusion 840 and the protrusion reciprocating mechanism 850 are provided in the movable gripper 810, and the first recess 821 and the second recess 822 are formed in the fixed gripper 820; however, the protrusion 840 and the protrusion reciprocating mechanism 850 may be provided in the fixed gripper 820 and the first recess 821 and the second recess 822 may be formed in the movable gripper 810. Note that in such a case, the object grasping mechanism 800 is turned upside down.

In the object grasping mechanism 800, such as described herein, the fixed grippers 820 are fixed and only the movable gripper 810 moves, but the fixed gripper 820 may also be movable like the movable gripper 810.

The air cylinder mechanism is employed as the reciprocating mechanism 830 in the object grasping mechanism 800, such as described herein; however, as the reciprocating mechanism 830, known reciprocating mechanisms, such as a rack and pinion mechanism, a ball screw mechanism, an air cylinder mechanism, a motor cylinder mechanism, an electric slider mechanism, a belt slider mechanism and a linear slider mechanism, may be employed. In such a case, an electric motor may be employed as a drive source.

In the object grasping mechanism 800, such as described herein, the reciprocating mechanism 830 can move the movable gripper 810 closer to the fixed gripper 820 in the state in which the protrusion is in use until the protrusion 840 of the movable gripper 810 enters the recess CV of the tip side portion 823 of the fixed gripper 820; however, in a case when it is known in advance that an object to be grasped by the object grasping mechanism 800 is relatively thick enough that the protrusion 840 of the movable gripper 810 cannot enter the recess CV of the tip side portion 823 of the fixed gripper 820, the lower limit position for the movement stroke of the movable gripper 810 with the reciprocating mechanism 830 may be set at a position above the fixed gripper 820 (that is, the lower limit position for the movement stroke of the movable gripper 810 may be set at a position where the protrusion 840 of the movable gripper 810 does not enter the recess CV of the tip side portion 823 of the fixed gripper 820).

In the object grasping mechanism 800, such as described herein, the rotary air cylinder 851 is employed as a drive source for moving the protrusion 840 back and forth, but instead of the rotary air cylinder 851, an electric motor capable of normal rotation and reverse rotation is employed.

In the object grasping mechanism 800, such as described herein, the link mechanism is employed as the protrusion reciprocating mechanism 850, but a known mechanism as the protrusion reciprocating mechanism 850 may be employed.

An object grasping mechanism according to another embodiment is the same as the object grasping mechanism 800, such as described herein, except that the protrusion portion reciprocating mechanism 850 does not exist and the protrusion 840 is always fixed to the tip side portion 811 of the movable gripper 810.

In other embodiments, an object grasping mechanism 900 is the same as the object grasping mechanism described above except for the shapes of the movable gripper and the fixed gripper. Thus, for the object grasping mechanism 900 as described herein, only a movable gripper 910 and a fixed gripper 920 will be described.

Figure 11:
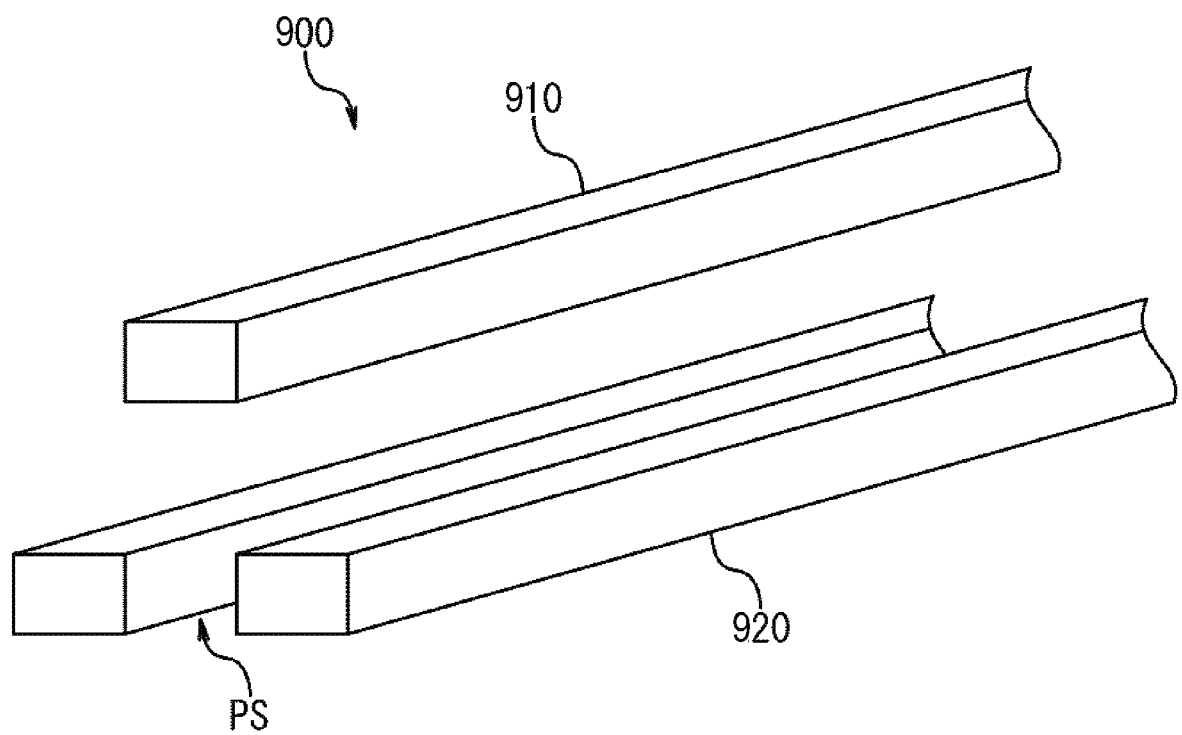
FIG. 11 is a perspective view of a gripper of an object grasping mechanism, such as described herein.

As shown in FIG. 11, the movable gripper 910 has a rectangular bar shape. On the other hand, the fixed grippers 920 have a pair of rectangular bar shapes parallel to each other. A slit PS is formed between the pair of fixed grippers 920. The width of the slit PS is designed to be slightly wider than the width of the movable gripper 910. The reciprocating mechanism 830 allows the movable gripper 910 to enter the inside of the slit PS of the fixed gripper 920. Thus, like the object grasping mechanism 800, such as described herein, the object grasping mechanism 900 as described herein makes an object MT upwardly warped and prevents the object MT from drooping.

The movable gripper 910 and the fixed gripper 920 of the object grasping mechanism 900 as described herein do not necessarily have a rectangular bar shape, and may be a round bar shape or another bar shape.

An object grasping mechanism 1000 according to another embodiment is the same as the object grasping mechanism as described above except for the shapes of the movable gripper and the fixed gripper. Thus, for the object grasping mechanism 1000 as described herein, only a movable gripper 1010 and a fixed gripper 1020 will be described.

Figure 12:
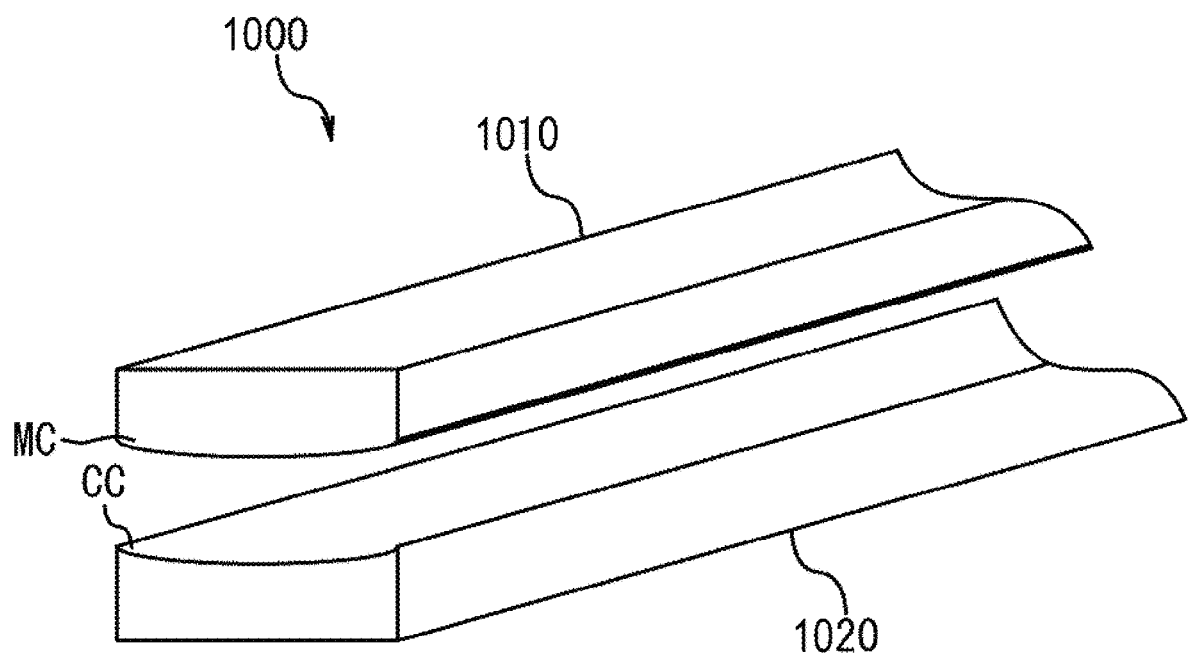
FIG. 12 is a perspective view of a gripper of an object grasping mechanism, such as described herein.

As shown in FIG. 12, the movable gripper 1010 has a raised portion MC. On the other hand, the fixed gripper 1020 has a curved recess CC. Note that the curved surface of the curved recess CC coincides with the curved surface of the raised portion MC of the movable gripper 1010. Also, the width of the raised portion MC of the movable gripper 1010 is the same as the width of the curved recess CC of the fixed gripper 1020. The reciprocating mechanism 830 allows the raised portion MC of the movable gripper 1010 to enter inside the curved recess CC of the fixed gripper 1020. Thus, like the object grasping mechanism 800, such as described herein, the object grasping mechanism 1000 as described herein makes an object MT upwardly warped and prevents the object MT from drooping even when the object MT, such as a bundle of banknotes or the like, is easy to droop.

The width of the raised portion MC of the movable gripper 1010 of the object grasping mechanism 1000 as described herein may be narrower than the width of the curved recess CC of the fixed gripper 1020 and the raised portion MC of the movable gripper 1010 may be formed so as to protrude further downward.

The foregoing embodiments depicted in FIGS. 7-12 and the various alternatives thereof and variations thereto are presented, generally, for purposes of explanation, and to facilitate an understanding of various configurations and constructions of a banknote handling system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Generally and broadly, FIGS. 13-35 depict another example portion of a banknote handling system configured to grasp a banknote cashbox, unlock the banknote cashbox, extract a stack of banknotes from the banknote cashbox and relock the banknote cashbox, such as described herein. It may be appreciated that the specific examples described below are not limited to the precise forms described below. In other words, for simplicity of description and illustration, the following specific examples are provided. However, a person of skill in the art may appreciate that modifications, substitutions, and adjustments may be suitable.

Figure 13:
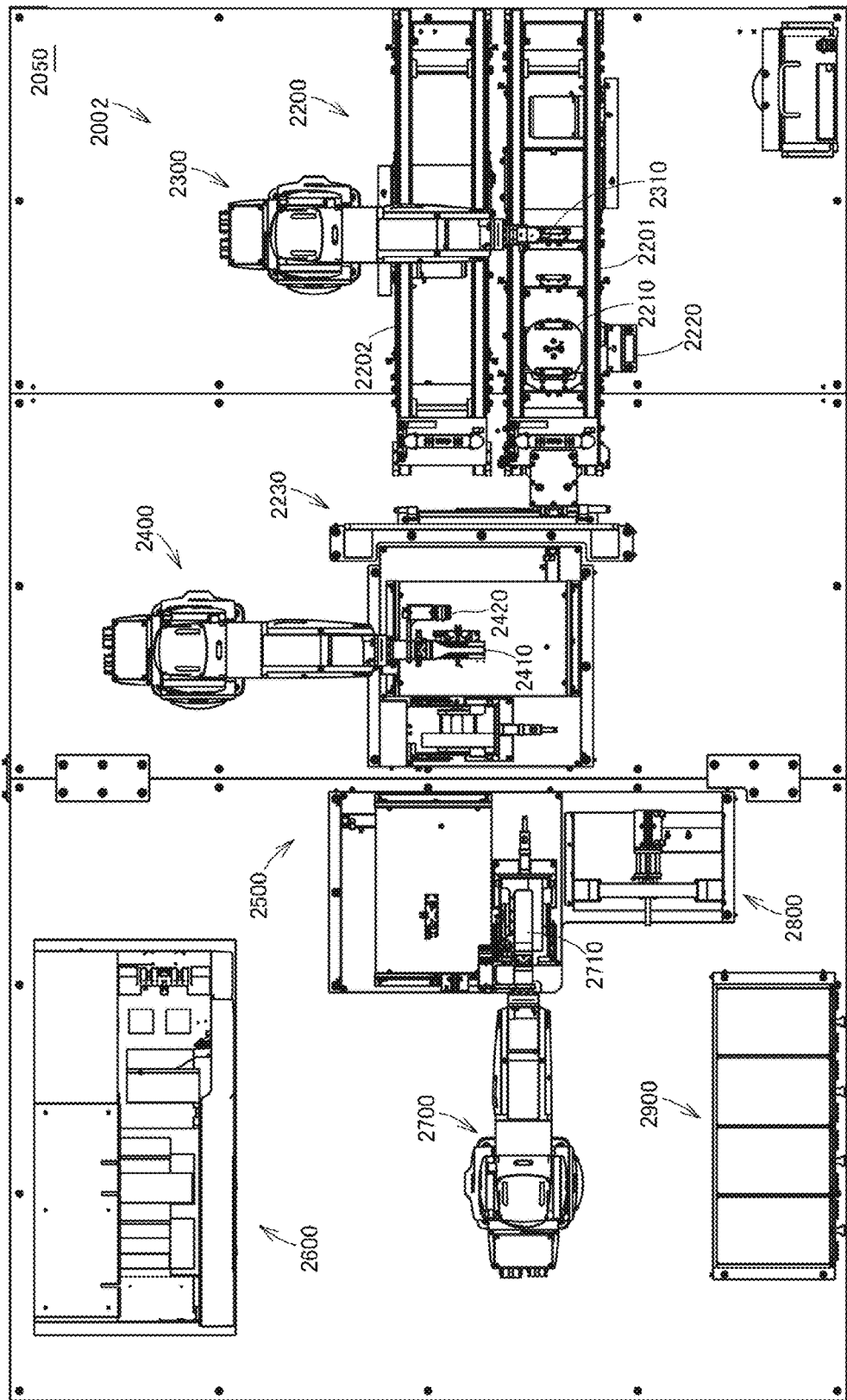
FIG. 13 is a plan view of a banknote handling system, such as described herein.
Figure 14:
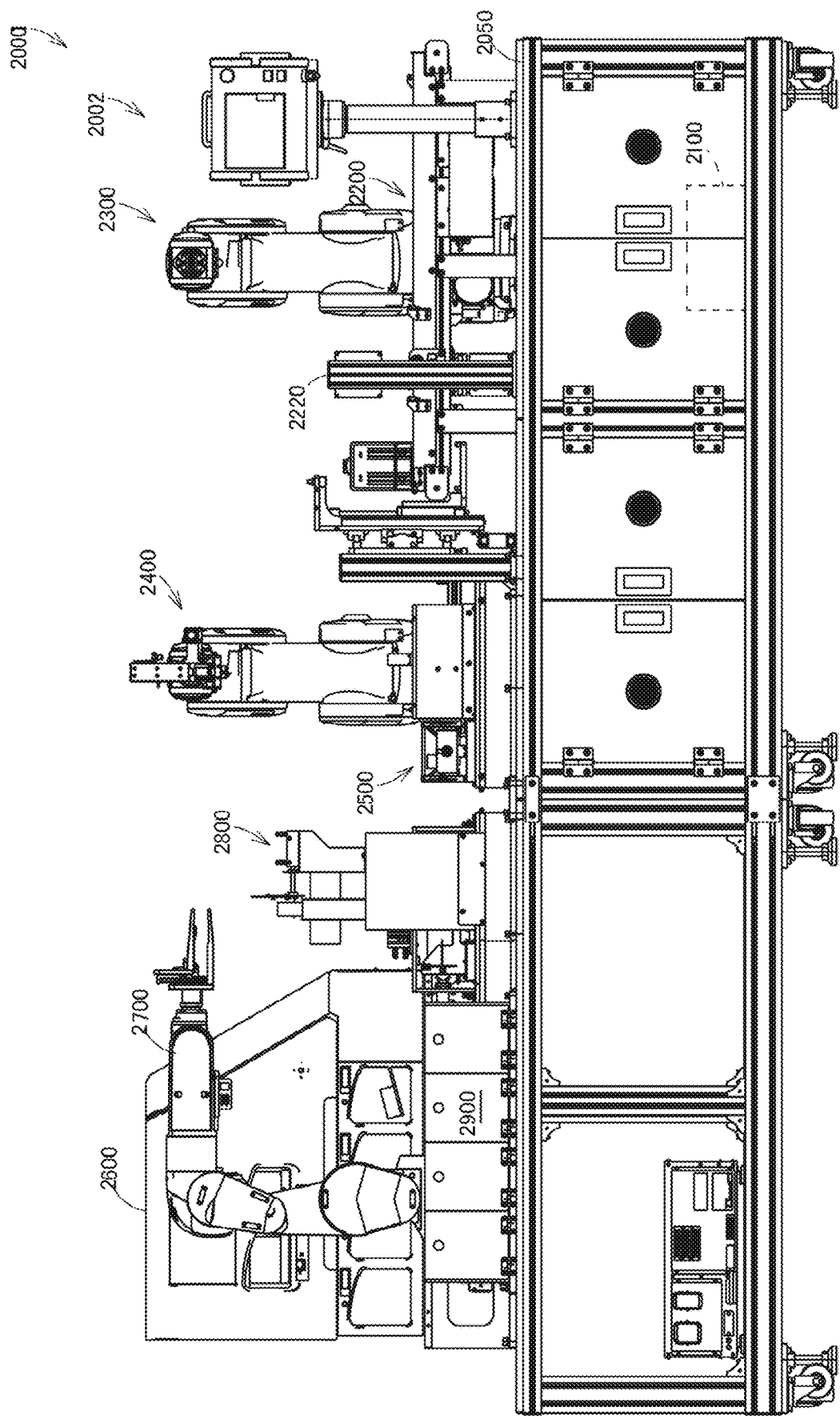
FIG. 14 is a front view of the banknote handling system, such as described herein.
Figure 15:
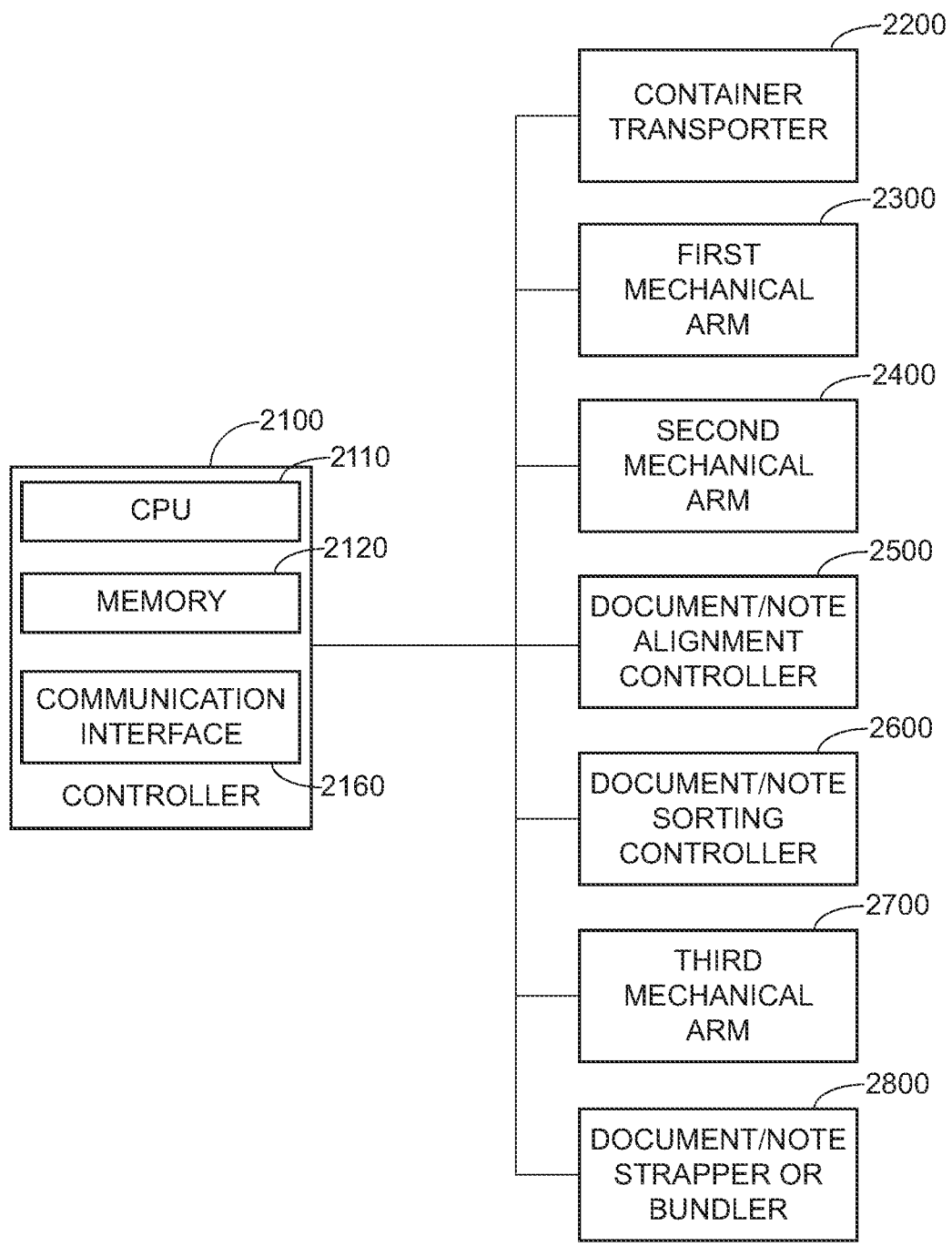
FIG. 15 is a functional block diagram of the banknote handling system, such as described herein.
Figure 16:
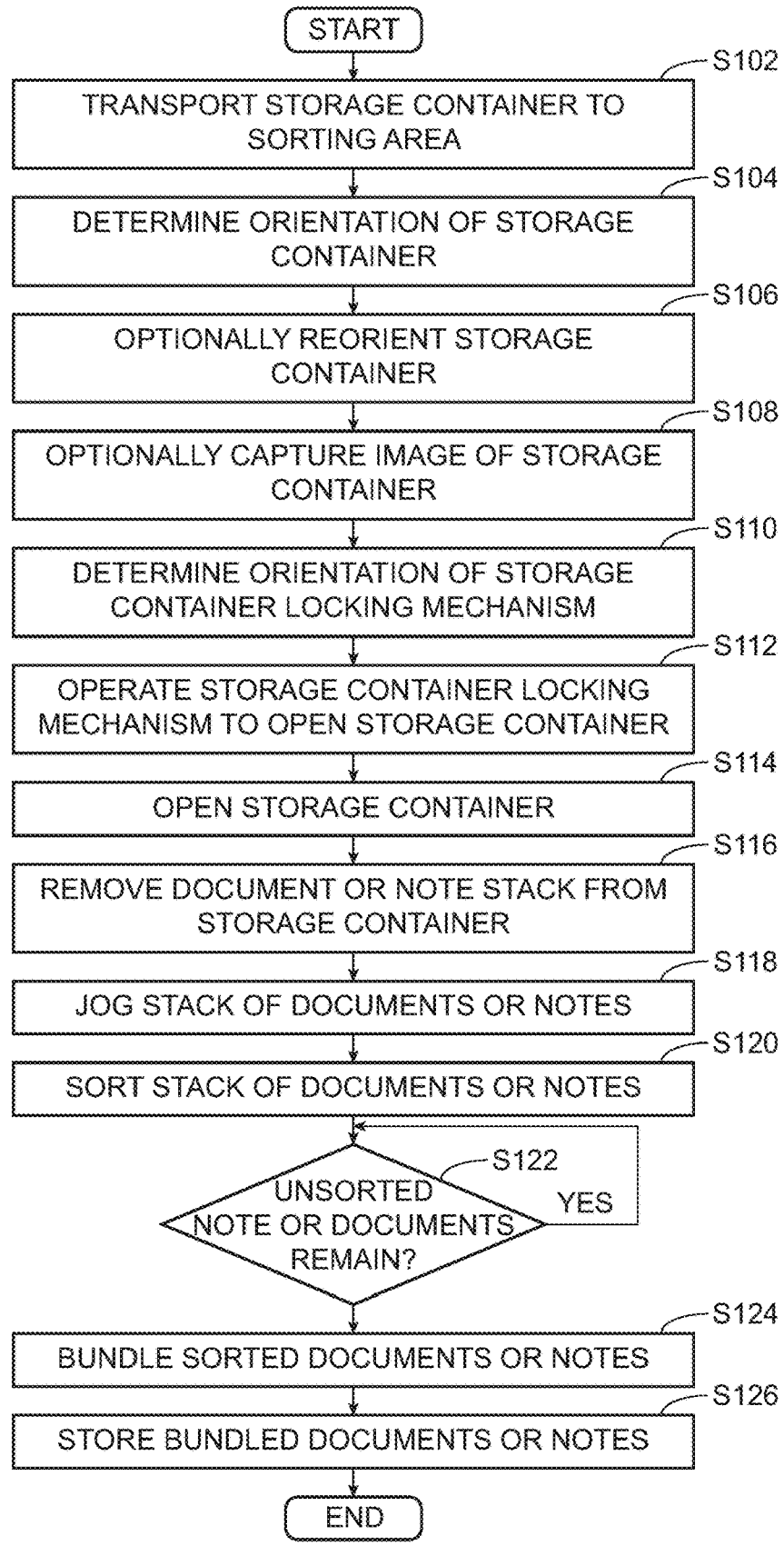
FIG. 16 is a flowchart showing a procedure performed by the banknote handling system 1, such as described herein.

As shown in FIGS. 13-15, a banknote handling system 2000 according to an example embodiment includes a controller 2100, a transporter 2200, a first mechanical arm 2300, a second mechanical arm 2400, a banknote aligner 2500, a banknote sorter 2600, a third mechanical arm 2700, a banknote strapper 2800, and storage boxes 2900. In an example embodiment, the transporter 2200, the first mechanical arm 2300, the second mechanical arm 2400, the banknote aligner 2500, the banknote sorter 2600, the third mechanical arm 2700, the banknote strapper 2800, and the storage boxes 2900 are mounted on a base 2050, and the controller 2100 can be located under the base 2050.

The controller 2100 includes a memory 2120, which stores various programs and data, a communication interface 2160, which transmits and receives data to and from the units included in the banknote handling system 2000, or specifically the transporter 2200, the first mechanical arm 2300, the second mechanical arm 2400, the banknote aligner 2500, the third mechanical arm 2700, and the banknote strapper 2800, and a central processing unit (CPU) 2110, which controls the controller 2100 and the units in the banknote handling system 2000 through the communication interface 2160 in accordance with programs.

The units in the banknote handling system 2000 associated with transporting, unlocking, and opening of the banknote storage container 2010 and also removal of banknotes from the container, and so on, are collectively referred to as a banknote storage container handling system 2002 (or an unlocking system 2002).

The operation of the banknote handling system 2000 according to an example embodiment will now be described with reference to FIGS. 13-16.

The transporter 2200 transports the banknote storage container 2010 (refer to FIG. 18) in response to a command from the controller 2100 (step S102). The transporter 2200 transports the banknote storage container 2010, which is brought into a secure room containing the banknote handling system 2000, to near the first mechanical arm 2300. In an example embodiment, the transporter 2200 includes a first conveyor 2201, a second conveyor 2202, a reverser 2210, a radio frequency identification (RFID) antenna 2220, and a transfer unit 2230.

The controller 2100 determines one surface of the banknote storage container 2010 having a keyhole 2012, or the surface having a lid 2011, based on data received from the RFID antenna 2220 (step S104). As described in detail later, the banknote storage container 2010 in an example embodiment has an RFID tag attached to its one surface having no keyhole 2012. When the RFID antenna 2220 detects an RFID tag, the controller 2100 determines, based on a signal from the RFID antenna 2220, that the lid 2011 and the keyhole 2012 are on the surface opposite to the RFID antenna 2220, and directly passes the banknote storage container 2010 to the transfer unit 2230.

In an example embodiment, the transfer unit 2230, which includes slides 2231 and 2232, transports the banknote storage container 2010 from the first conveyor 2201 to the second conveyor 2202.

When the RFID antenna 2220 detects no RFID tag, the controller 2100 determines, based on a signal from the RFID antenna 2220, that the banknote storage container 2010 has the lid 2011 and the keyhole 2012 on its surface facing the RFID antenna 2220. The controller 2100 uses the reverser 2210 to turn the banknote storage container 2010 to have the surface with the lid 2011 and the keyhole 2012 facing the first mechanical arm 2300 (step S106). The controller 2100 passes the turned banknote storage container 2010 to the second conveyor 2202.

The first mechanical arm 2300 includes a key 2310 for unlocking the lid 2011 of the banknote storage container 2010. As described later, the first mechanical arm 2300 moves the key 2310 front and back, right and left, and up and down or rotates the key 2310 in response to a command from the controller 2100 and inserts the key 2310 into the keyhole 2012 of the banknote storage container 2010. In response to a command from the controller 2100, the first mechanical arm 2300 rotates the key 2310 to unlock the banknote storage container 2010, and then opens the lid 2011. In detail, the controller 2100 uses data indicating the vertical position of the keyhole 2012 obtained from a camera and data indicating the angle of rotation of the keyhole 2012 to correct the angle of rotation of the key 2310 (by rotating the mechanical arm) before moving the first mechanical arm 2300 to the keyhole 2012.

The second mechanical arm 2400 includes a gripper 2410 for picking banknotes. In response to a command from the controller 2100, the second mechanical arm 2400 moves the gripper 2410 front and back, right and left, and up and down and picks banknotes stored in the banknote storage container 2010, removes the banknotes, or places the banknotes onto the banknote aligner 2500.

The controller 2100 controls the first mechanical arm 2300 to lock the banknote storage container 2010. The controller 2100 controls the second conveyor 2202 of the transporter 2200 to transport the empty banknote storage container 2010 out of the room.

As described in detail, the second mechanical arm 2400 has a camera 2420 mounted near the gripper 2410 in an example embodiment. The control described below is performed. The controller 2100 operates the transporter 2200 to move the banknote storage container 2010 to a position near and facing the first mechanical arm 2300. The controller 2100 operates the camera 2420 on the second mechanical arm 2400 to capture an image of the front face of the banknote storage container 2010 (step S108). The controller 2100 determines the position of the keyhole 2012 based on the image data (step S110).

The controller 2100 controls the first mechanical arm 2300 to move the key 2310 to the keyhole 2012 and insert the key 2310 into the keyhole 2012. The controller 2100 controls the first mechanical arm 2300 to turn the key 2310 (step S112). The controller 2100 controls the first mechanical arm 2300 to open the lid of the banknote storage container 2010 (step S114). The controller 2100 controls the second mechanical arm 2400 to move the gripper 2410 into the banknote storage container 2010. The controller 2100 controls the second mechanical arm 2400 to pick the banknotes using the gripper 2410. The controller 2100 controls the second mechanical arm 2400 to pull and remove the banknotes (step S116). The controller 2100 controls the second mechanical arm 2400 to turn the gripper 2410 by 90° to allow the banknotes to stand upright on their edges. The controller 2100 controls the second mechanical arm 2400 to place the banknotes in the banknote aligner 2500.

In response to a command from the controller 2100, the banknote aligner 2500 aligns the banknotes. More specifically, the banknote aligner 2500 aligns the edges of a bundle of banknotes (step S118). More specifically, the banknote aligner 2500 in an example embodiment uses a plate to laterally support the standing banknotes placed by the second mechanical arm 2400 to prevent the banknotes from falling. The banknote aligner 2500 then vibrates the banknotes using a vibrator (not shown) to align the lower edges and the lateral edges of the standing banknotes. The banknote aligner 2500 in an example embodiment can also align the upper edges of the vibrating banknotes by pressing the banknotes with a plate above while the banknotes are being vibrated.

The controller 2100 controls the second mechanical arm 2400, which has been in a standby state during the aligning process, to pick the aligned banknotes again. The controller 2100 controls the second mechanical arm 2400 to place the aligned banknotes in an entrance slot of the banknote sorter 2600. In an example embodiment, the controller 2100 controls the second mechanical arm 2400 to push the banknotes placed in the entrance slot inward with the tip of the gripper 2410. The banknote sorter 2600 sorts the banknotes from the second mechanical arm 2400 by their denominations, and stores the banknotes separately for each denomination (step S120).

In an example embodiment, the banknote sorter 2600 may reject an unsorted banknote. When the banknote sorter 2600 rejects a banknote (Yes in step S122), the controller 2100 controls the third mechanical arm 2700 to pick a rejected banknote using the gripper 2710. The controller 2100 controls the second mechanical arm 2400 to receive the rejected banknote from the third mechanical arm 2700 using the gripper 2410. The controller 2100 then places the banknote again in the entrance slot or hopper of the banknote sorter 2600 (step S120).

In an example embodiment, the banknote sorter 2600, when sorting the banknotes, displays the counts of banknotes sorted and stored for each denomination. The banknote sorter 2600 stops sorting when the count of banknotes reaches a predetermined number for each denomination, for example, 2100. In an example embodiment, the third mechanical arm 2700 also has a camera. Using an image captured with the camera, the controller 2100 obtains the count of sorted banknotes for each denomination.

When the banknotes sorted for any denomination reach a predetermined count, the controller 2100 controls the third mechanical arm 2700 to pick the banknotes and pass the banknotes to the banknote strapper 2800 using the gripper 2710. The banknote aligner 2500 may preferably align the banknotes again before passing the banknotes to the banknote strapper 2800.

The banknote strapper 2800 straps a bundle of a predetermined number of banknotes (step S124). The controller 2100 controls the third mechanical arm 2700 to pick the strapped bundle of banknotes and place the banknotes in one of the storage boxes 2900. In an example embodiment, each storage box 2900 receives banknotes of its corresponding denomination. The controller 2100 controls the third mechanical arm 2700 to place banknotes of the same denomination tied with a strap into the corresponding storage box 2900 intended for the denomination (step S126).

As described above, the banknote handling system 2000 according to an example embodiment automatically sorts banknotes stored in the locked banknote storage container 2010 by their denominations into each strapped bundle of a predetermined number of banknotes of the same denomination. The banknote handling system 2000 thus allows safer and more convenient handling of banknotes.

In the above embodiment, the third mechanical arm 2700 has the camera, and the controller 2100 determines whether the count of banknotes of each denomination reaches a predetermined number using an image captured with the camera. However, the banknote sorter 2600 may transmit data indicating the count of banknotes sorted for each denomination or a notification that the banknote count reaches a predetermined number to the controller 2100. In this case, the third mechanical arm 2700 may have no camera.

Figure 18:
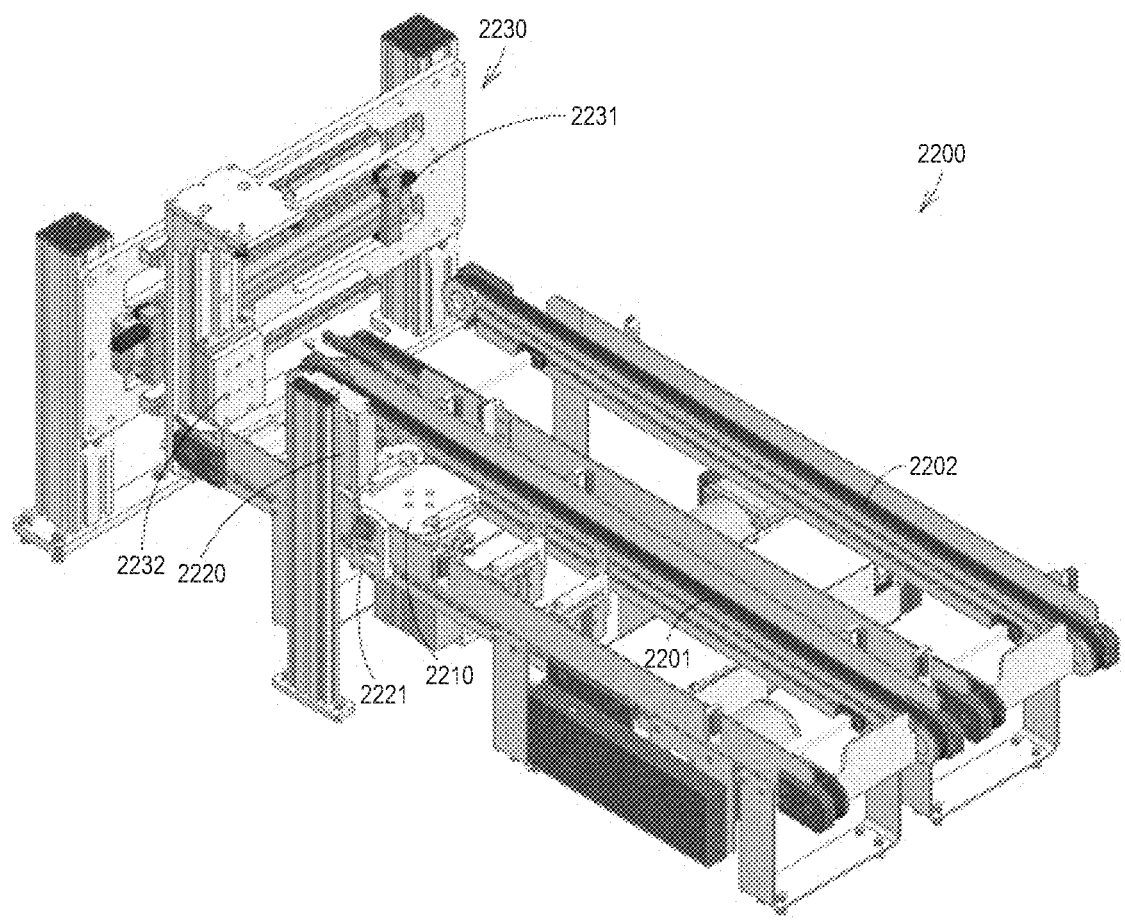
FIG. 18 is a perspective view of a transporter, such as described herein.

The configuration of a banknote storage container handling system 2002 according to an example embodiment will now be described. The transporter 2200 will now be described. Referring to FIG. 18, the transporter 2200 includes a conveyor 2201 on the entrance or hopper of the banknote storage container 2010, a conveyor 2202 on the exit of the banknote storage container 2010, a reverser 2210, a proximity sensor 2221, and an RFID antenna 2220.

In response to a command from the controller 2100, the conveyors 2201 and 2202 transport the banknote storage container 2010.

Figure 19:
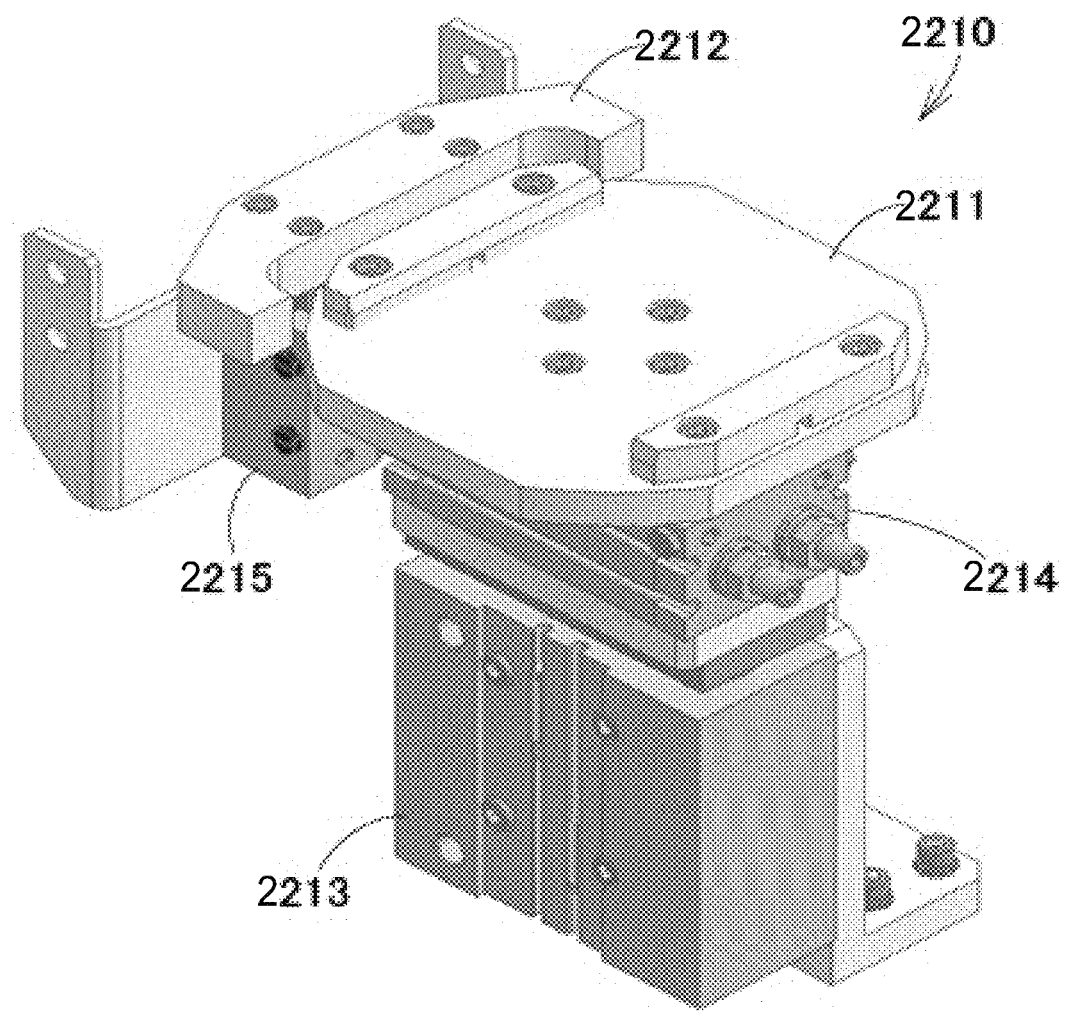
FIG. 19 is a perspective view of a reverser, such as described herein.

In response to a command from the controller 2100, the reverser 2210 reverses the banknote storage container 2010 horizontally by 180°. In more detail, as shown in FIG. 19, the reverser 2210 includes a turntable 2211, onto which the banknote storage container 2010 is placed, a guide 2212, which stops the banknote storage container 2010 at a predetermined position on the conveyor 2201, a lifting cylinder 2213, which lifts the turntable 2211, a turning cylinder 2214, which turns the turntable 2211, and a guide cylinder 2215.

In the embodiment, a photoelectric sensor is used to detect the position of the banknote storage container 2010 on the conveyor 2201 or 2202.

Figure 20:
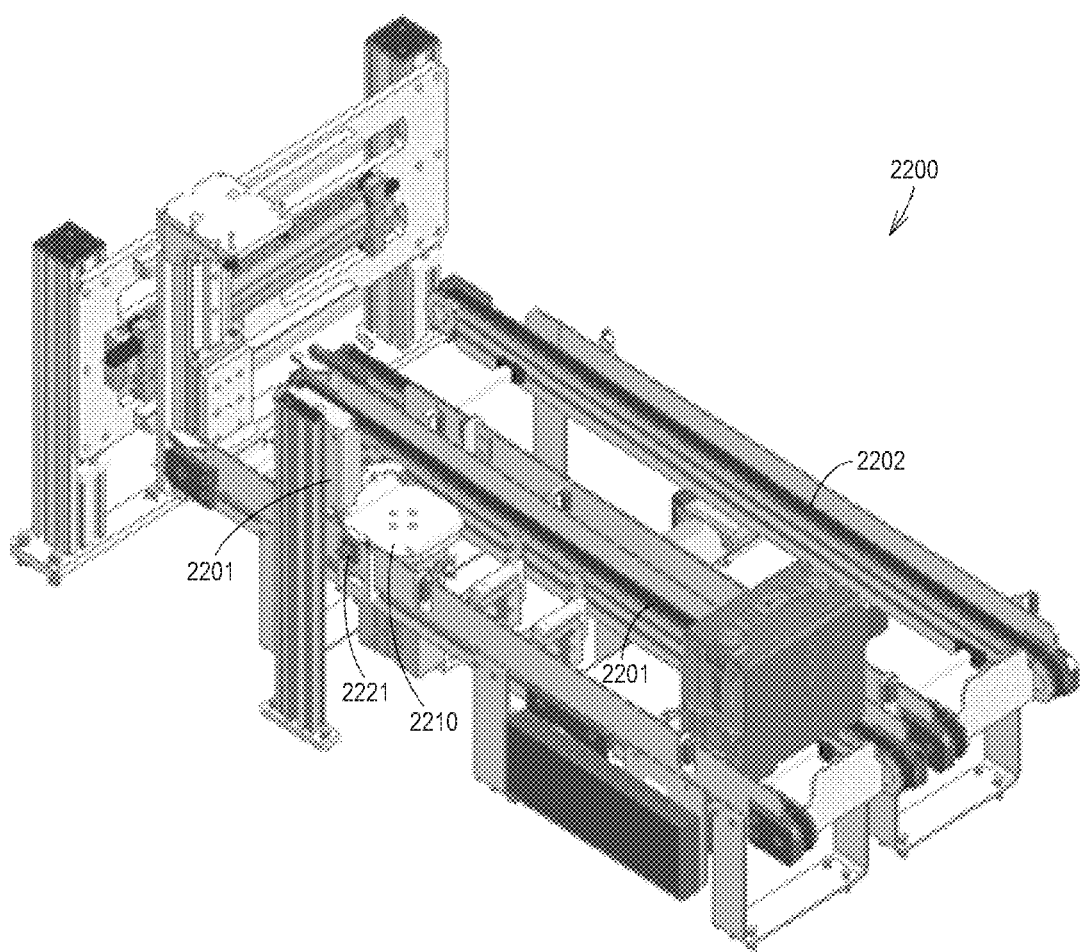
FIG. 20 is a perspective view of the transporter, such as described herein with the banknote storage container mounted on the transporter.
Figure 21:
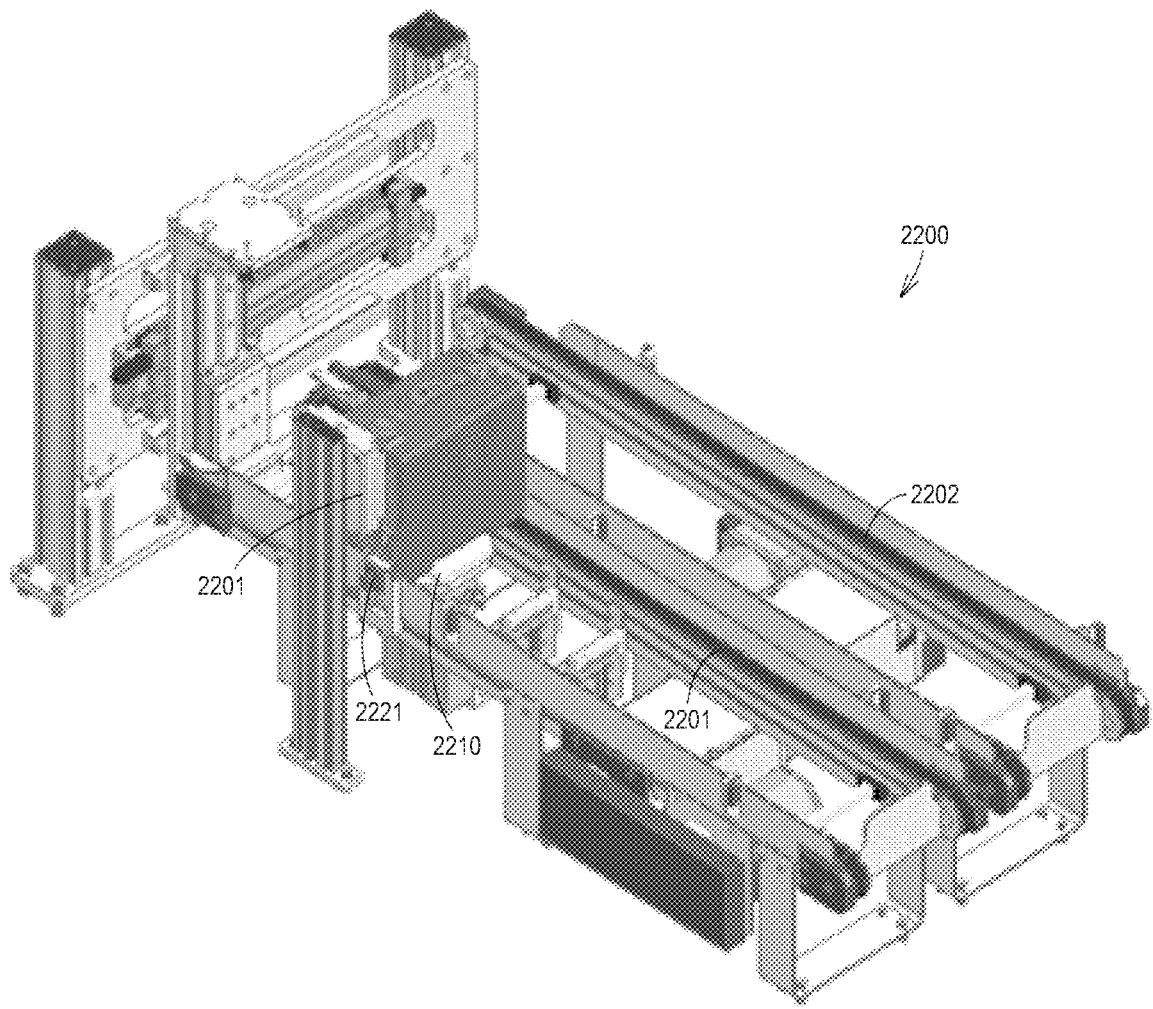
FIG. 21 is a perspective view of the transporter, such as described herein having the banknote storage container transported to an RFID antenna.

In an example embodiment, as shown in FIG. 20, the controller 2100 controls the conveyor 2201 to transport the banknote storage container 2010 when the conveyor 2201 receives the banknote storage container 2010. As shown in FIG. 21, the banknote storage container 2010 stops when touching the guide 2212 of the reverser 2210. In an example embodiment, the proximity sensor 2221 detects the banknote storage container 2010, and transmits the detection result to the controller 2100. The controller 2100 switches on the RFID antenna 2220, which then searches for an RFID tag on the banknote storage container 2010.

Figure 24:
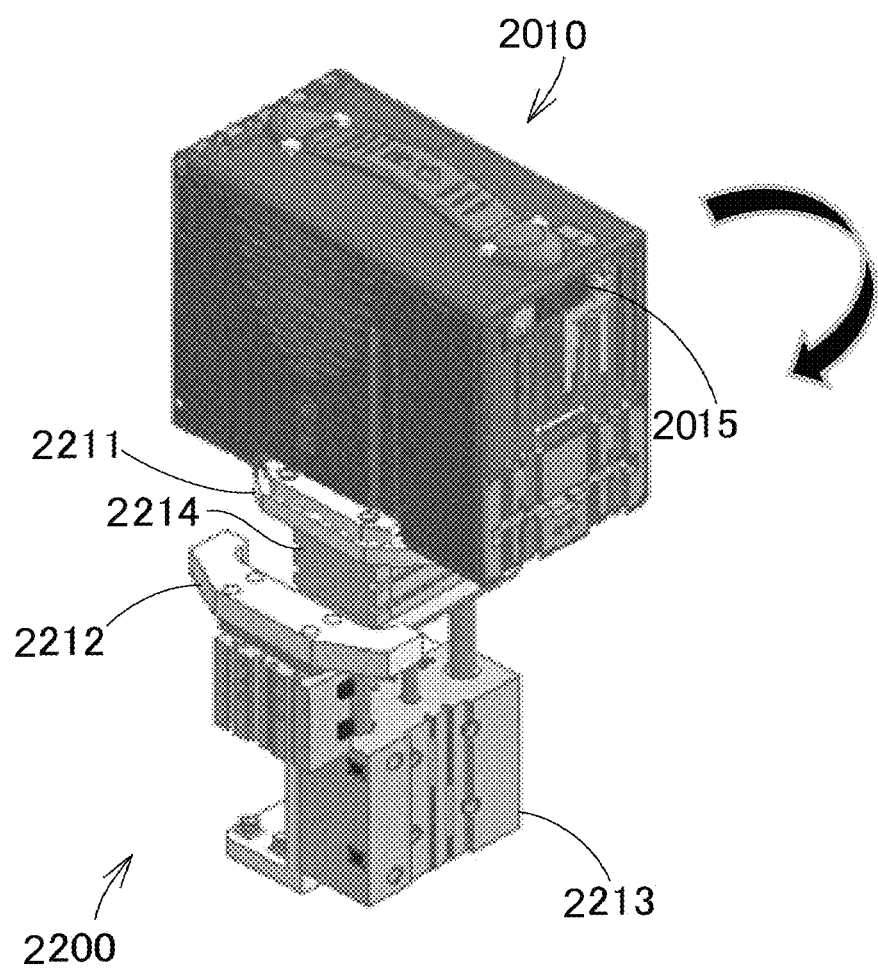
FIG. 24 is a perspective view of the reverser, such as described herein with the turntable turned.

In an example embodiment, the banknote storage container 2010 has an RFID tag 2015 attached on its surface opposite to the lid 2011 (refer to FIG. 24). When the RFID antenna 2220 detects the RFID tag 2015, the controller 2100 controls the conveyor 2201 to transport and pass the banknote storage container 2010 directly to the conveyor 2202 on the exit.

When the RFID antenna 2220 detects no RFID tag 2015, the controller 2100 turns the turntable 2211 by 180°, and controls the conveyor 2201 to transport and pass the banknote storage container 2010 to the conveyor 2202 on the exit.

Figure 22:
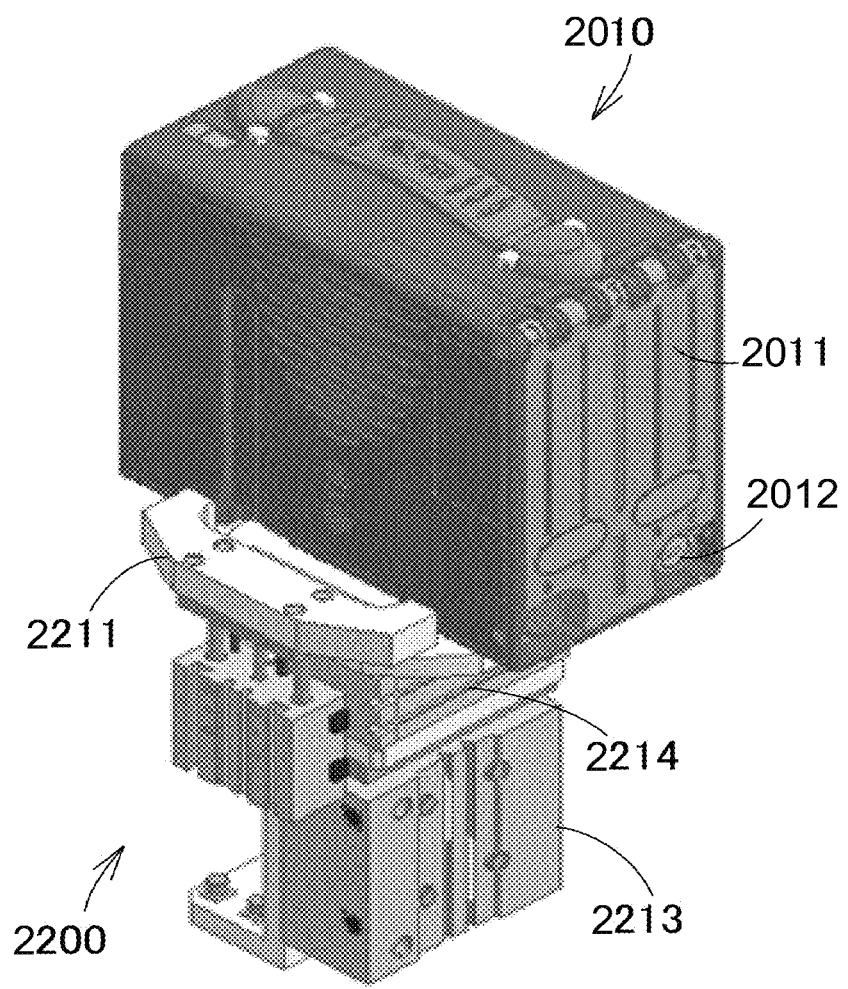
FIG. 22 is a perspective view of the reverser, such as described herein having the banknote storage container 10 mounted on the reverser.
Figure 23:
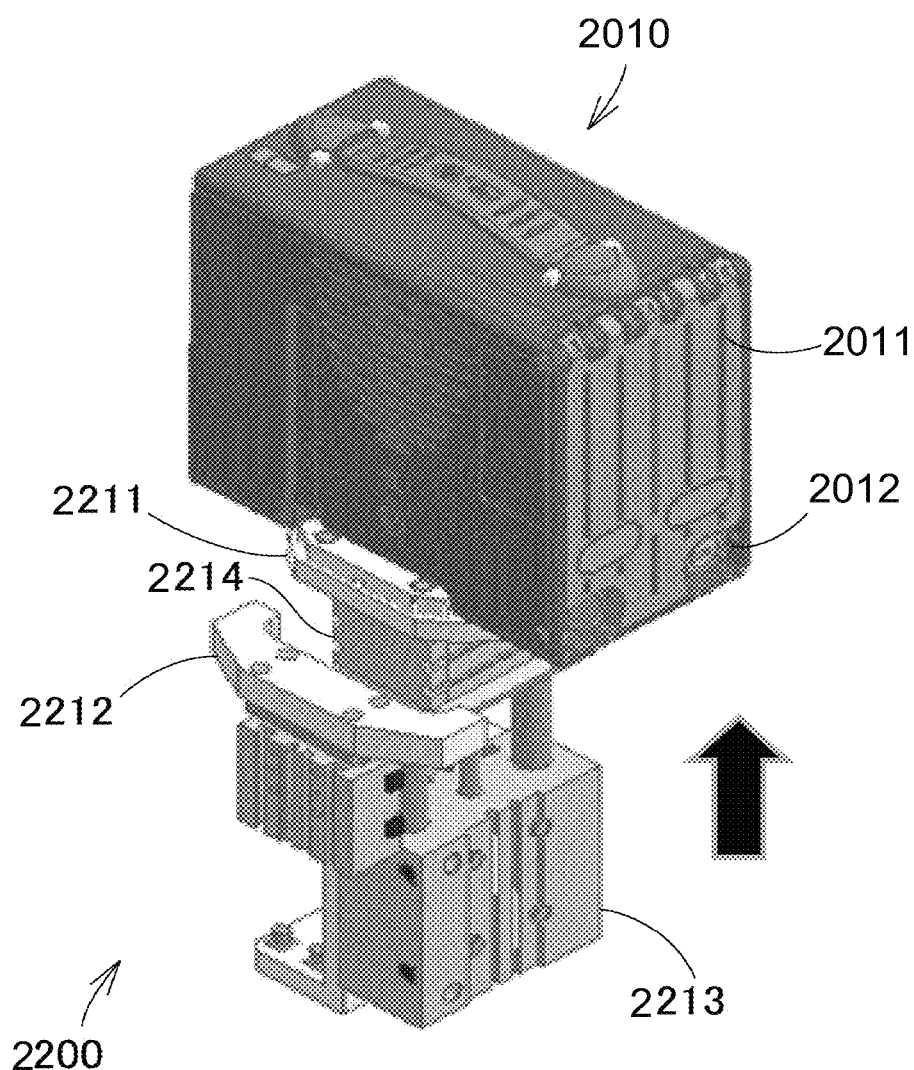
FIG. 23 is a perspective view of the reverser, such as described herein with the turntable lifted.

More specifically, as shown in FIG. 22, the banknote storage container 2010 stops while touching the guide 2212 of the reverser 2210. In this state, as shown in FIG. 23, the controller 2100 drives the lifting cylinder 2213 to lift the turntable 2211 and the banknote storage container 2010 when the controller 2100 receives a detection result indicating that no RFID tag 2015 has been detected. As shown in FIG. 24, the controller 2100 drives the turning cylinder 2214 to rotate the turntable 2211 and the banknote storage container 2010 by 180°. After turning the table, the controller 2100 lowers the lifting cylinder 2213, and thus lowers the turntable 2211 and the banknote storage container 2010 to the level of the conveyor 2201 as shown in FIG. 22.

The controller 2100 then controls the conveyors 2201 and 2202 to transport the banknote storage container 2010 to face the first mechanical arm 2300 or the second mechanical arm 2400.

Figure 25:
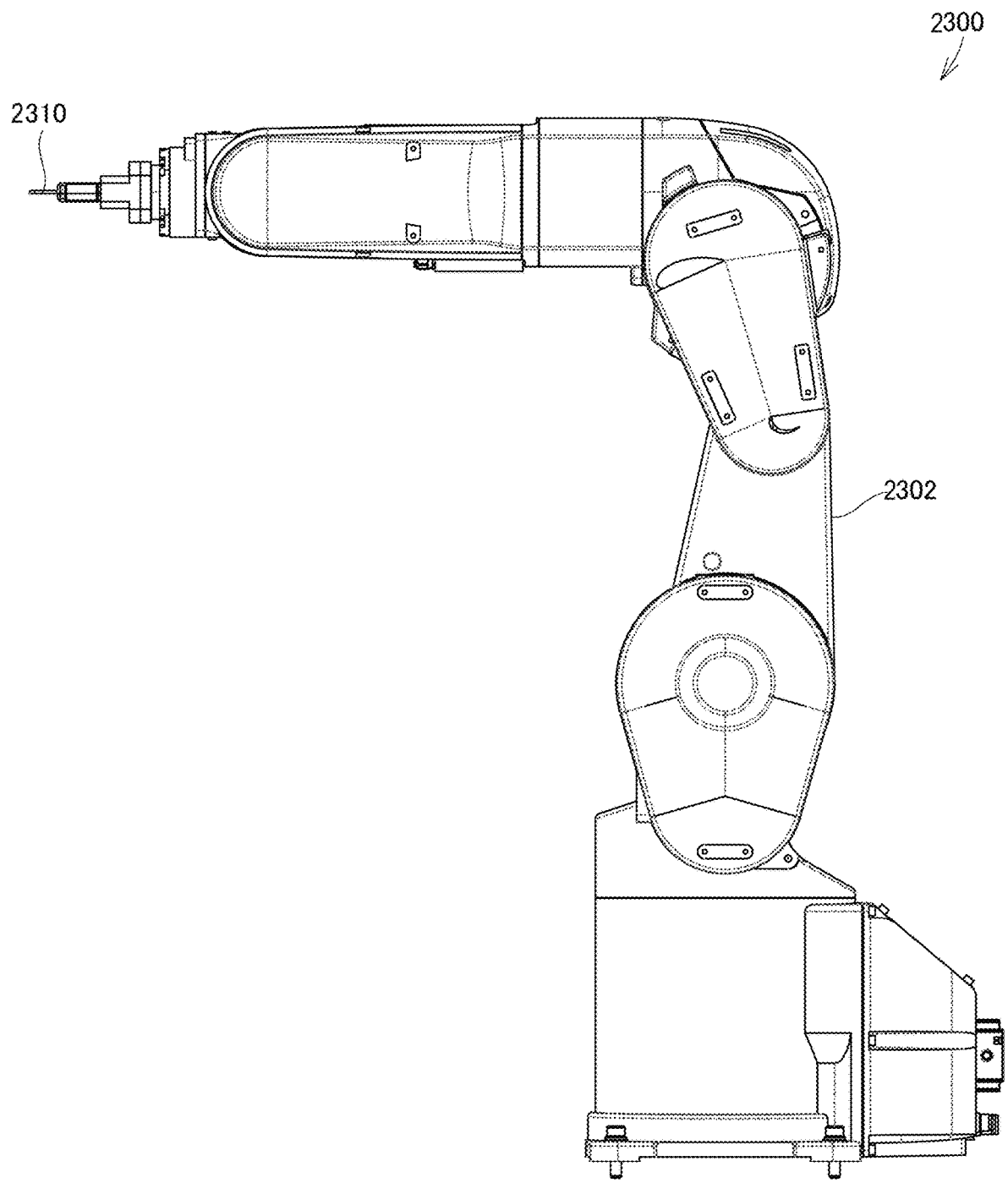
FIG. 25 is a front view of a first mechanical arm, such as described herein.
Figure 26:
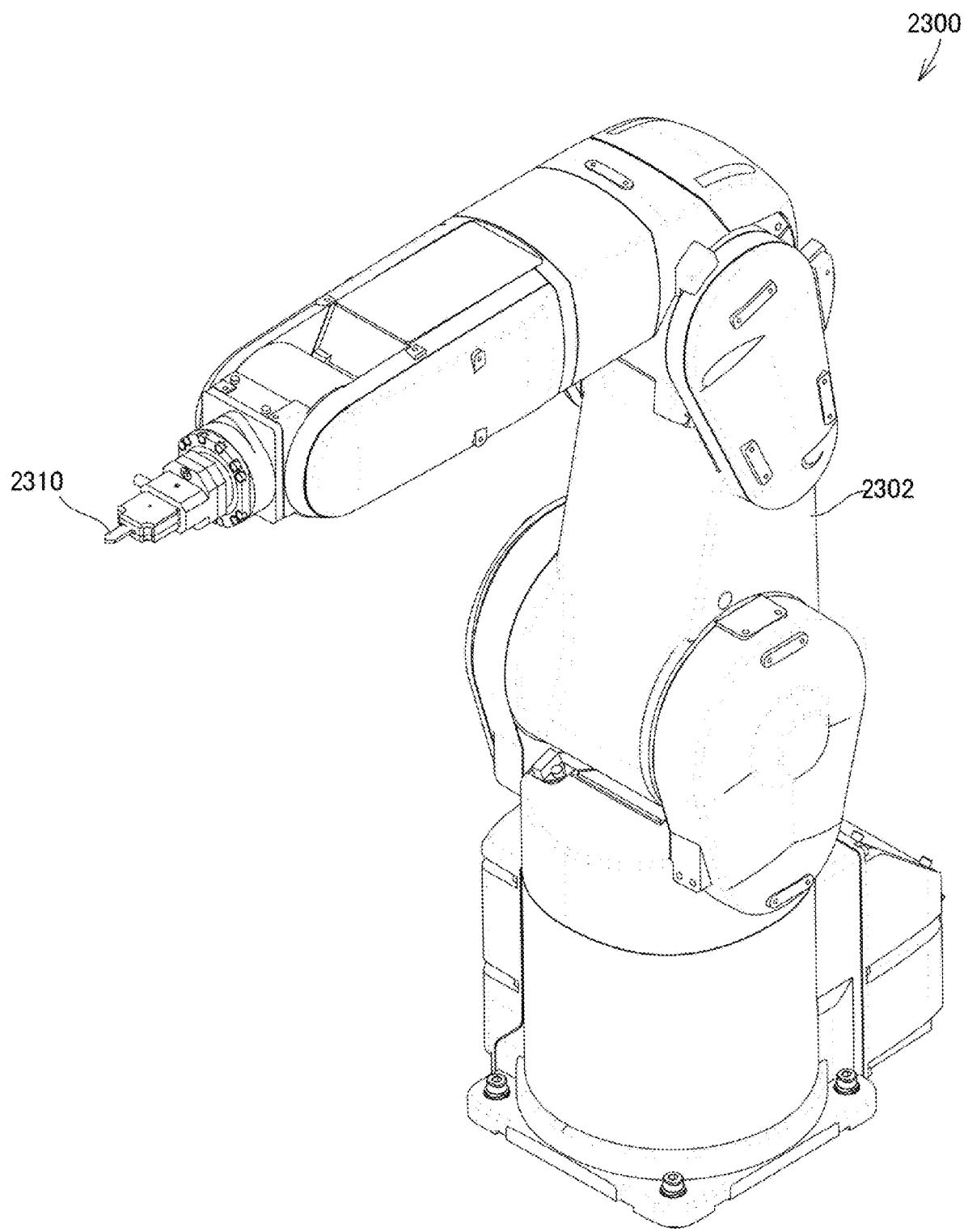
FIG. 26 is a perspective view of the first mechanical arm, such as described herein.

The structure of the first mechanical arm 2300 will now be described. As shown in FIGS. 25 and 26, the first mechanical arm 2300 includes the key 2310, and an mechanical arm body 2302 for controlling the position, angle, or posture of the key 2310. In response to a command from the controller 2100, the first mechanical arm 2300 drives a motor and an actuator contained in the mechanical arm body 2302 to turn or move the key 2310 for the banknote storage container 2010 along six axes.

Figure 27:
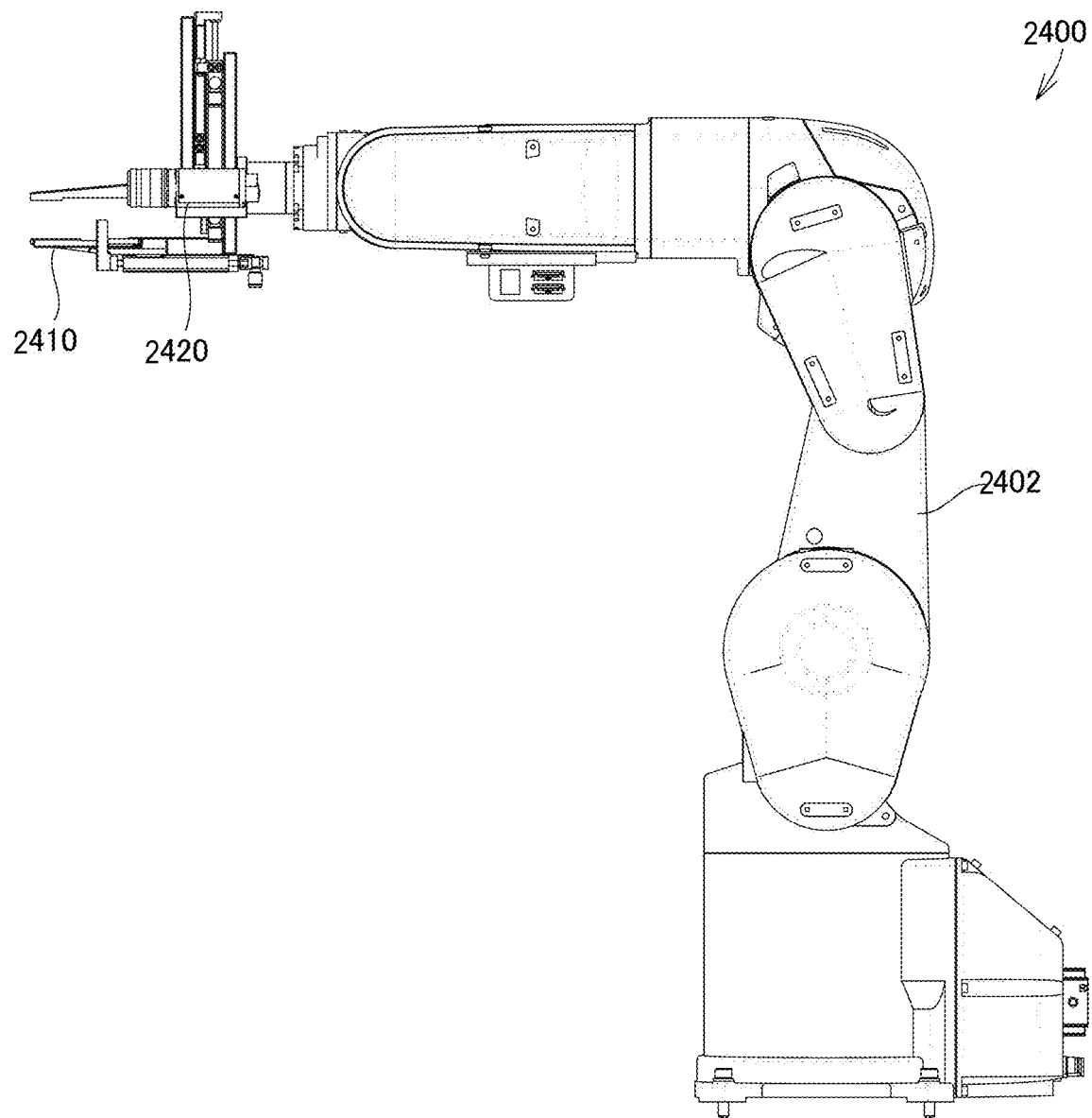
FIG. 27 is a front view of the second mechanical arm, such as described herein.
Figure 28:
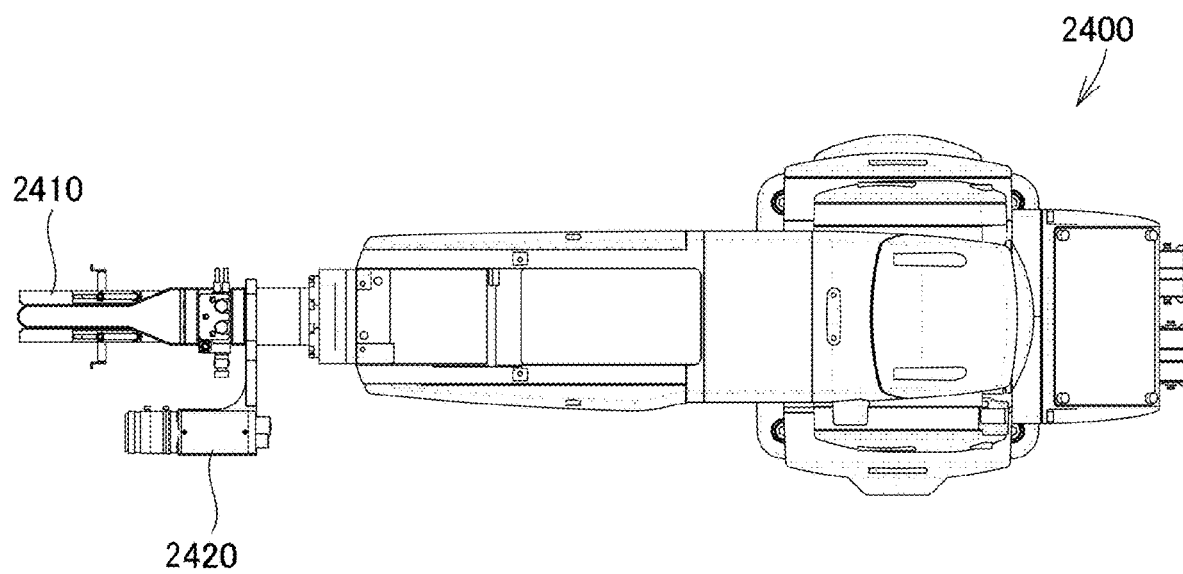
FIG. 28 is a plan view of the second mechanical arm, such as described herein.
Figure 29:
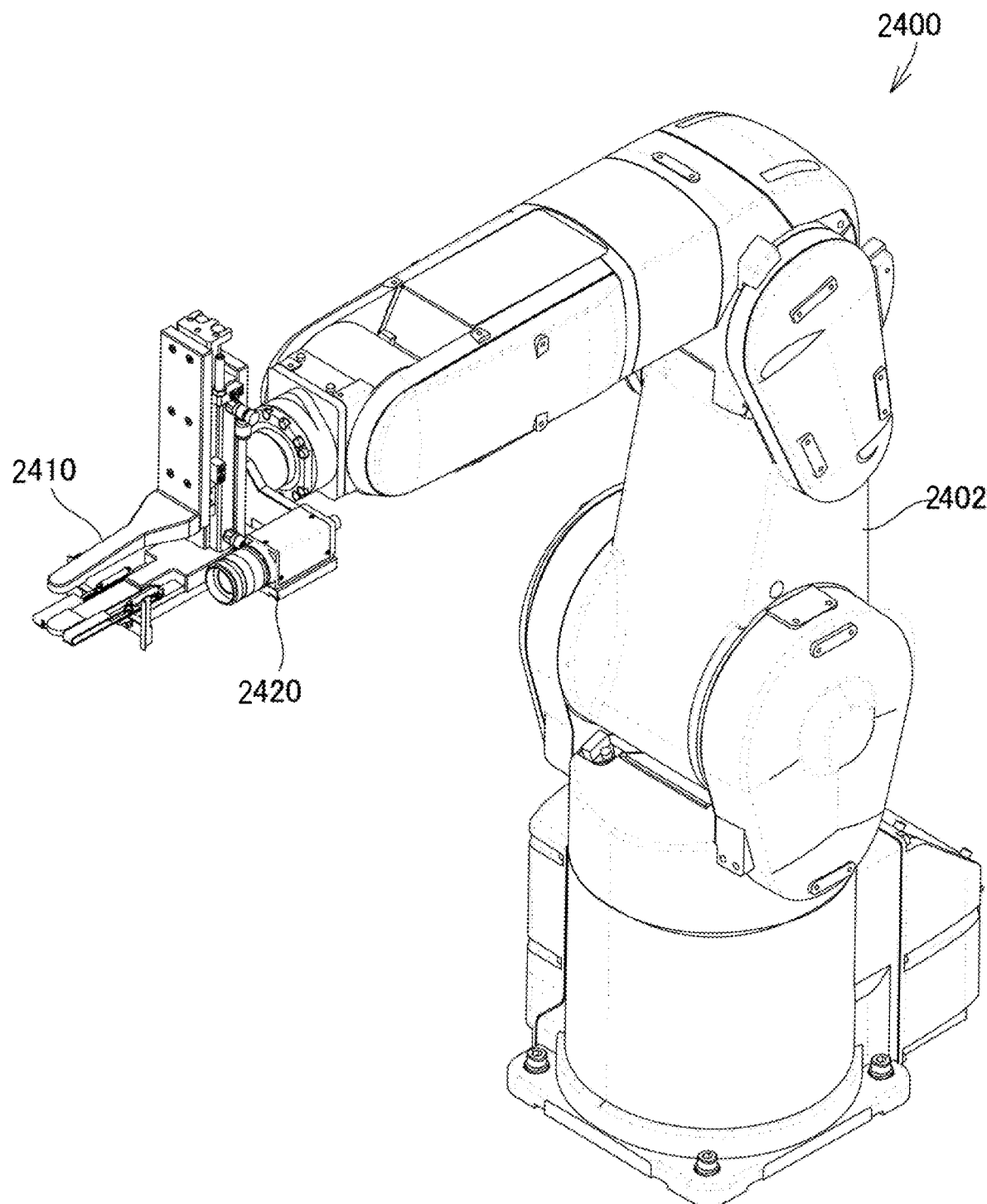
FIG. 29 is a perspective view of the second mechanical arm, such as described herein.

The structure of the second mechanical arm 2400 will now be described. As shown in FIGS. 27 to 28, the second mechanical arm 2400 includes the gripper 2410, the camera 2420, and an mechanical arm body 2402 for controlling the position, angle, or posture of the gripper 2410. In response to a command from the controller 2100, the second mechanical arm 2400 drives a motor and an actuator contained in the mechanical arm body 2402 to turn or move the gripper 2410 for picking the banknotes and the camera 2420 for imaging the keyhole 2012 along six axes.

Figure 30:
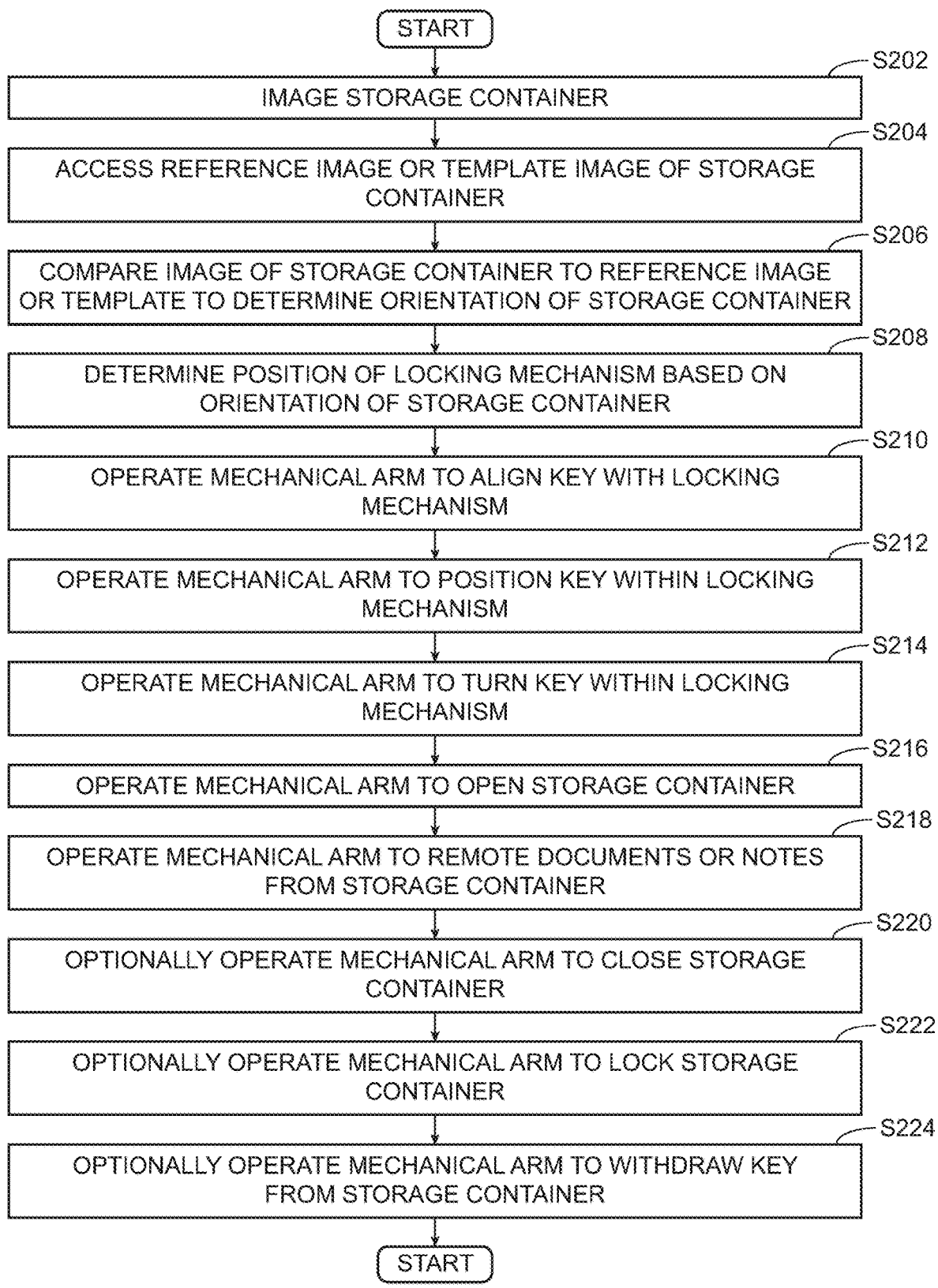
FIG. 30 is a flowchart showing an unlocking process for a banknote storage container, such as described herein.

Referring now to FIG. 30, the control over the first mechanical arm 2300 and the second mechanical arm 2400 performed by the controller 2100 will be described. In an example embodiment, the conveyor 2202 on the exit transports the banknote storage container 2010 to face the first mechanical arm 2300 or the second mechanical arm 2400. The controller 2100 then performs the processing described below.

Figure 31:
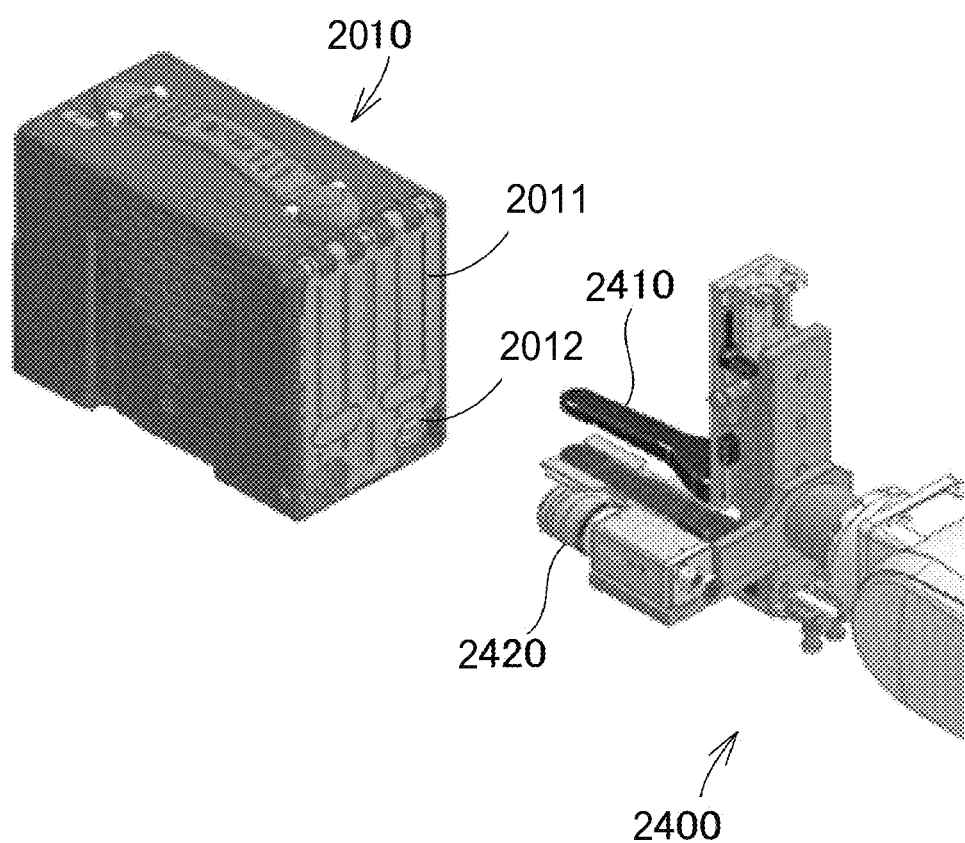
FIG. 31 is a perspective view of the second mechanical arm and the banknote storage container, such as described herein when the second mechanical arm captures an image of a keyhole.

The CPU 2110 in the controller 2100 first controls the second mechanical arm 2400 through the communication interface 2160 to move the camera 2420 to a position near and facing the banknote storage container 2010 as shown in FIG. 31. The camera 2420 captures an image of the front of the banknote storage container 2010 (step S202).

The CPU 2110 in the controller 2100 reads a reference image for the keyhole 2012 from the memory 2120 (step S204). The CPU 2110 matches the image obtained from the camera 2420 with the reference image for the keyhole 2012, and determines the position of the keyhole 2012 (step S206).

Figure 32:
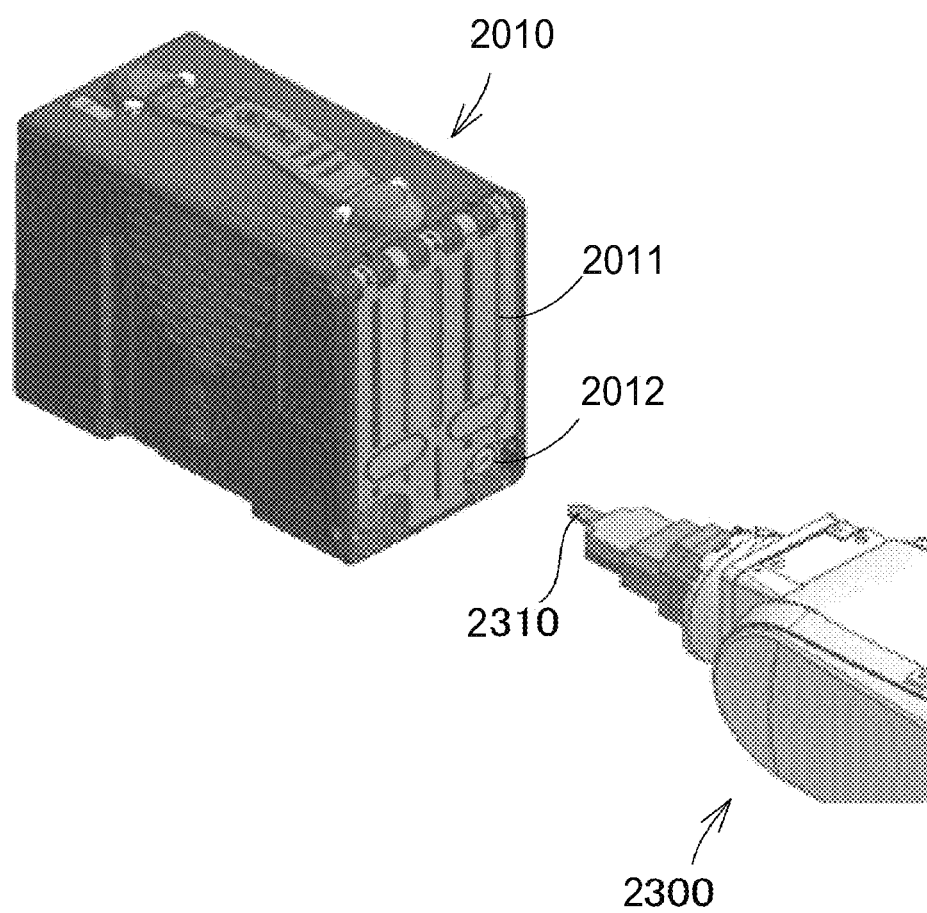
FIG. 32 is a perspective view of the first mechanical arm and the banknote storage container, such as described herein when the first mechanical arm has moved to face the keyhole.

The CPU 2110 calculates the position of the keyhole 2012 relative to the current position of the key 2310 based on the matching result (step S208). The CPU 2110 controls the first mechanical arm 2300 through the communication interface 2160 to move the key 2310 to face the keyhole 2012 as shown in FIG. 32 (step S210).

Figure 17:
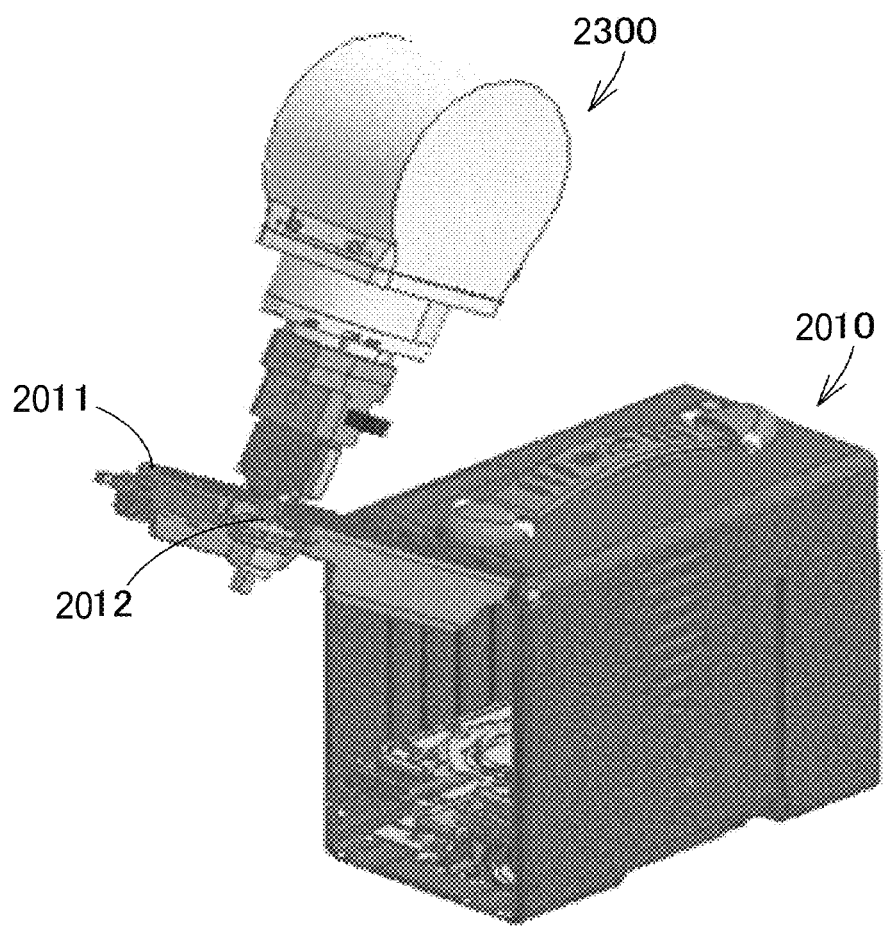
FIG. 17 is a perspective view of a banknote storage container, such as described herein with a lid 11 being open.
Figure 33:
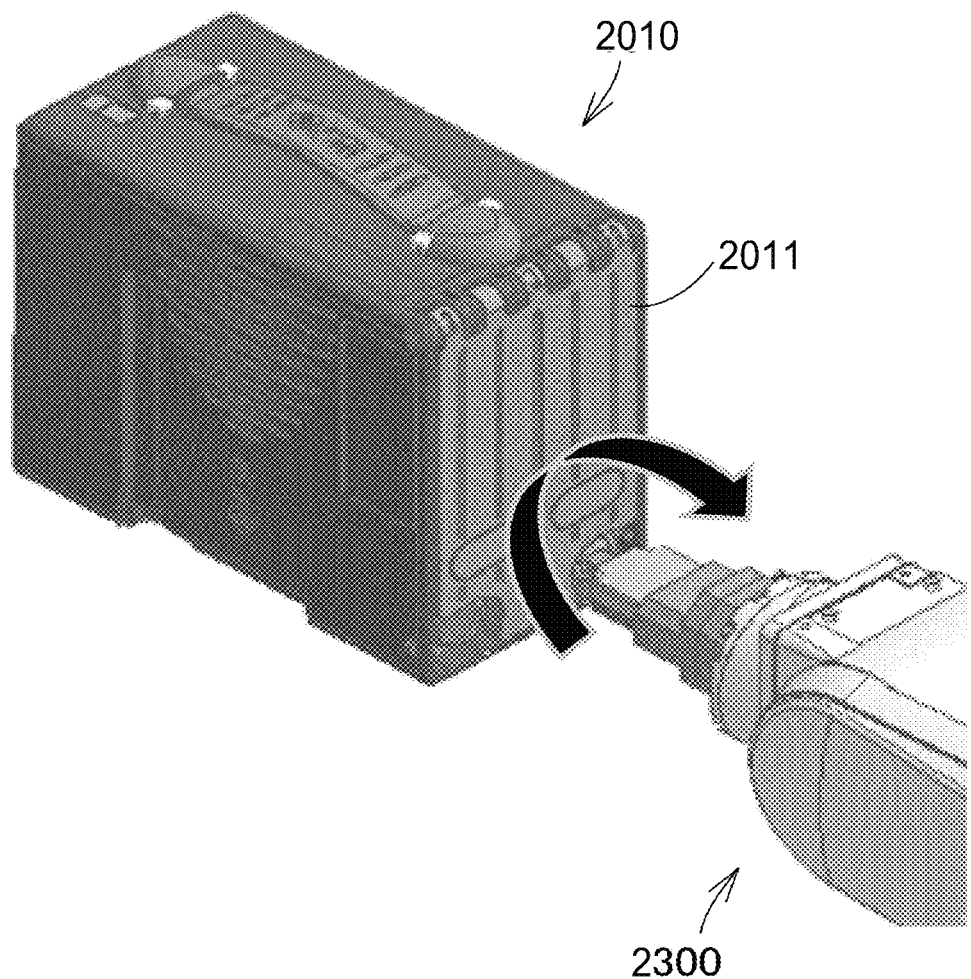
FIG. 33 is a perspective view of the first mechanical arm and the banknote storage container, such as described herein when the first mechanical arm is unlocking the container.

The CPU 2110 controls the first mechanical arm 2300 through the communication interface 2160 to insert the key 2310 into the keyhole 2012 (step S212), and to turn the key 2310 in an unlocking direction (step S214) as shown in FIG. 33. The CPU 2110 controls the first mechanical arm 2300 through the communication interface 2160 to open the lid 2011 of the banknote storage container 2010 with the key 2310 (step S216) as shown in FIG. 17. In this manner, the lid 2011 of the banknote storage container 2010 is automatically open.

Figure 34:
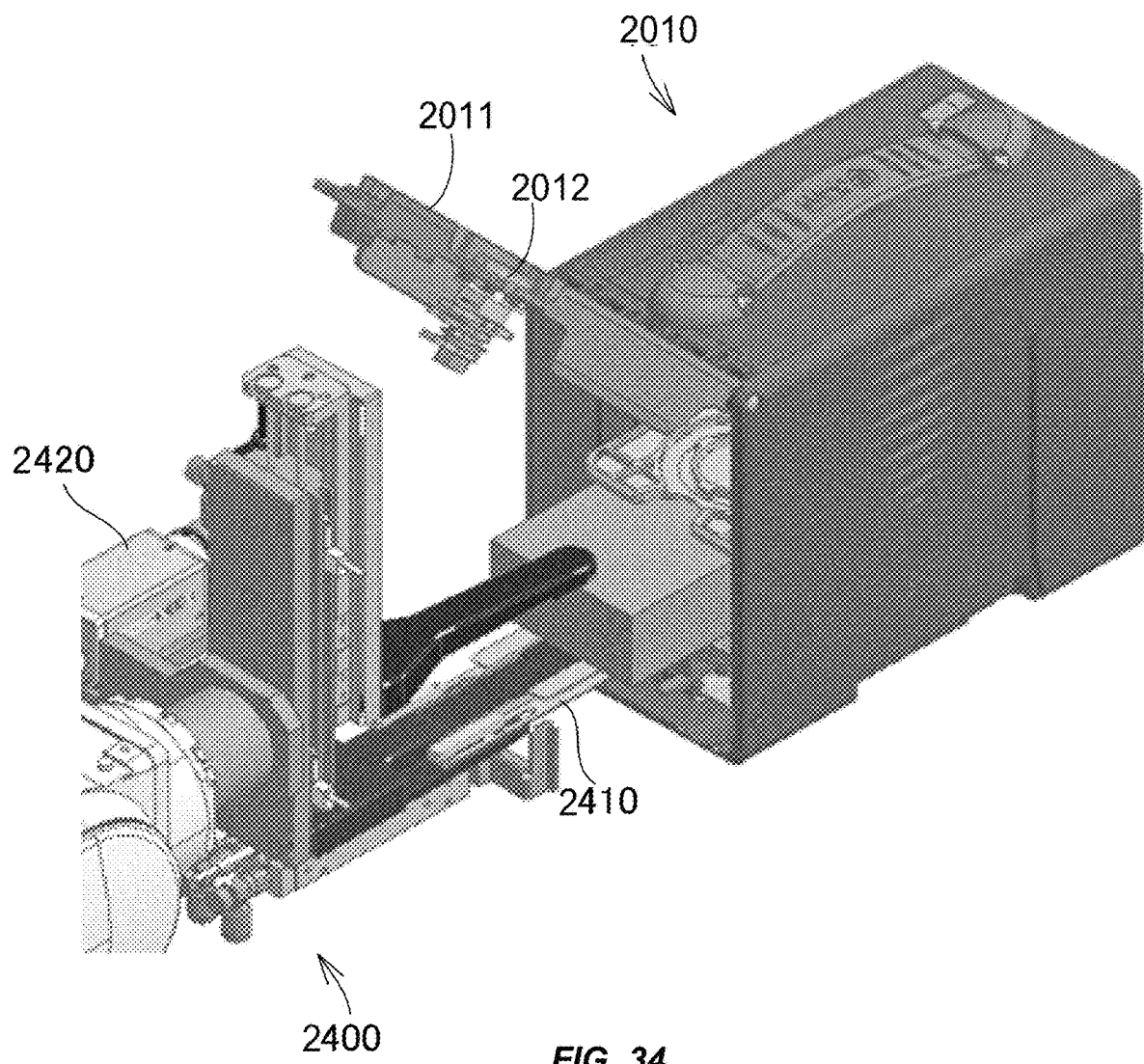
FIG. 34 is a perspective view of the second mechanical arm and the banknote storage container, such as described herein when banknotes are removed from the banknote storage container.

The CPU 2110 controls the second mechanical arm 2400 through the communication interface 2160 to place the gripper 2410 into the banknote storage container 2010 and to remove the banknotes (step S218) as shown in FIG. 34. The second mechanical arm 2400 then passes the banknotes to the banknote aligner 2500.

The CPU 2110 controls the first mechanical arm 2300 through the communication interface 2160 to close the lid 2011 of the banknote storage container 2010 with the key 2310 (step S220). The CPU 2110 controls the first mechanical arm 2300 through the communication interface 2160 to turn the key 2310 in a locking direction (step S222) and withdraw the key 2310 from the keyhole 2012 of the banknote storage container 2010 (step S224).

The controller 2100 controls the conveyor 2202 on the exit to move the locked empty banknote storage container 2010 out of the banknote handling system 2000.

In this manner, the banknote storage container handling system 2002 according to an example embodiment automatically unlocks the banknote storage container 2010, opens the lid 2011 of the banknote storage container 2010, removes the banknotes stored in the banknote storage container 2010, closes the lid 2011 of the banknote storage container 2010, and locks the banknote storage container 2010.

In the above embodiment, the first mechanical arm 2300 includes the single key 2310. The banknote handling system 2000 and the banknote storage container handling system 2002 may include multiple different keys.

For example, the memory 2120 in the controller 2100 stores images of multiple different keyholes corresponding to the multiple different keys. In step S206 in FIG. 30, the CPU 2110 compares the captured image of the keyhole with the multiple images of the keyholes stored in the memory 2120, and determines the type of the keyhole, the type of the key, and the position of the keyhole. The first mechanical arm 2300 may incorporate multiple selectable keys, or may have multiple keys placed near the first mechanical arm 2300. In step S210 in FIG. 30, the CPU 2110 controls the first mechanical arm 2300 through the communication interface 2160 to replace the key with a specified key 2310. The CPU 2110 controls the first mechanical arm 2300 through the communication interface 2160 to move the specified key 2310 to face the keyhole 2012 as shown in FIG. 32.

In the above embodiment, the RFID tag 2015 is attached to the surface of the banknote storage container 2010 opposite to the lid 2011. The RFID tag 2015 may be attached to the surface of the banknote storage container 2010 including the lid 2011, and the RFID antenna 2220 may be placed near the first mechanical arm 2300.

In some embodiments, the RFID tag 2015 may be attached to the surface of the banknote storage container 2010 opposite to the lid 2011, and the RFID antenna 2220 may be placed near the first mechanical arm 2300. In this case, the controller 2100 turns the banknote storage container 2010, and then transports the container 2010 to the conveyor 2202 on the exit when the RFID tag 2015 is detected. When no RFID tag 2015 is detected, the controller 2100 directly transports the banknote storage container 2010 to the conveyor 2202 on the exit without turning the container 2010.

The RFID tag 2015 may be attached to the surface of the banknote storage container 2010 having the lid 2011, and the RFID antenna 2220 may be placed opposite to the first mechanical arm 2300. In this case, the controller 2100 turns the banknote storage container 2010, and then transports the container 2010 to the conveyor 2202 on the exit when the RFID tag 2015 is detected. When no RFID tag 2015 is detected, the controller 2100 directly transports the banknote storage container 2010 to the conveyor 2202 on the exit without turning the container 2010.

In some embodiments, the RFID tag 2015 may be attached to each of the surface of the banknote storage container 2010 having the lid 2011 and its opposite surface. Each RFID tag 2015 may store information for determining the surface with the lid 2011 and the keyhole 2012.

In some embodiments, the RFID tag 2015 may not be used. The banknote storage container 2010 may have, on its upper or side surface, a bar code or a specific image for determining the surface having the lid 2011 and the keyhole 2012. The RFID antenna 2220 may be replaced by an optical sensor or a camera to determine the surface having the lid 2011 and the keyhole 2012.

In some embodiments, the RFID tag 2015 may not be used. The banknote storage container 2010 may have, on its upper or side surface, an irregularity shape to identify the surface having the lid 2011 and the keyhole 2012. A contact sensor, a proximity sensor, or an image sensor may be used to detect the shape to determine the surface having the lid 2011 and the keyhole 2012.

In the above embodiment, the banknote storage container 2010 includes the keyhole 2012 in the lid 2011. However, the banknote storage container 2010 may not have the keyhole 2012 in the lid 2011, but may have the keyhole 2012 in any other place.

In the above embodiment, the banknote storage container 2010 is turned by the reverser 2210 to have the lid 2011 facing the first mechanical arm 2300. However, the controller 2100 may control the first mechanical arm 2300 to move the key 2310 to the surface of the banknote storage container 2010 having the keyhole 2012 in correspondence with the position of the surface having the keyhole 2012. More specifically, the first mechanical arm 2300 may move the key 2310 to the keyhole 2012 beyond the banknote storage container 2010 or the transporter 2200.

In some embodiments, the first arms 2300 may be located across the transporter 2200. The first mechanical arm 2300 facing the surface having the keyhole 2012 may lock or unlock the banknote storage container 2010.

An example structure of a banknote aligner is described below. For convenient reference, the embodiments that follow reference a banknote aligner 3500, but it may be appreciated that a banknote aligner, such as described herein, can be suitably configured as described above or in reference to any other embodiment referenced herein, such as the banknote aligner 2500 referenced above.

Figure 35:
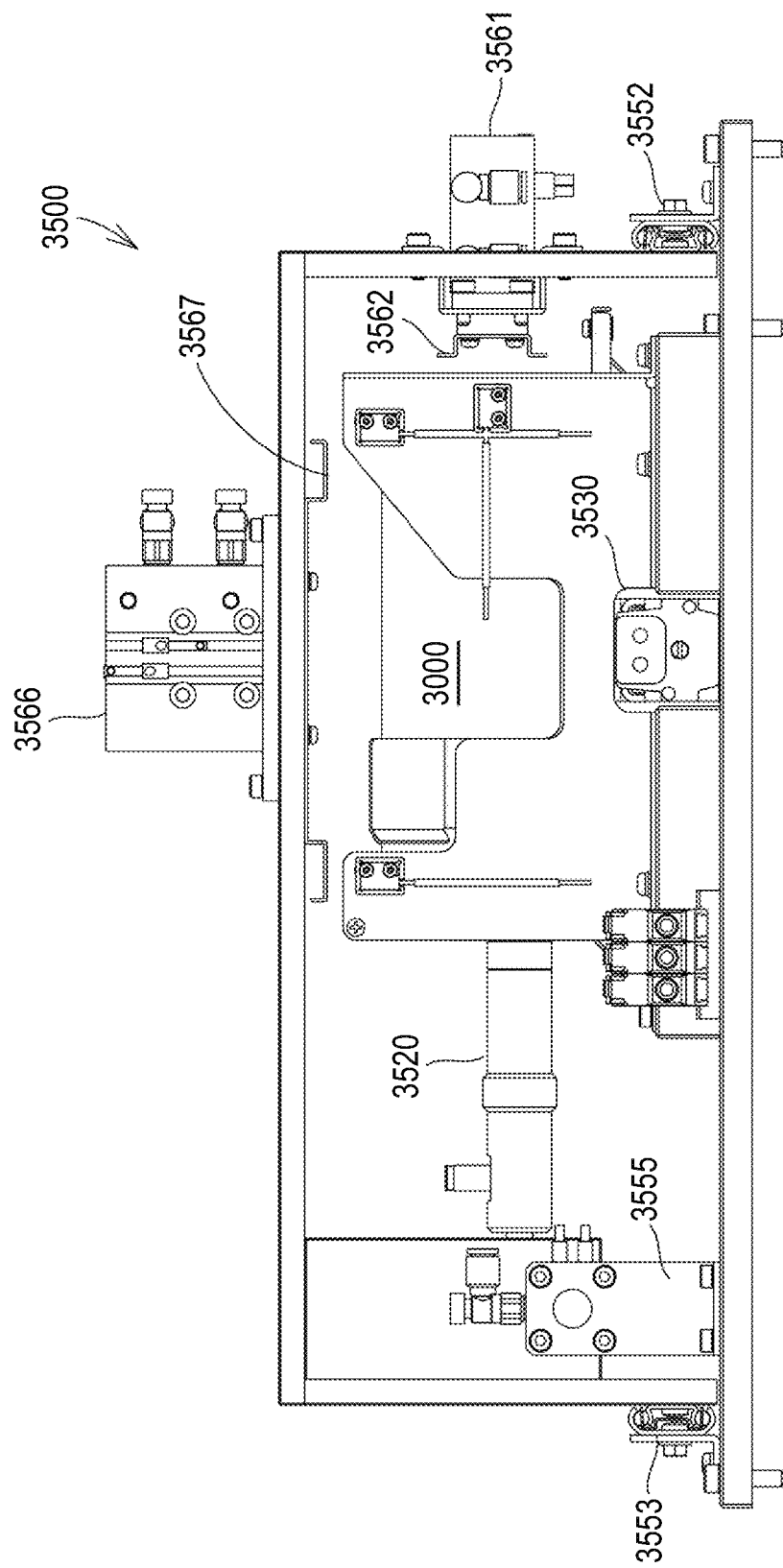
FIG. 35 is a left side view of a banknote aligner.
Figure 36:
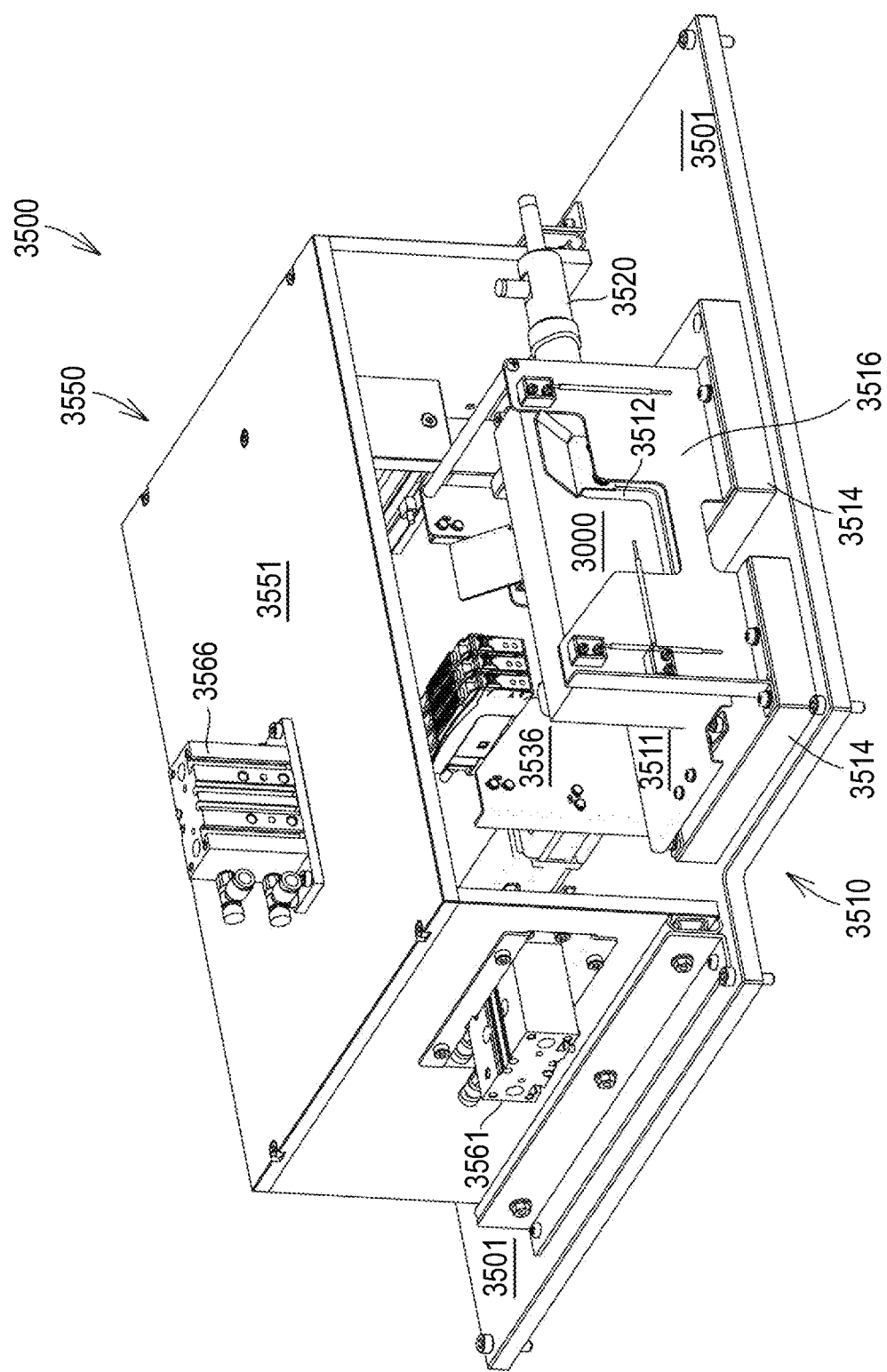
FIG. 36 is a right front perspective view of the banknote aligner.
Figure 37:
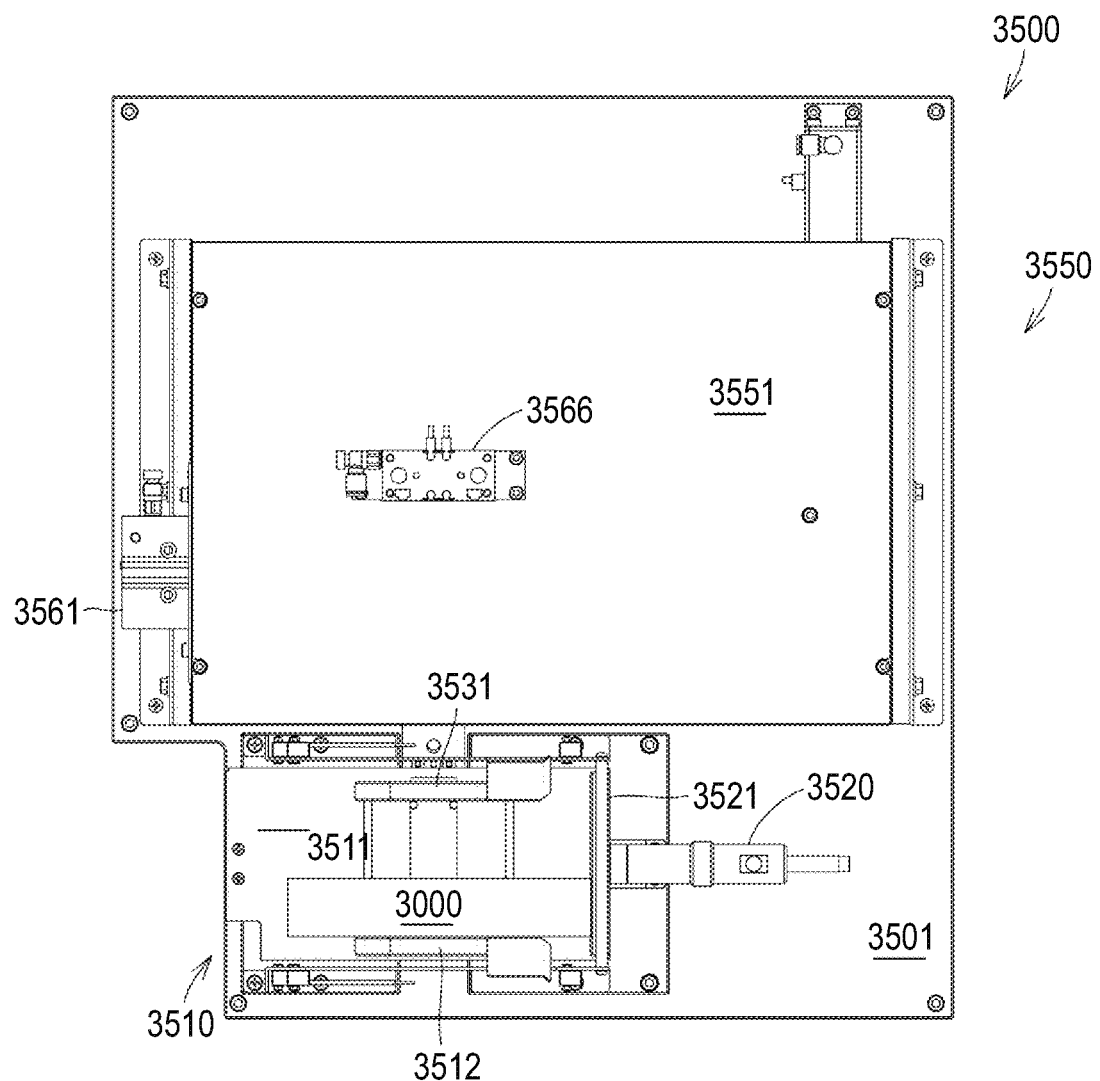
FIG. 37 is a plan view of the banknote aligner.
Figure 38:
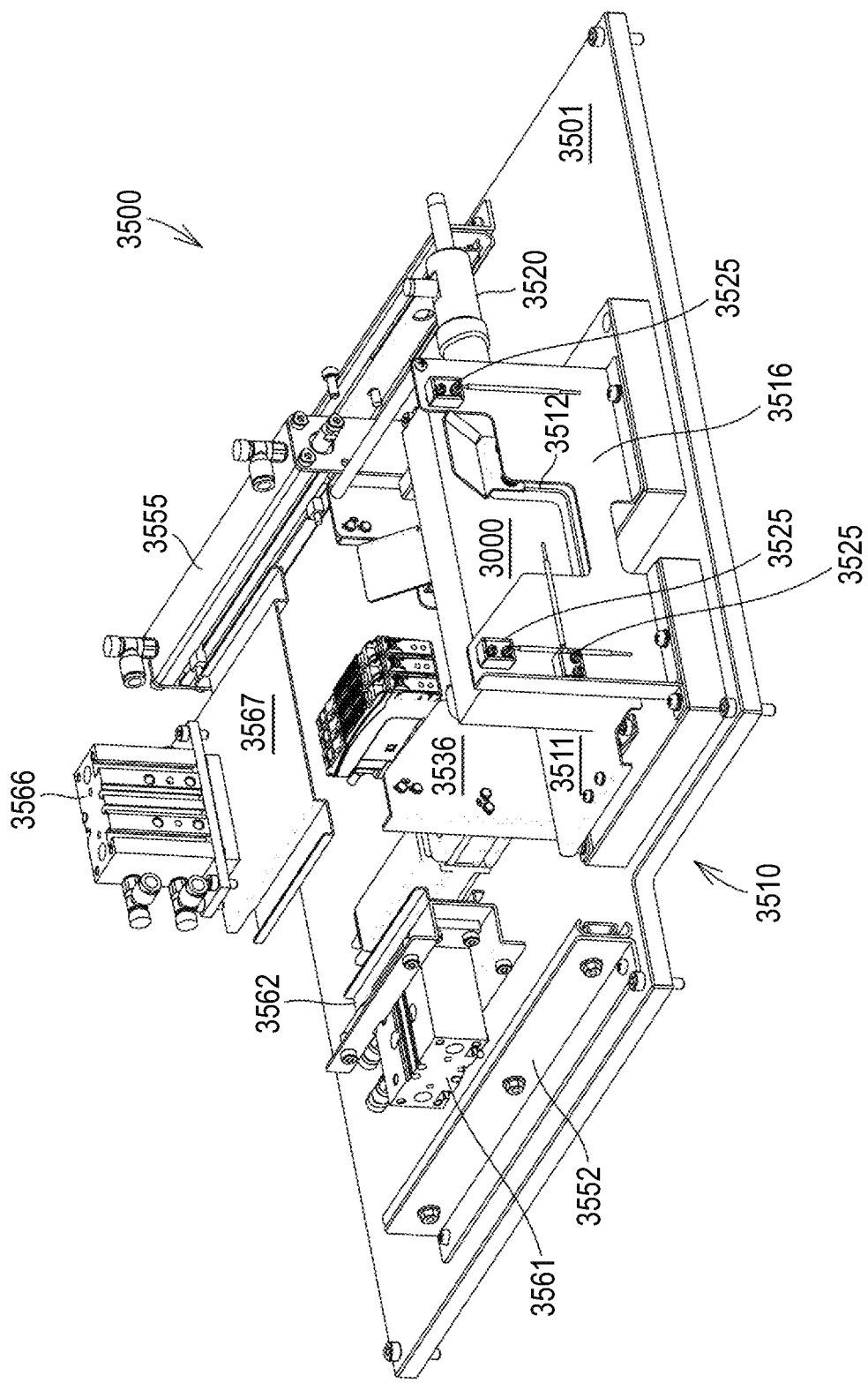
FIG. 38 is a right front perspective view of the banknote aligner without a cover.
Figure 39:
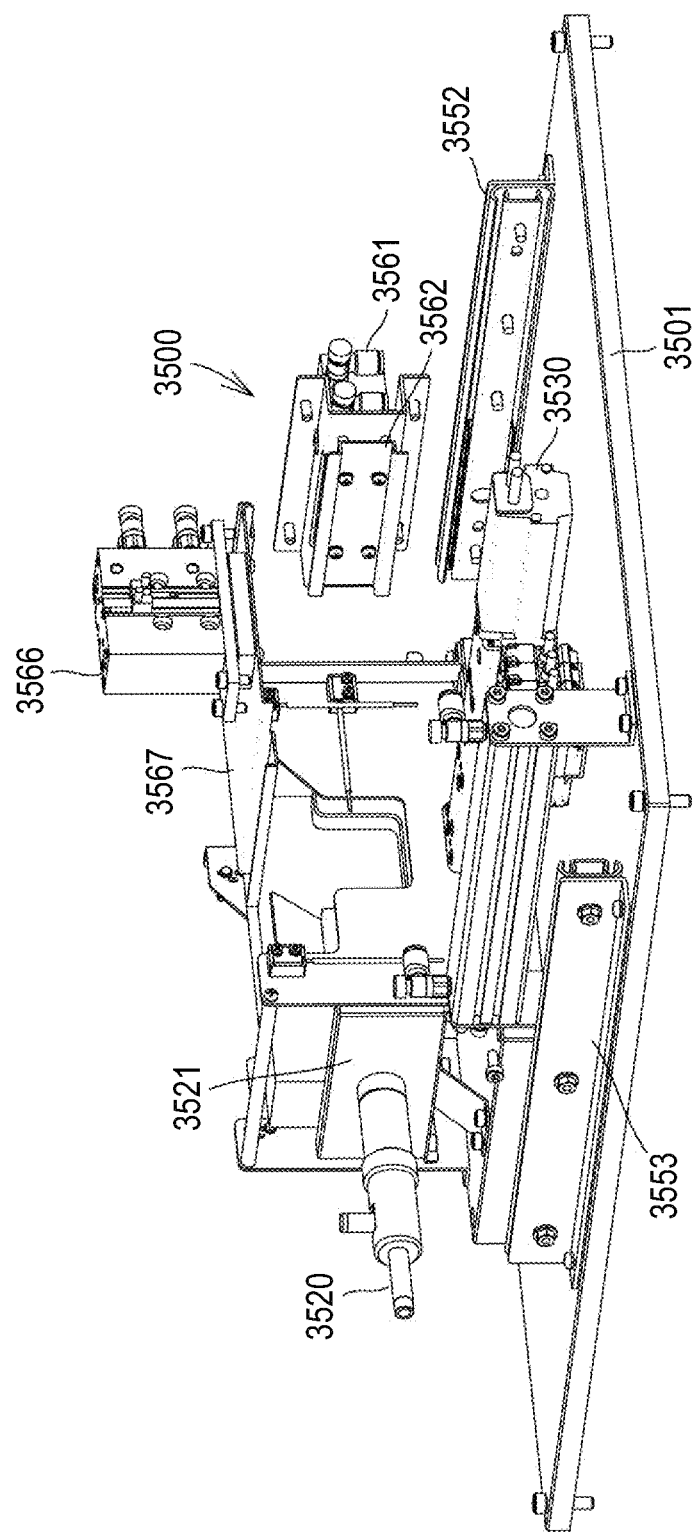
FIG. 39 is a right rear perspective view of the banknote aligner without the cover.
Figure 40:
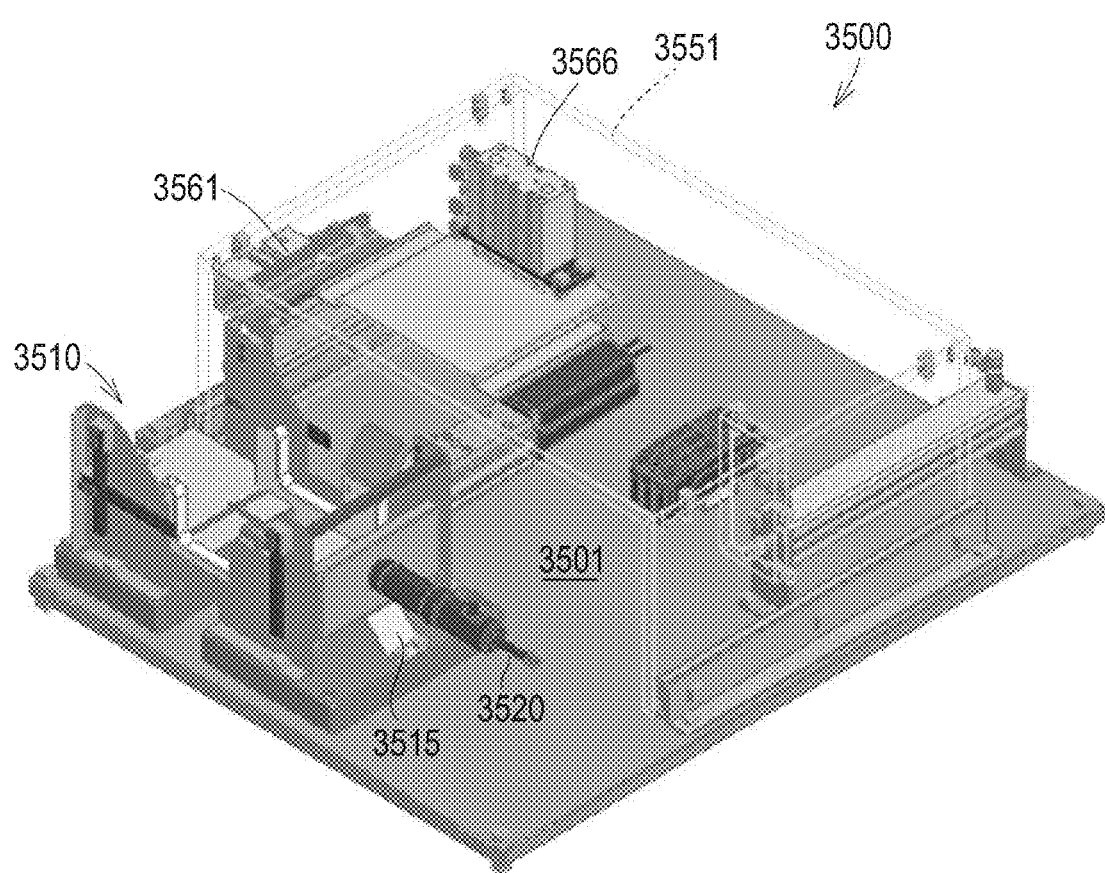
FIG. 40 is a left rear perspective view of the banknote aligner without the cover.
Figure 41:
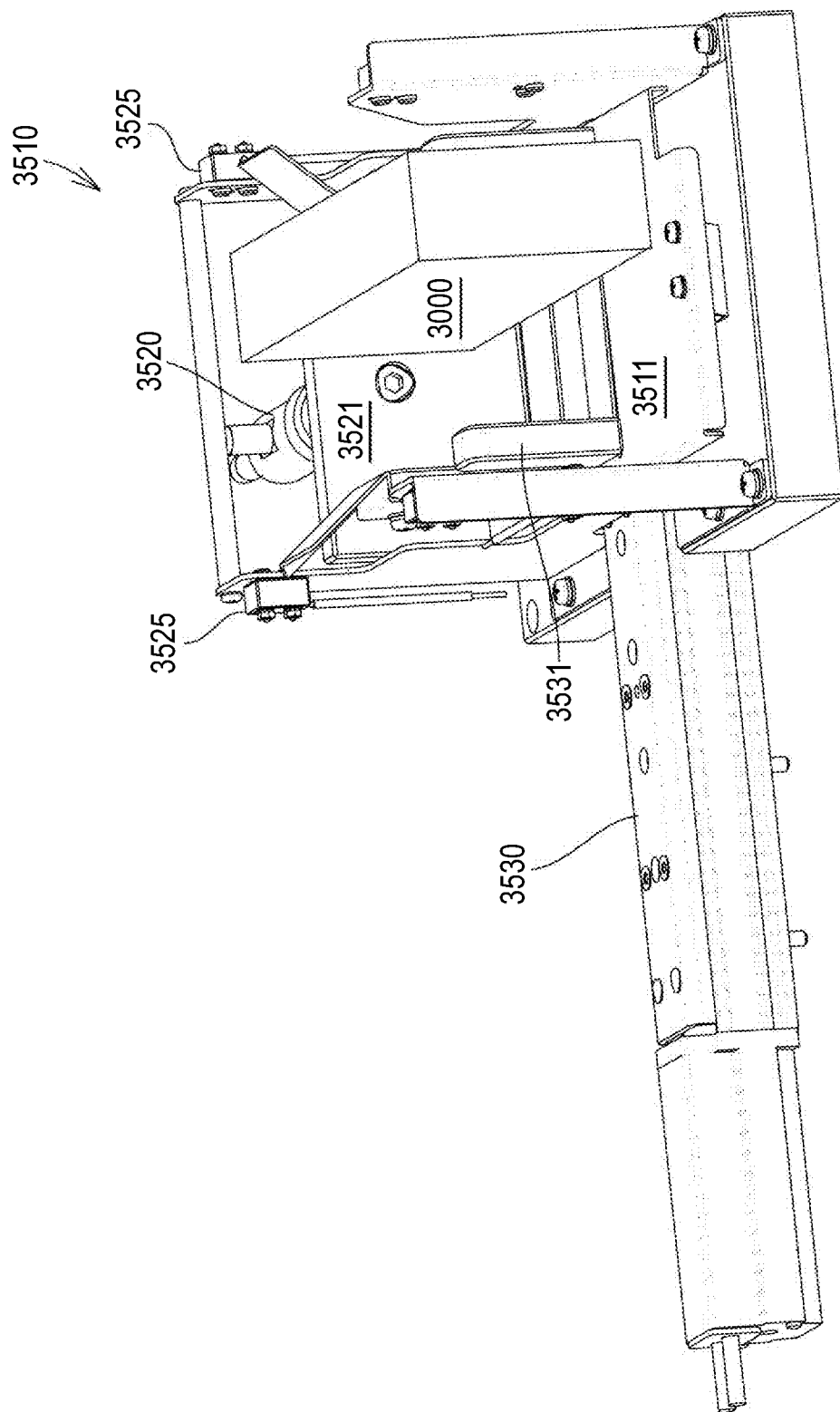
FIG. 41 is a left perspective view of a vibration unit, such as described herein.
Figure 42:
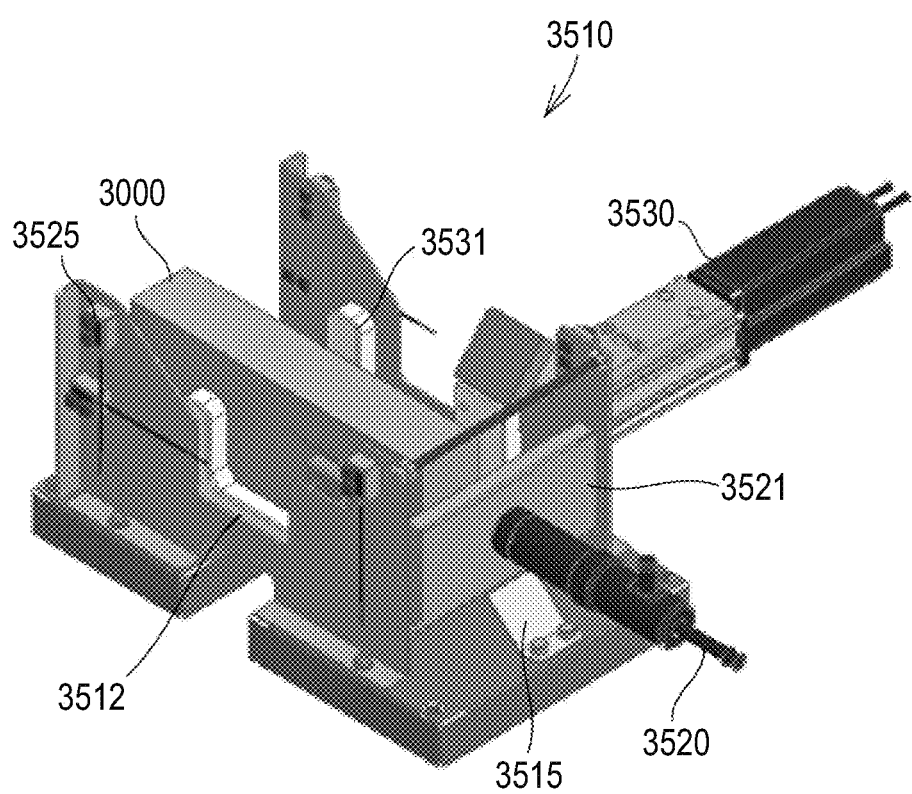
FIG. 42 is a right rear perspective view of the vibration unit , such as described herein.

The banknote aligner 3500 described below has its front on the right side in FIG. 35 and on the left side in FIG. 37, its rear on the left side in FIG. 35 and on the right side in FIG. 37, its upper side on the upper side in FIG. 35, its lower side on the lower side in FIG. 35, its left on the upper side in FIG. 37, and its right on the lower side in FIG. 37.

Referring to FIGS. 35 to 42, the banknote aligner 3500 mainly includes a vibration unit 3510 and a push unit 3550 on a base 3501.

The vibration unit 3510 includes a mount plate 3511, on which the banknotes 3000 removed from the banknote storage container 10 stand on their edges, and a support 3512, which supports the right face of the standing banknotes 3000, and a rear plate 3521, which holds the rear edges of the banknotes 3000. More specifically, the support 3512 extends vertically on the mount plate 3511. On the right side of the support 3512, a right wall 3516 extends vertically on a vibration table 3514.

The rear plate 3521 has a vibrator 3520 on its rear. The mount plate 3511, the support 3512, and the rear plate 3521 are mounted on the base 3501 with, for example, an elastic member in a manner vibratable by the vibrator 3520. The vibrator 3520 has a vibration frequency of 25 to 36 Hz and a vibratory force of 13 to 40 N.

A slide plate 3531 is arranged on the left side of the banknotes 3000 that are held upright by the second arm 2400 or the third arm 2700. The slide plate 3531 supports the left face of the banknotes 3000 and prevents the banknotes 3000 from falling. The slide plate 3531 is movable by a support cylinder 3530 in the left-right direction of the banknote aligner 3500.

After the banknotes 3000 are placed on the mount plate 3511 with the second arm 2400 or the third arm 2700, the controller 2100 drives the support cylinder 3530 to move the slide plate 3531 to the right until the slide plate 3531 can support the banknotes 3000 and prevent them from falling. In some embodiments, a U-shaped left wall 3536 extends vertically on the left side of the banknotes 3000 or the slide plate 3531. The left wall 3536 has a recess, through which the support cylinder 3530 for the slide plate 3531 passes.

In some embodiments, the push unit 3550 includes a cover 3551, which is sized to cover the front, top, and rear of the vibration unit 3510, rails 3552 and 3553, which support the cover 3551 in a slidable manner, and a cover cylinder 3555, which generates a drive force for moving the cover 3551 in the left-right direction.

The push unit 3550 includes a banknote top push plate 3567, which is mounted on a top portion of the cover 3551, a vertical cylinder 3566, which moves the banknote top push plate 3567 in the vertical direction, or specifically pushes the top edges of any banknotes 3000 deviating upward from other banknotes 3000 in the same bundle downward using the banknote top push plate 3567, a banknote front push plate 3562, which is mounted on a front portion of the cover 3551, and a horizontal cylinder 3561, which moves the banknote front push plate 3562 in the front-rear direction, or specifically pushes the front edges of any banknotes 3000 deviating frontward from other banknotes 3000 in the same bundle rearward using the banknote front push plate 3562.

In some embodiments, multiple banknote edge detection sensors 3525 are arranged above the right support 3512 and the slide plate 3531. In some embodiments, the banknote edge detection sensors 3525 are mounted on the right wall 3516 and the left wall 3536. Besides those for the top edges of the banknotes, banknote edge detection sensors 3525 are also arranged for detecting the lateral edges of the banknotes. The banknote edge detection sensors 3525, which are optical sensors for red visible light, detect any banknote 1000 greatly deviating upward or frontward from other banknotes 3000 in the same bundle. The banknote edge detection sensors 3525 may be optical sensors for light of another color, or may be infrared sensors.

Figure 43:
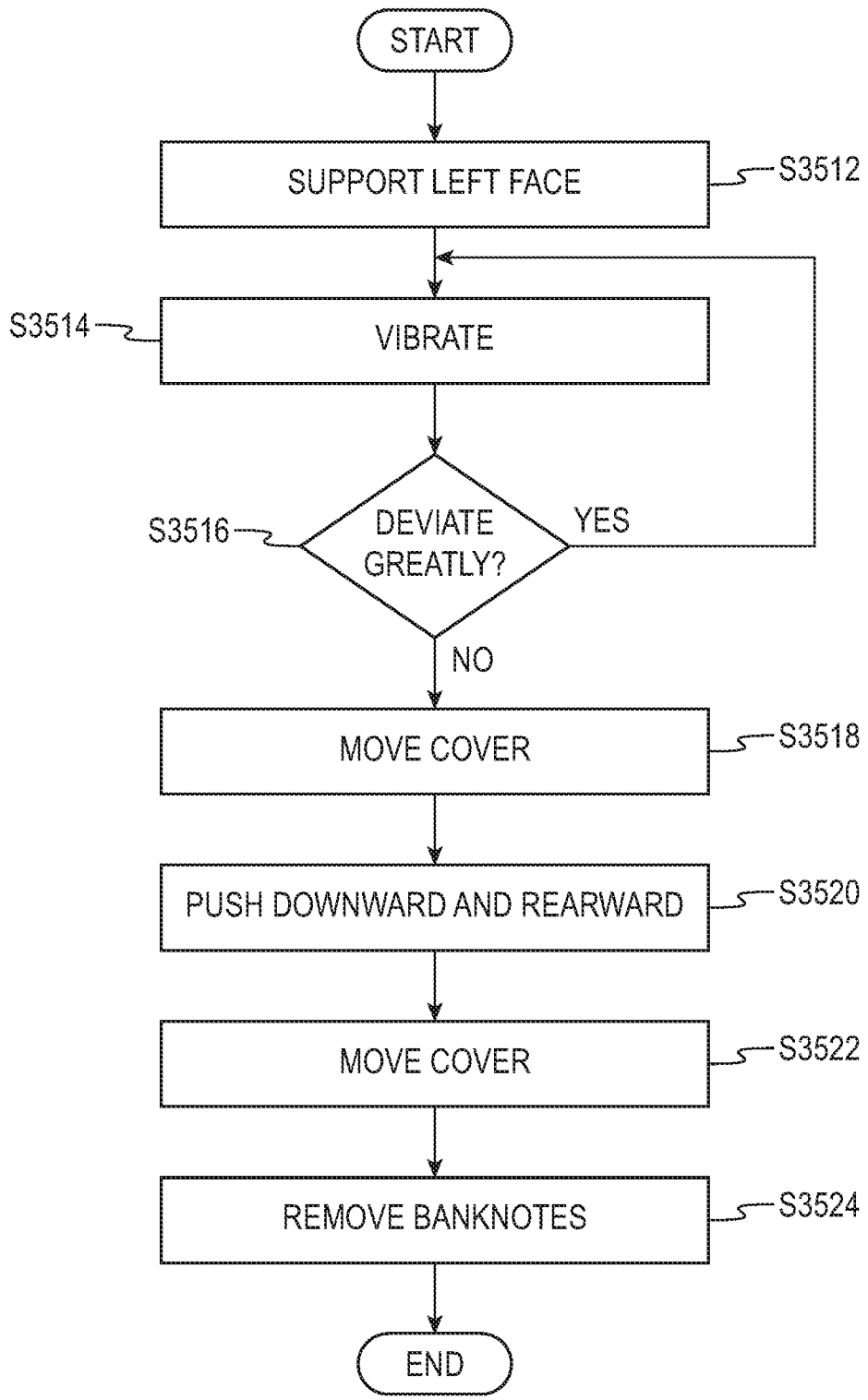
FIG. 43 is a flowchart showing a method for controlling the banknote aligner.

A method for controlling the banknote aligner 3500 is described with reference to FIG. 43. In some embodiments, the banknotes 3000 are placed on the mount plate 3511 with the second arm 2400 or the third arm 2700. This causes the controller 2100 to perform the processing described below.

Figure 44:
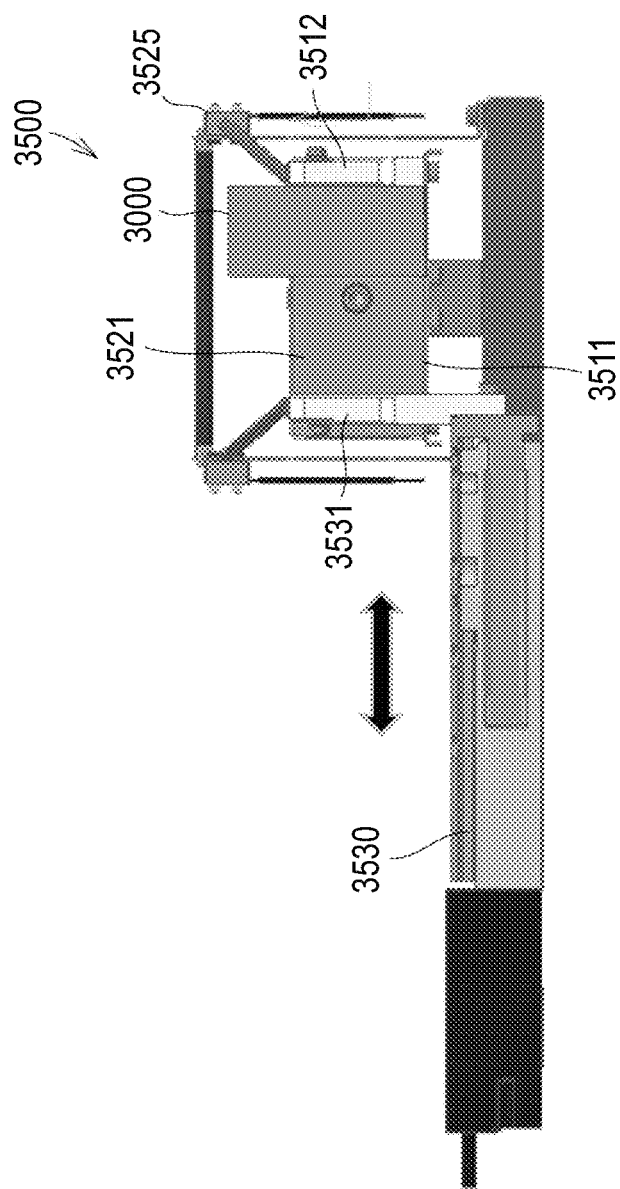
FIG. 44 is a front cross-sectional view of the banknote aligner showing its structure for driving a slide plate.

As shown in FIG. 44, the controller 2100 first drives the support cylinder 3530 to move the slide plate 3531 to the right while maintaining the banknotes 3000 held by the second arm 2400 or the third arm 2700 standing on their edges on the mount plate 3511. The slide plate 3531 is moved until the slide plate 3531 can support the left face of the banknotes 3000 and prevent them from falling (step S3512). The controller 2100 drives the vibrator 3520 for several seconds to vibrate the rear plate 3521 and the mount plate 3511 on which the banknotes 3000 are placed. This aligns the lower edges and the rear edges of the banknotes 3000 (step S3514).

Figure 45:
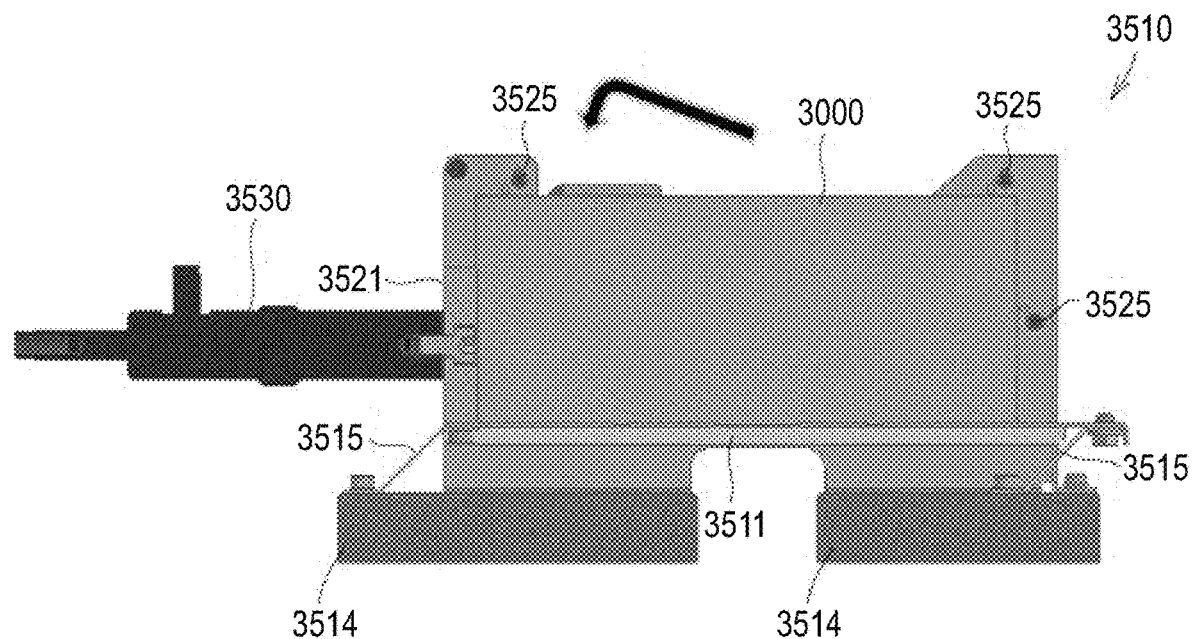
FIG. 45 is a left cross-sectional view of the banknote aligner showing its banknote vibration structure.
Figure 46:
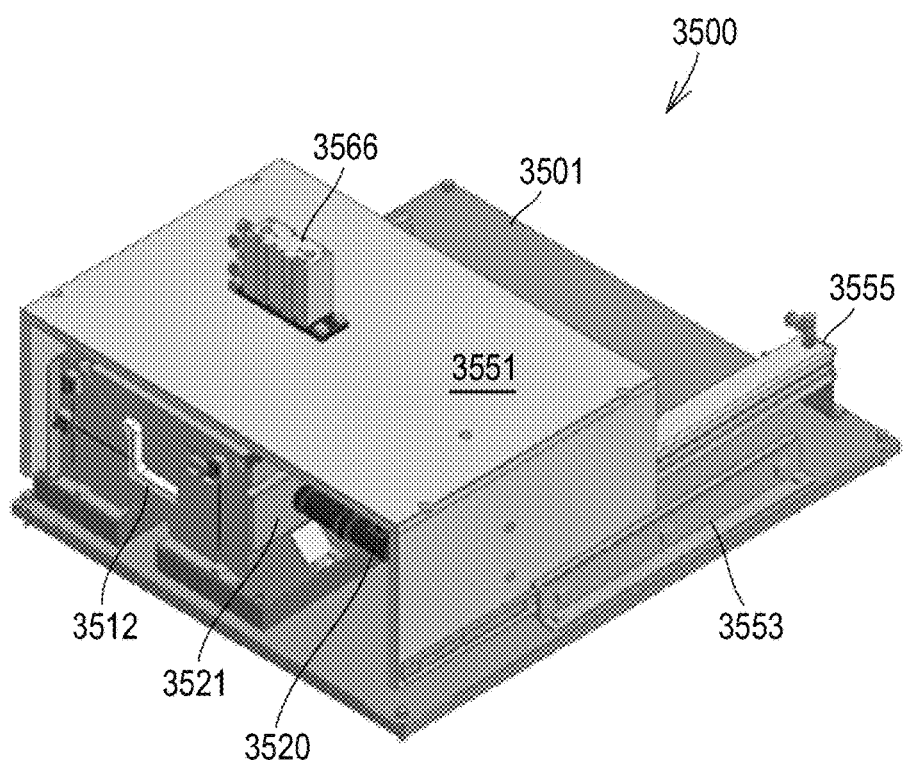
FIG. 46 is a right front perspective view of the banknote aligner with the vibration unit covered with the cover.
Figure 47:
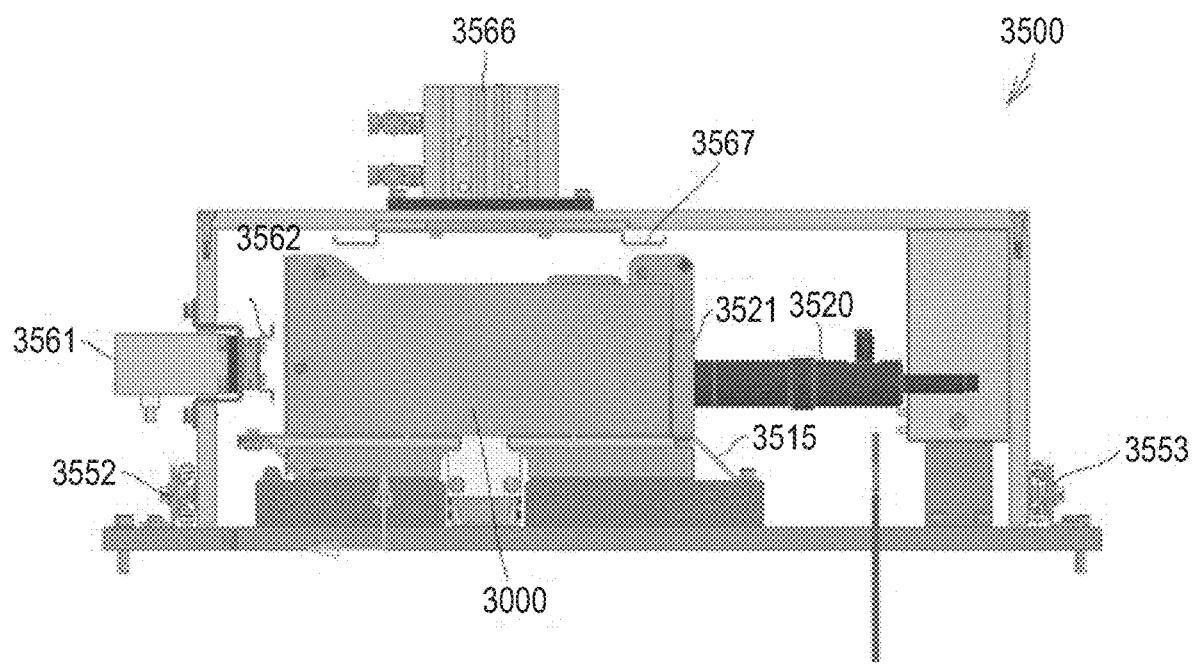
FIG. 47 is a right side view of the banknote aligner with the vibration unit covered with the cover.
Figure 48:
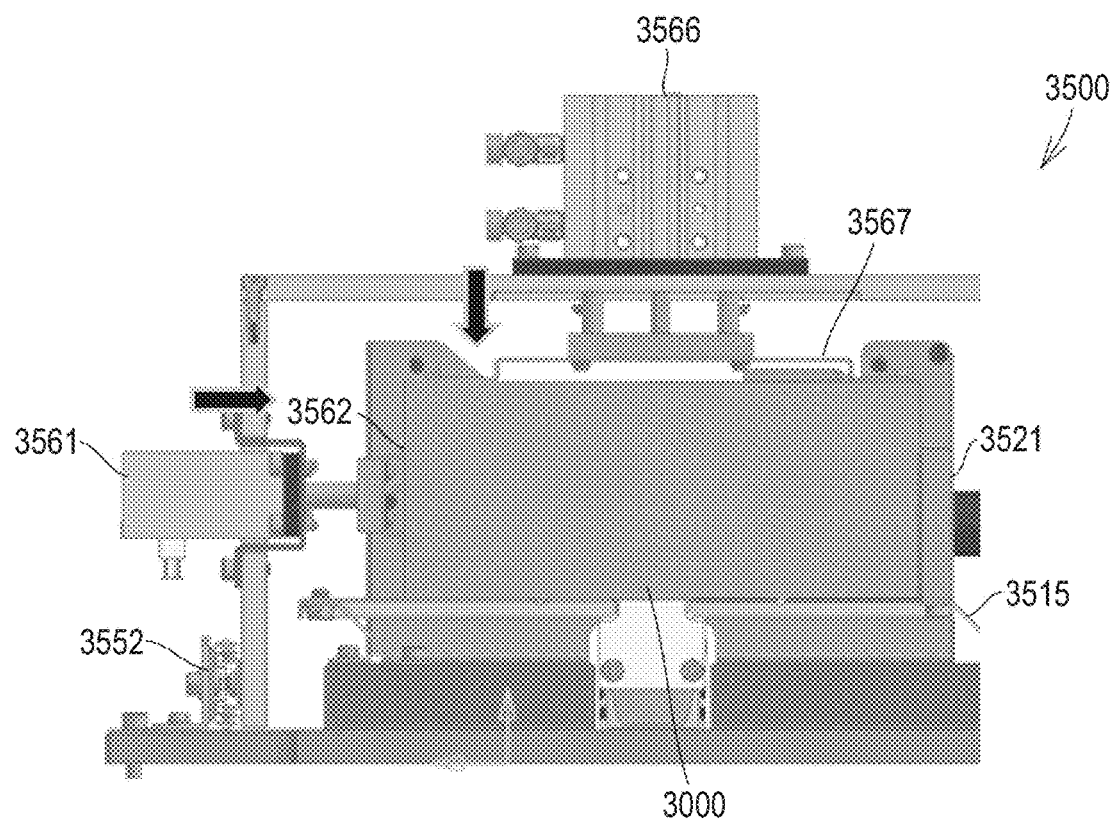
FIG. 48 is a right side view of the banknote aligner with the banknotes being pushed from above and from front.

In some embodiments, as shown in FIG. 45, a stainless steel spring 3515 extends between the front end of the mount plate 3511 and the vibration table 3514. Similarly, a stainless steel spring 3515 extends between the rear end of the mount plate 3511 and the vibration table 3514. More specifically, the stainless steel springs 3515 viewed from above are parallel to the direction in which the vibrator 3520 vibrates.

In another non-limiting phrasing, the stainless steel springs 3515 are parallel to the longitudinal direction of the placed banknotes 3000. In the left side view, the stainless steel springs 3515 each extend from the upper front toward the lower rear, or in other words upward to the right. This structure can move the banknotes 3000 in the arrow direction in FIG. 45 as the vibrator 3520 vibrates. In this manner, the banknotes 3000 are shaken against the mount plate 3511 and the rear plate 3521 to have their lower and rear edges aligned.

The vibration table 3514 may be or include an elastic member, the mount plate 3511 or the support 3512 may be an elastic member, or an elastic member may be used between the vibration table 3514 and the mount plate 3511, or between the vibration table 3514 and the support 3512.

The controller 2100, such as described in reference to other embodiments described herein, determines whether any banknotes 3000 greatly deviate from other banknotes 3000 in the same bundle based on signals from the banknote edge detection sensors 3525 (step S3516). When the banknotes 3000 deviate greatly (Yes in step S3516), the controller 2100 repeats the processing from step S3514.

When the banknotes 3000 deviate only slightly (No in step S3516), the controller 2100 drives the cover cylinder 3555 to move the banknote top push plate 3567 to above the banknotes 3000 and move the banknote front push plate 3562 to the front of the banknote 1000 (step S3518). The controller 2100 then drives the vertical cylinder 3566 to lower the banknote top push plate 3567. The push plate 3567 pushes any banknotes 3000 deviating upward from other banknotes 3000 in the bundle downward.

The controller 2100 also drives the horizontal cylinder 3561 to move the banknote front push plate 3562 rearward. The push plate 3562 pushes any banknotes 3000 deviating frontward from other banknotes 3000 in the bundle rearward (step S3520).

The controller 2100 drives the cover cylinder 3555 to move the banknote top push plate 3567, the banknote front push plate 3562, and the cover 3551 to the left (step S3522). The controller 2100 controls the second arm 2400 or the third arm 2700 to remove the banknotes 3000 from the mount plate 3511 (step S3524) and pass them to the banknote sorter 2600 or the banknote strapper 2800.

Figure 49:
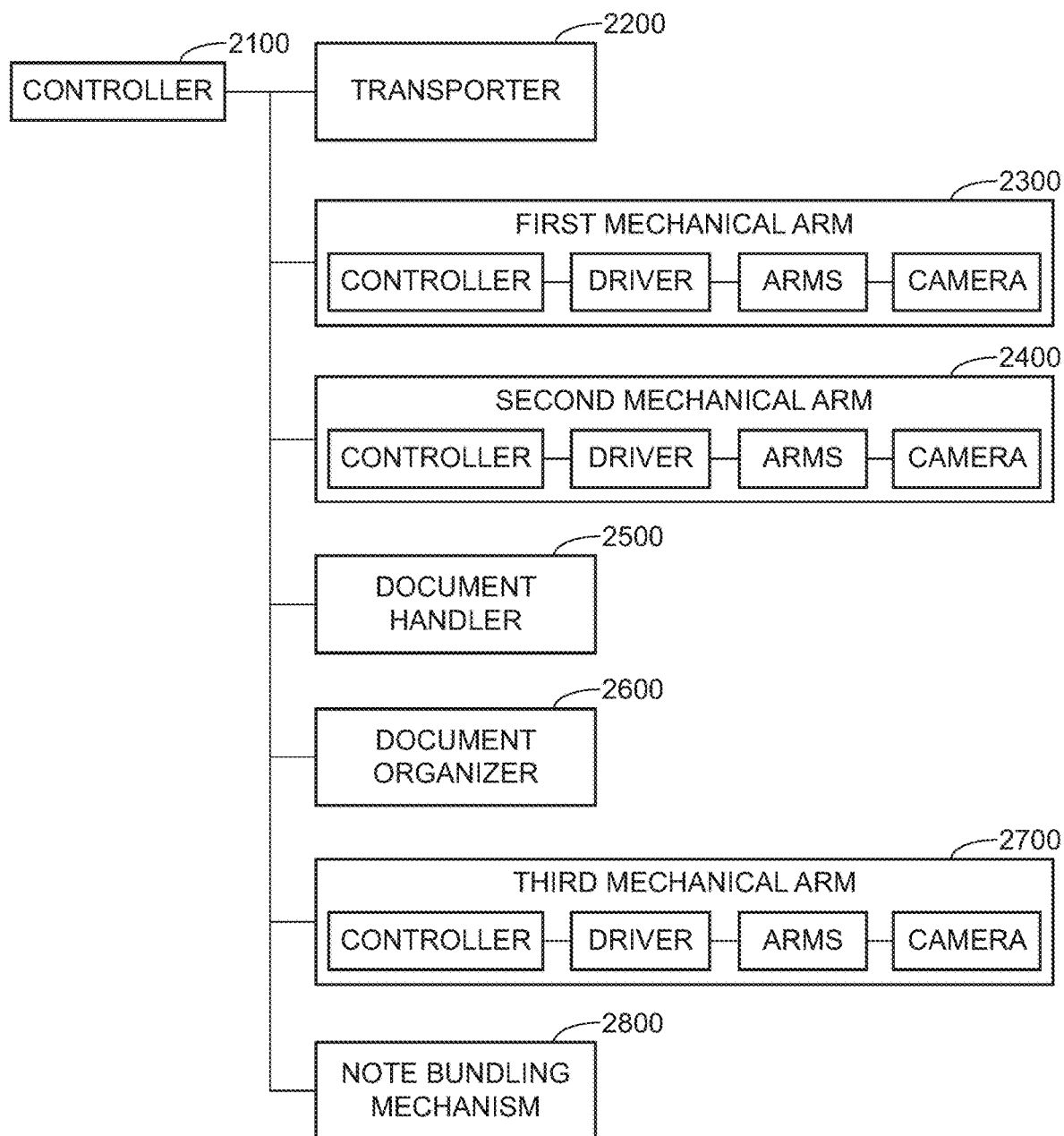
FIG. 49 is a functional block diagram of the banknote handling system according to an embodiment.

The above embodiment may be modified. The function of each of the units in the above embodiment may be achieved by another unit. The function of a single unit may be achieved by a plurality of units, or the functions of a plurality of units may be achieved by a single unit. As shown in FIG. 49, for example, a controller in the first arm 2300 or in the second arm 2400 may function as the controller 2100. A CPU or a memory in the camera 2420 or the controller in the first arm 2300 or another unit may perform the processing of the controller 2100.

A banknote aligner 3500 according to the above embodiment includes a plate 3511 on which banknotes 3000 are placeable, a vibrator 3520 that vibrates the plate 3511, and a controller 2100 that controls the vibrator 3520.

In many examples, the banknote aligner 3500 further includes pushers 3562 and 3567 that push the banknotes 3000 from front and/or from above. The controller 2100 vibrates the vibrator 3520, and then controls the pushers 3562 and 3567 to push the banknotes 3000 from front and/or from above.

In many examples, the banknote aligner 3500 further includes a detector 3525 that detects whether the banknotes 3000 deviate frontward and/or upward. The controller 2100 vibrates the vibrator 3520, and then controls a pusher 3527 to push the banknotes from above based on a detection result from the detector 3525 indicating that the banknotes 3000 deviate upward slightly.

In many examples, the banknote aligner 3500 further includes a support 3531 that laterally supports the banknotes 3000. The controller 2100 controls the support 3531 to laterally support the banknotes 3000 placed on the plate 3511.

In many examples, the banknote aligner 3500 further includes one or more springs 3515 that support the plate 3511, and a member 3521 that comes in contact with edges of the banknotes 3000 in a longitudinal direction. The one or more springs 3515 extend obliquely in the longitudinal direction of the banknotes 3000.

In many examples, the vibrator 3520 has a vibration frequency of 25 to 36 Hz and a vibratory force of 13 to 40 N.

It may be appreciated that the above embodiments may be modified. The function of each of the units in the above embodiment may be achieved by another unit. The function of a single unit may be achieved by a plurality of units, or the functions of a plurality of units may be achieved by a single unit. As shown in FIG. 49, for example, a controller in the first mechanical arm 2300 or in the second mechanical arm 2400 may function as the controller 2100. A CPU or a memory in the camera 2420 may perform the processing in step S204 or step S206 in FIG. 30. The controller in the first mechanical arm 2300 may perform the processing in step S208 or step S210 in FIG. 30.

In the above embodiment, the camera 2420 is mounted on the second mechanical arm 2400. However, the camera 2420 may be mounted on a third mechanical arm, which is separate from the gripper 2410.

In some embodiments, the camera 2420 may be mounted on the same first mechanical arm 2300 as the key 2310.

In some embodiments, the camera 2420 may be immovable. In other words, the camera 2420 may be fixed to a support placed on the base 2050.

The foregoing embodiments depicted in the figures referenced above and the various alternatives thereof and variations thereto are presented, generally, for purposes of explanation, and to facilitate an understanding of various configurations and constructions of a network architecture that facilitates communication by and between various components of a banknote handling system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein—including private financial data—will preferably comply with published and industry-established privacy, data, and network security policies and practices. For example, it is understood that data and/or information obtained from remote or local data sources—only on informed consent of the subject of that data and/or information—should be accessed and/or aggregated only for legitimate, agreed-upon, and reasonable uses.

What is claimed is:

1. A document handling and transportation system for use in a casino counting room environment, comprising:
a conveyor system;
a first mechanical arm;
a second mechanical arm;
a third mechanical arm;
an alignment receptacle;
an alignment receptacle transport mechanism; and
an alignment mechanism; wherein
the conveyor system is operable to move a cashbox to an unload position;
the first mechanical arm is operable to:
insert a key into a keyway of the cashbox;
turn the key in a first direction to unlock the cashbox; and
open a lid of the cashbox;
the second mechanical arm is operable to:
remove a set of documents from the cashbox; and
deliver the set of documents to the alignment receptacle;
the first mechanical arm is further operable to:
close the lid of the cashbox; and
turn the key in a second direction to lock the cashbox;
the conveyor system is further operable to move the cashbox from the unload position;
the alignment receptacle transport mechanism is operable to move the alignment receptacle from a receive position to an align position;
the alignment mechanism is operable to align the set of documents in the alignment receptacle when the alignment receptacle is at the align position; and
the third mechanical arm is operable to:
remove the set of documents from the alignment receptacle; and
deliver the set of documents to a hopper for a sorting device.

2. The system of claim 1, wherein:
the cashbox is a first cashbox;
the set of documents is a first set of documents; and
the third mechanical arm is operable to stack the set of documents in the hopper on top of a second set of documents from a second cashbox.

3. The system of claim 1, wherein the second mechanical arm includes a set of plates that is operable to grip the set of documents.

4. The system of claim 3, wherein:
a first plate of the set of the set of plates is fixed; and
a second plate of the set of plates is movable.

5. The system of claim 1, wherein:
the conveyor system includes a first conveyor and a second conveyor; and
the system includes a transfer unit operable to transport the cashbox from the first conveyor to the second conveyor.

6. The system of claim 5, wherein the transfer unit comprises a slide that is operable to transport the cashbox from the first conveyor to the second conveyor.

7. The system of claim 5, wherein the first conveyor is parallel to the second conveyor.

8. A document handling and transportation system for use in a casino counting room environment, comprising:
a transport system;
a first mechanical arm;
a second mechanical arm;
a third mechanical arm;
an alignment receptacle; and
an alignment mechanism; wherein
the transport system is operable to move a cashbox to an unload position;
the first mechanical arm is operable to couple to a lid of the cashbox, thereby unlocking and opening the lid of the cashbox;
the second mechanical arm is operable to:
remove a set of documents from the cashbox; and
deliver the set of documents to the alignment receptacle;
the first mechanical arm is further operable to:
close the lid of the cashbox;
lock the lid of the cashbox; and
decouple from the lid of the cashbox after closing and locking the lid of the cashbox;

the transport system is further operable to:
  move the cashbox from the unload position; and
  move the alignment receptacle from a receive position to an align position; and
the alignment mechanism is operable to align the set of documents in the alignment receptacle, when the alignment receptacle is at the align position, in preparation for the set of documents to be provided to a sorting device.

9. The system of claim 8, further comprising a controller operable to control at least one of the transport system, the first mechanical arm, the second mechanical arm, the third mechanical arm, or the alignment mechanism.

10. The system of claim 8, wherein the second mechanical arm is operable to turn the set of documents before delivering the set of documents to the alignment receptacle.

11. The system of claim 8, wherein the alignment mechanism comprises a plate that is operable to press the set of documents to align the set of documents.

12. The system of claim 8, wherein the alignment mechanism comprises a set of push elements operable to align the set of documents.

13. The system of claim 12, wherein the set of push elements is operable to push on the set of documents from multiple directions, thereby aligning the set of documents.

14. The system of claim 8, wherein the set of documents includes currency.

15. A document handling and transportation system for use in a casino counting room environment, comprising:
  a transport system;
  a set of mechanical arms; and
  a receptacle; wherein
    the transport system is operable to move a first cashbox to an unload position;
    the set of mechanical arms is operable to:
      couple to a lid of the first cashbox to unlock and open the lid of the first cashbox;
      remove a set of documents from the first cashbox;
      deliver the set of documents to the receptacle;
      close the lid of the cashbox;
      lock the lid of the cashbox; and
      decouple from the lid of the first cashbox after closing and locking the lid of the first cashbox;
    the transport system is further operable to:
      move the first cashbox from the unload position;
      move a second cashbox to the unload position;
      move the receptacle from a receive position to an align position; and
    the set of mechanical arms is further operable to deliver the set of documents to the receptacle in preparation for the set of documents to be provided to a sorting device.

16. The system of claim 15, further comprising:
  at least one sensor; and
  a controller operable to use data from the at least one sensor to control at least one of the transport system or the set of mechanical arms.

17. The system of claim 16, wherein the at least one sensor comprises a camera.

18. The system of claim 16, wherein the at least one sensor comprises a radio frequency identification antenna.

19. The system of claim 18, wherein:
  the first cashbox comprises a radio frequency identification tag; and
  the radio frequency identification antenna is operable to read a signal from the radio frequency identification tag.

20. The system of claim 16, wherein the at least one sensor includes a tag reader.

* * * * *